(12) United States Patent
Abe et al.

(10) Patent No.: US 11,905,681 B2
(45) Date of Patent: Feb. 20, 2024

(54) PRIME MOVER SPEED CONTROL FOR HYDROSTATIC WORKING MACHINE

(71) Applicant: KUBOTA CORPORATION, Osaka (JP)

(72) Inventors: Daiki Abe, Osaka (JP); Ryota Hamamoto, Osaka (JP); Yuya Tanabe, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/994,682

(22) Filed: Nov. 28, 2022

(65) Prior Publication Data

US 2023/0203786 A1 Jun. 29, 2023

(30) Foreign Application Priority Data

Dec. 23, 2021 (JP) ................. 2021-209716

(51) Int. Cl.
| | |
|---|---|
| *E02F 9/22* | (2006.01) |
| *E02F 9/20* | (2006.01) |
| *F16H 61/421* | (2010.01) |
| *F16H 61/431* | (2010.01) |
| *F16H 61/465* | (2010.01) |

(52) U.S. Cl.
CPC .......... *E02F 9/2246* (2013.01); *E02F 9/2004* (2013.01); *E02F 9/2203* (2013.01); *E02F 9/2235* (2013.01); *E02F 9/2285* (2013.01); *F16H 61/421* (2013.01); *F16H 61/431* (2013.01); *F16H 61/465* (2013.01)

(58) Field of Classification Search
CPC .... E02F 9/2246; E02F 9/2285; F16H 61/421; F16H 61/431; F16H 61/465
See application file for complete search history.

(56) References Cited

U.S. PATENT DOCUMENTS

| | | | | |
|---|---|---|---|---|
| 10,451,094 | B2* | 10/2019 | Fukuda | E02F 9/226 |
| 10,618,527 | B2* | 4/2020 | Fukuda | B60W 50/085 |
| 2013/0036729 | A1* | 2/2013 | Kinugawa | F16H 61/468 60/446 |
| 2017/0350095 | A1* | 12/2017 | Fukuda | E02F 9/2285 |
| 2020/0190773 | A1* | 6/2020 | Hoshino | E02F 9/2296 |

FOREIGN PATENT DOCUMENTS

JP 2013036274 A 2/2013

* cited by examiner

*Primary Examiner* — Abiy Teka
*Assistant Examiner* — Matthew Wiblin
(74) *Attorney, Agent, or Firm* — Greenblum & Bernstein, P.L.C.

(57) ABSTRACT

A working machine includes a prime mover, a rotation-speed operation actuator, a rotation detector, a hydraulic pump, a hydraulic unit, an operation valve capable of changing a pilot pressure of a pilot fluid supplied from the hydraulic pump to the hydraulic unit in accordance with an operation of an operation member, an actuation valve operating in accordance with a control signal and capable of changing a primary pressure as the pilot pressure of the pilot fluid supplied from the hydraulic pump to the operation valve, and a controller that outputs the control signal based on a difference between target and actual rotation speeds to the actuation valve to control an opening thereof. The controller has a mode including calculating the control signal based on the difference, correcting the calculated control signal, and increasing or decreasing a target primary pressure value set in accordance with the control signal.

14 Claims, 23 Drawing Sheets

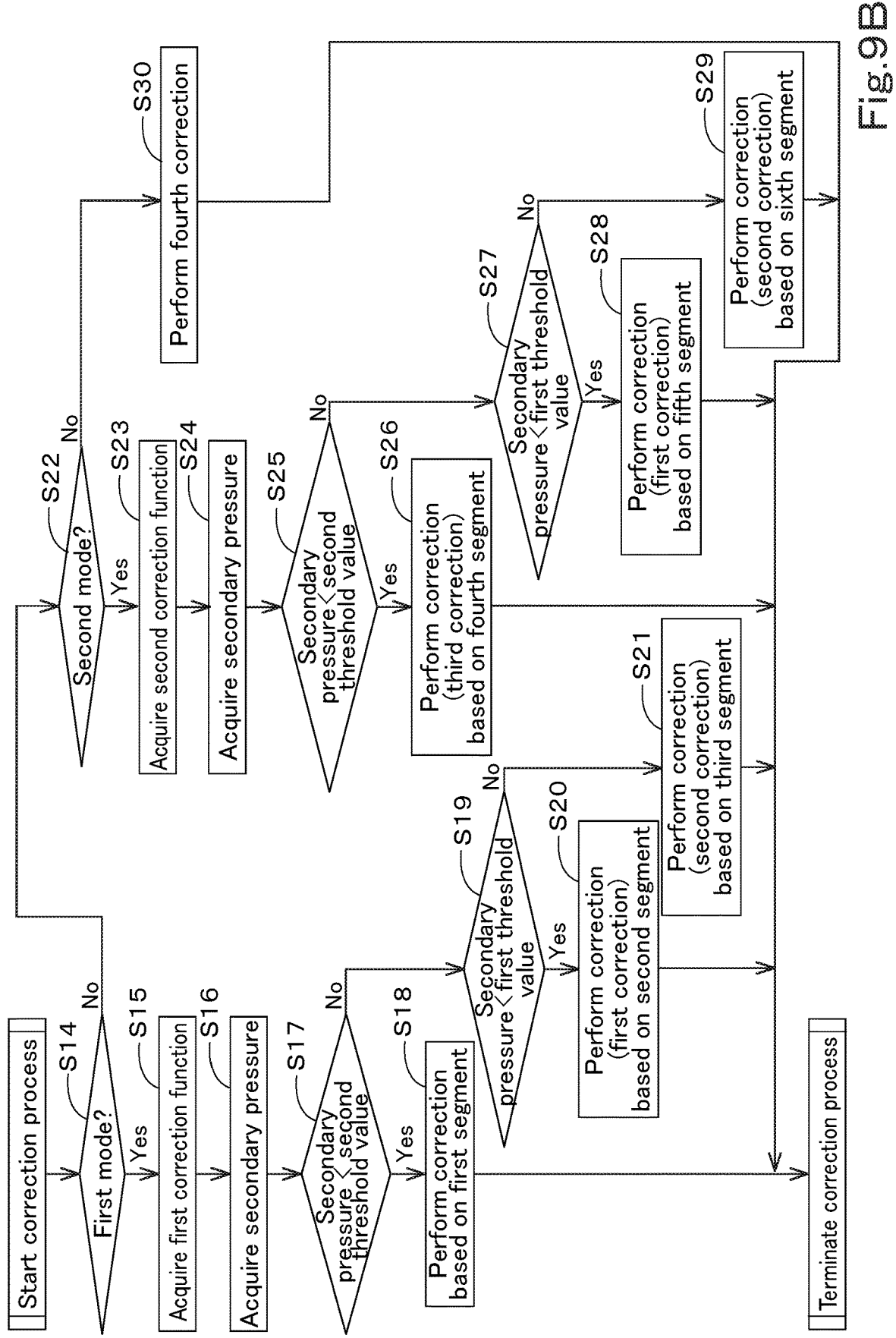

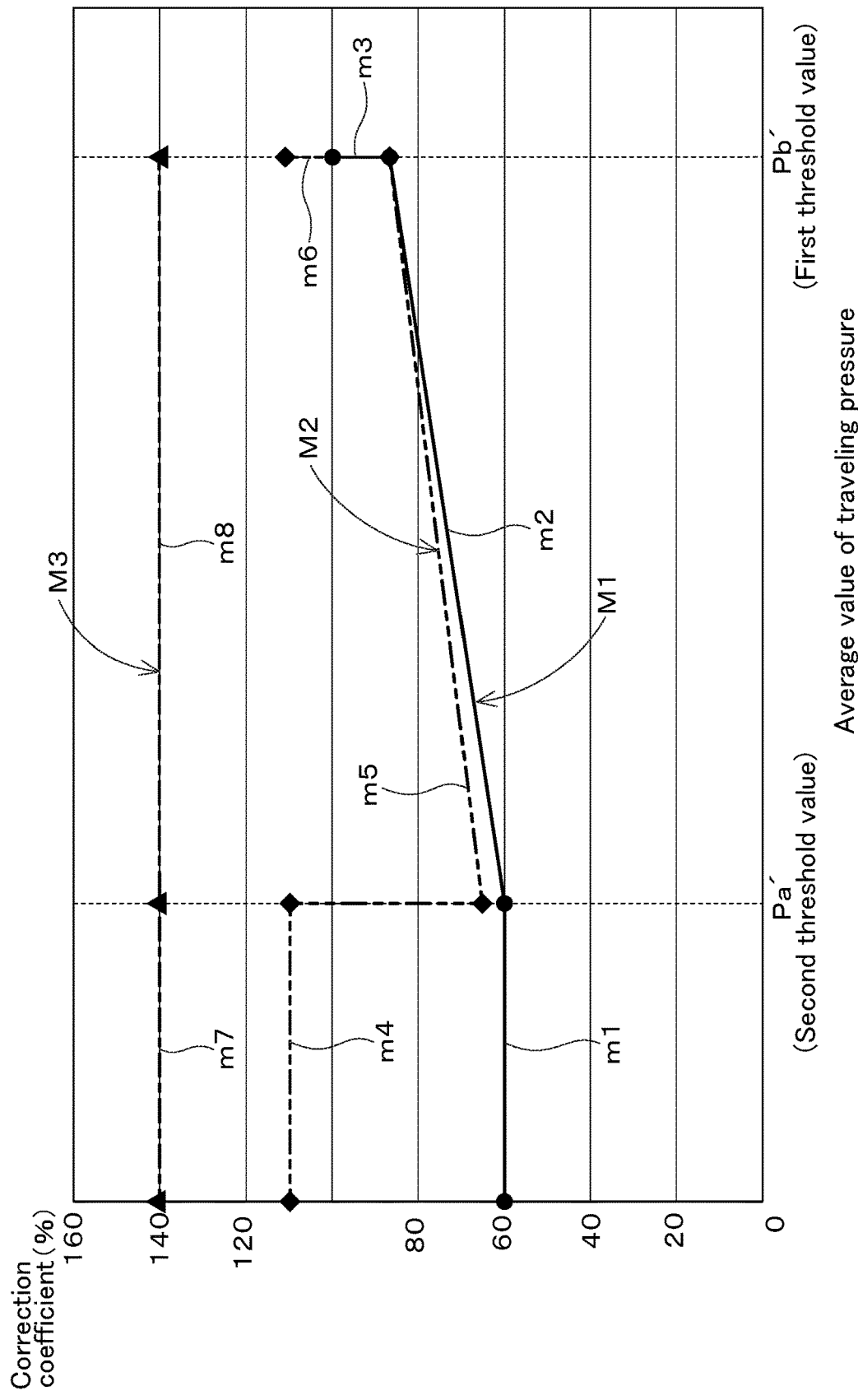

PRIME MOVER SPEED CONTROL FOR HYDROSTATIC WORKING MACHINE

CROSS REFERENCE TO RELATED APPLICATIONS

This application claims the benefit of priority to Japanese Patent Application No. 2021-209716 filed on Dec. 23, 2021. The entire contents of this application are hereby incorporated herein by reference.

BACKGROUND OF THE INVENTION

1. Field of the Invention

The present invention relates to working machines, such as skid-steer loaders and compact track loaders.

2. Description of the Related Art

Japanese Unexamined Patent Application Publication No. 2013-36274 discloses known technology for preventing an engine stall in a working machine in the related art, such as a skid-steer loader or a compact track loader.

The working machine disclosed in Japanese Unexamined Patent Application Publication No. 2013-36274 includes an engine, a hydro-static transmission (HST) pump that operates in accordance with the power of the engine, a traveling operation device that operates the HST pump, a pressure control valve that controls a traveling primary pressure serving as a primary pressure of the traveling operation device, and a controller that controls the pressure control valve. The traveling operation device has a traveling lever and a pilot valve that outputs a pilot pressure in proportion to an operational amount of the traveling lever in accordance with an operation of an operation lever.

The controller performs anti-stall control for preventing an engine stall. Anti-stall control involves preventing an engine stall by controlling the pressure control valve based on a load-less characteristic line used during a load-less state of the engine and a drop characteristic line used when a predetermined load or more is applied to the engine. In other words, when a predetermined traveling load or more is applied to the working machine, the pressure control valve is controlled to rapidly reduce the traveling primary pressure, so that a sharp drop in the engine speed is reduced as much as possible, thereby suppressing an engine stall.

SUMMARY OF THE INVENTION

However, in the technology disclosed in Japanese Unexamined Patent Application Publication No. 2013-36274, the controller is configured to perform the anti-stall control in accordance with the engine speed, and uses the preset drop characteristic line if the engine receives the predetermined load or more. Therefore, the traveling primary pressure is changed by controlling the pressure control valve. If the engine speed is constant, the pressure control valve does not change the traveling primary pressure. Thus, when the engine speed is relatively high, the traveling primary pressure is high even if the operational amount is small, possibly making it difficult to ensure a traveling secondary pressure that enables operability desired by the operator.

Preferred embodiments of the present invention provide working machines each can both suppress an engine stall and ensure operability of a hydraulic unit.

A working machine according to an aspect of the present invention includes a prime mover, a rotation-speed operation actuator operable to determine a target rotation speed of the prime mover, a rotation detector to detect an actual rotation speed of the prime mover, a hydraulic pump driven by power from the prime mover to deliver a hydraulic fluid, a hydraulic unit to actuate in accordance with a hydraulic fluid, an operation valve operable to change a pilot pressure of a pilot fluid defining the hydraulic fluid supplied from the hydraulic pump to the hydraulic unit in accordance with an operation of an operation member, an actuation valve operable in accordance with a control signal to change a primary pressure defining the pilot pressure of the pilot fluid supplied from the hydraulic pump to the operation valve, and a controller configured or programmed to output the control signal based on a difference between the target rotation speed and the actual rotation speed to the actuation valve to control an opening of the actuation valve. The controller is configured or programmed to have modes including calculating the control signal based on the difference between the target rotation speed and the actual rotation speed, correcting the calculated control signal, and increasing or decreasing a target value for the primary pressure set in accordance with the control signal.

The controller may be configured or programmed to switch between a plurality of the modes.

The working machine may further include a pressure detector to detect a secondary pressure defining the pilot pressure output from the operation valve to the hydraulic unit. The controller may be configured or programmed to switch to one of the modes to perform a first correction involving correcting the control signal such that the target value for the primary pressure is changed in accordance with the secondary pressure detected by the pressure detector.

The first correction performed by the controller may involve correcting the control signal such that the target value for the primary pressure is reduced relative to the target value for the primary pressure corresponding to the control signal prior to the correction and is proportional to the secondary pressure detected by the pressure detector.

The control signal may be a current value output to the actuation valve. The controller may be configured or programmed to correct the current value prior to the correction in accordance with a gain value and may gradually change the gain value in the first correction to gradually correct the current value output to the actuation valve.

The controller may be configured or programmed to switch to one of the modes to perform a second correction involving correcting the control signal such that the target value for the primary pressure is higher than or equal to a primary pressure corresponding to the control signal prior to the correction in a case where an operational amount of the operation member is greater than or equal to a predetermined amount and the secondary pressure detected by the pressure detector is higher than or equal to a first threshold value.

The controller may be configured or programmed to switch to a first mode including performing the first correction in a case where the secondary pressure detected by the pressure detector is lower than the first threshold value and performing the second correction in a case where the secondary pressure detected by the pressure detector is higher than or equal to the first threshold value.

The working machine may further include a pressure detector to detect a secondary pressure defining the pilot pressure output from the operation valve to the hydraulic unit. The controller may be configured or programmed to switch to one of the modes to perform a third correction involving correcting the control signal such that the target value for the primary pressure is increased relative to the primary pressure corresponding to the control signal prior to the correction in a case where the secondary pressure detected by the pressure detector is lower than a second threshold value serving as a minimum pilot pressure outputtable from the operation valve.

The controller may be configured or programmed to switch to one of the modes to perform a third correction involving correcting the control signal such that the target value for the primary pressure is increased relative to the primary pressure corresponding to the control signal prior to the correction in a case where the secondary pressure detected by the pressure detector is lower than a second threshold value that serves as a minimum pilot pressure outputtable from the operation valve and that is smaller than the first threshold value. The controller may be configured or programmed to switch to a second mode including performing the third correction in a case where the secondary pressure detected by the pressure detector is lower than the second threshold value, performing the first correction in a case where the secondary pressure detected by the pressure detector is higher than or equal to the second threshold value and lower than the first threshold value, and performing the second correction in a case where the secondary pressure detected by the pressure detector is higher than or equal to the first threshold value.

The controller may be configured or programmed to switch to a third mode including performing a fourth correction involving correcting the control signal such that the target value for the primary pressure is increased relative to the target value for the primary pressure corresponding to the control signal prior to the correction.

The working machine may further include a pressure detector to detect a secondary pressure defining the pilot pressure output from the operation valve to the hydraulic unit. The fourth correction performed by the controller may involve correcting the control signal such that the target value for the primary pressure is increased in accordance with the secondary pressure detected by the pressure detector.

The fourth correction performed by the controller may involve correcting the control signal such that the target value for the primary pressure is increased relative to the target value for the primary pressure corresponding to the control signal prior to the correction and is proportional to the secondary pressure detected by the pressure detector.

The controller may be configured or programmed to switch to a fourth mode in a case where the difference between the target rotation speed and the actual rotation speed is larger than or equal to a third threshold value. The fourth mode may involve controlling the opening of the actuation valve based on the calculated control signal without correcting the control signal.

The working machine may further include a temperature detector to detect a temperature of the pilot fluid. The controller may be configured or programmed to switch to a fourth mode in a case where the temperature of the pilot fluid detected by the temperature detector is lower than a fourth threshold value. The fourth mode may involve controlling the opening of the actuation valve based on the calculated control signal without correcting the control signal.

The working machine may further include an operable switching member. The controller may be configured or programmed to switch to the mode in accordance with an operation of the switching member.

The hydraulic unit may include a traveling pump driven by the power from the prime mover, and a traveling motor rotated by the hydraulic fluid delivered by the traveling pump. The operation valve may be operable to change a secondary pressure defining the pilot pressure output to the traveling pump in accordance with an operation of the operation member. The traveling pump may be capable of changing a flow rate of the hydraulic fluid output in accordance with the secondary pressure changed by the operation valve. The traveling motor may operate in accordance with the flow rate of the hydraulic fluid output from the traveling pump.

The hydraulic unit may include a hydraulic actuator to actuate a working device, and a control valve to control the hydraulic fluid supplied to the hydraulic actuator. The operation valve may be operable to change a secondary pressure serving as the pilot pressure output to the control valve in accordance with an operation of the operation member. The control valve may be operable to change a flow rate of the hydraulic fluid output in accordance with the secondary pressure changed by the operation valve. The hydraulic actuator may actuate in accordance with the flow rate of the hydraulic fluid output from the control valve.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 9B illustrates the flow of a correction process in the first embodiment.

FIG. 14A illustrates an example of correction functions that define the relationship between a traveling pressure and a correction coefficient in the second embodiment.

DETAILED DESCRIPTION OF THE PREFERRED EMBODIMENTS

Figure 1:
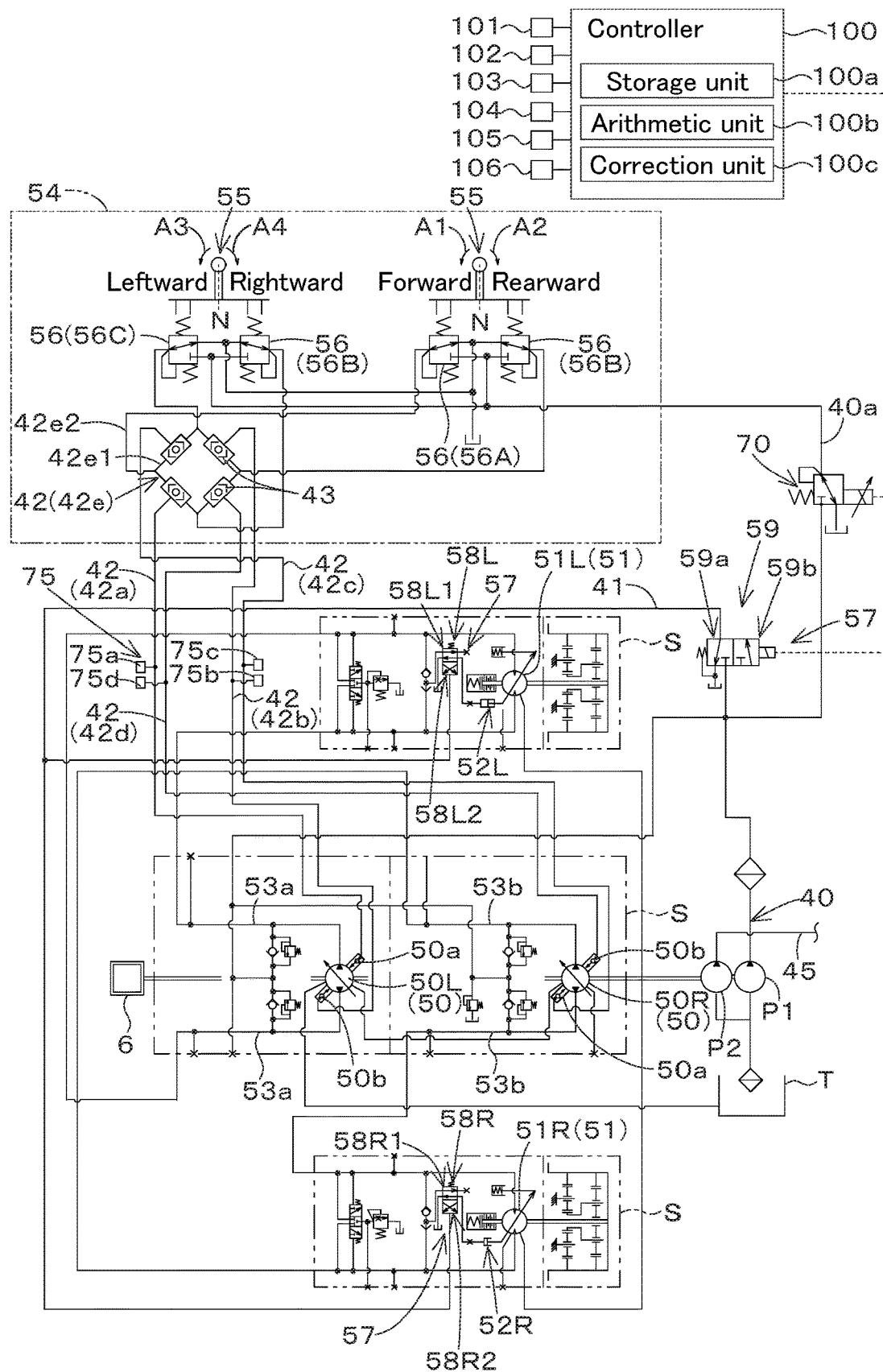
FIG. 1 illustrates a hydraulic circuit of a traveling system in a hydraulic system (hydraulic circuit) of a working machine according to a first embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Embodiments of the present invention will be described below with reference to the drawings.

First Embodiment

Figure 20:
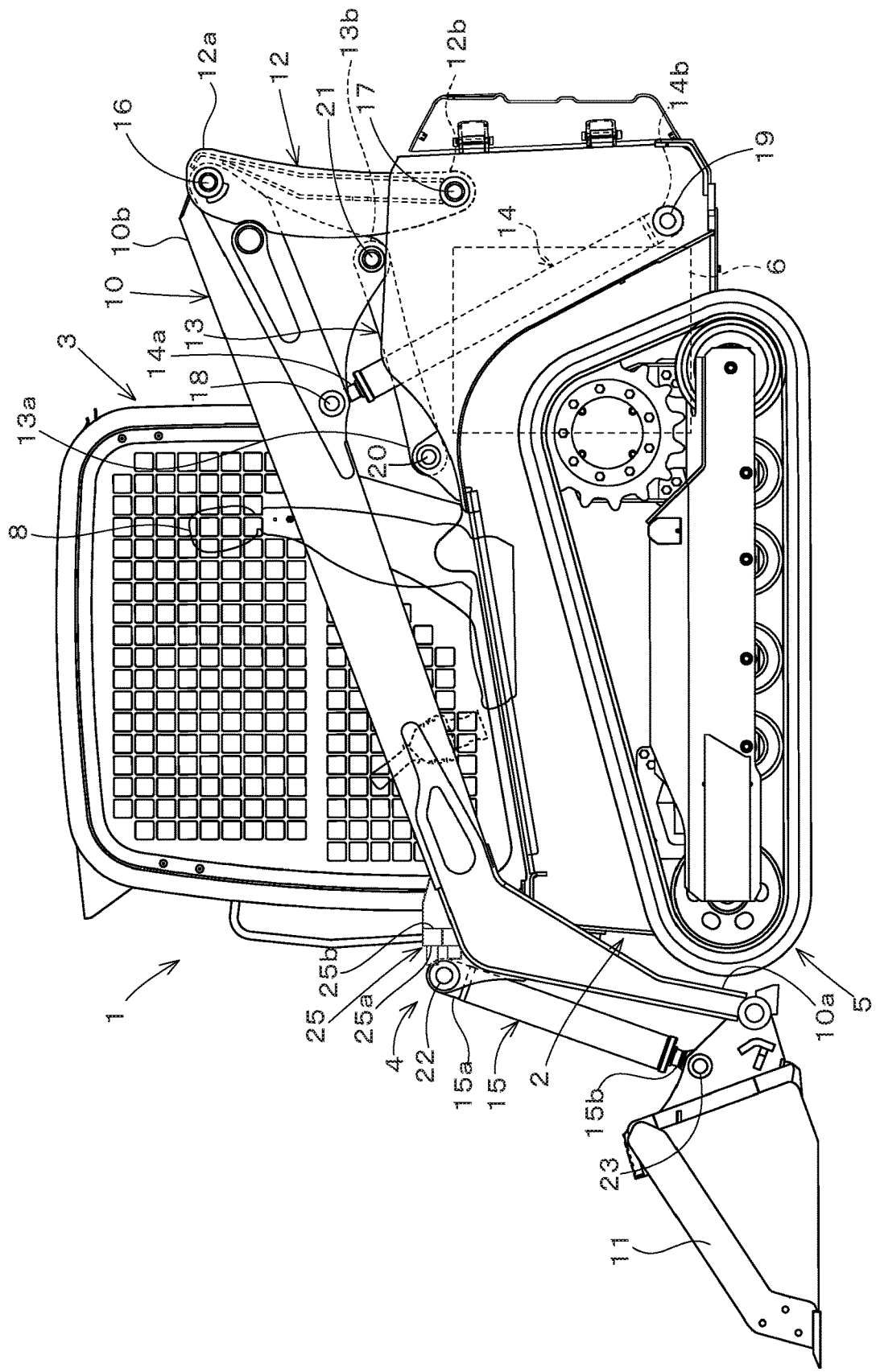
FIG. 20 is a side view illustrating a track loader as an example of a working machine.

FIG. 20 is a side view of a working machine 1 according to the present invention. In FIG. 20, a compact track loader is illustrated as an example of the working machine 1. However, the working machine 1 according to the present invention is not limited to a compact track loader and may be another type of a loader working machine, such as a skid-steer loader. Furthermore, the working machine 1 may be a working machine other than a loader working machine.

As illustrated in FIG. 20, the working machine 1 includes a machine body 2, a cabin 3, a working device 4, and traveling devices 5. In the embodiments according to the present invention, a direction (leftward in FIG. 20) that an operator sitting in an operator's seat 8 of the working machine 1 faces is defined as a forward direction, and a direction (rightward in FIG. 20) opposite therefrom is defined as a rearward direction. Furthermore, a direction (toward the near side in FIG. 20) extending leftward from the operator is defined as a leftward direction, and a direction (toward the far side in FIG. 20) extending rightward from the operator is defined as a rightward direction. The horizontal direction extending orthogonally to the front-rear direction is defined as a machine-body width direction.

The cabin 3 is mounted on the machine body 2. The cabin 3 is provided with the operator's seat 8. The working device 4 is attached to the machine body 2. The rear section inside the machine body 2 is equipped with a prime mover 6. The traveling devices 5 are provided outside the machine body 2. The traveling devices 5 include a first traveling device 5L provided at the left of the machine body 2 and a second traveling device 5R provided at the right of the machine body 2.

The working device 4 will be described in detail below with reference to FIG. 20. The working device 4 includes booms 10, a working tool 11, lift links 12, control links 13, boom cylinders 14, and bucket cylinders 15.

The booms 10 are respectively provided at the left and the right of the cabin 3 in a vertically pivotable manner. The working tool 11 is, for example, a bucket. The working tool 11 is provided in a vertically pivotable manner at first ends (front ends) 10a of the booms 10. The lift links 12 and the control links 13 support second ends (rear ends) 10b serving as ends opposite the first ends 10a of the booms 10 in a vertically pivotable manner. The boom cylinders 14 extend and retract to raise and lower the booms 10. The bucket cylinders 15 extend and retract to swing the working tool 11.

The first ends (front ends) 10a of the left boom 10 and the right boom 10 are coupled to each other by a circular coupling pipe (not illustrated). The second ends (rear ends) 10b of the left boom 10 and the right boom 10 are coupled to each other by a circular coupling pipe.

The lift links 12, the control links 13, and the boom cylinders 14 are respectively provided at the left and the right of the machine body 2 in correspondence with the left boom 10 and the right boom 10.

Each lift link 12 stands upright behind the second end 10b of the corresponding boom 10. A first end (upper end) 12a of the lift link 12 is pivotally supported toward the rear of the second end 10b of the boom 10 in a rotatable manner around a lateral axis via a pivot shaft 16. A second end (lower end) 12b serving as an end opposite the first end 12a of the lift link 12 is pivotally supported toward the rear of the machine body 2 in a rotatable manner around a lateral axis via a pivot shaft 17.

Each boom cylinder 14 has a first end (upper end) 14a that is pivotally supported in a rotatable manner around a lateral axis via a pivot shaft 18. The pivot shaft 18 is provided toward the front of the second end 10b of the boom 10. A second end (lower end) 14b serving as an end opposite the first end 14a of the boom cylinder 14 is pivotally supported in a rotatable manner around a lateral axis via a pivot shaft 19. The pivot shaft 19 is provided at a lower rear area of the machine body 2.

The control links 13 are provided forward of the lift links 12. Each control link 13 has a first end (front end) 13a that is pivotally supported in a rotatable manner around a lateral axis via a pivot shaft 20. The pivot shaft 20 is provided in the machine body 2 at a position forward of the lift link 12. A second end (rear end) 13b serving as an end opposite the first end 13a of the control link 13 is pivotally supported in a rotatable manner around a lateral axis via a pivot shaft 21. The pivot shaft 21 is provided in the boom 10 at a position forward of the pivot shaft 17 and above the pivot shaft 17.

Therefore, the booms 10 have the second ends 10b thereof supported by the lift links 12 and the control links 13, and pivot upward and downward around the pivot shafts 16 in accordance with extension and retraction of the boom cylinders 14. Accordingly, the first ends 10a of the booms 10 are raised and lowered. Furthermore, the control links 13 pivot upward and downward around the pivot shafts 20 as the booms 10 pivot upward and downward. The lift links 12 pivot upward and downward around the pivot shafts 17 as the control links 13 pivot upward and downward.

In FIG. 20, a bucket is attached as the working tool 11 to the first ends 10a of the booms 10. Alternatively, another working tool 11 is attachable to the first ends 10a of the booms 10 in place of a bucket. Another working tool 11 attachable to the first ends 10a of the booms 10 may be, for example, an attachment (auxiliary attachment), such as a hydraulic crusher, a hydraulic breaker, an angle broom, an earth auger, a pallet fork, a sweeper, a mower, or a snow blower. The auxiliary attachment has hydraulic devices, such as a hydraulic motor and a hydraulic cylinder, and operates in accordance with a supplied hydraulic fluid.

The first end 10a of the left boom 10 is provided with a connection member 25. The connection member 25 connects a first pipe (not illustrated) connected to the auxiliary attachment and a second pipe (not illustrated), such as a pipe provided in the boom 10, to each other. In detail, a first end (front end) 25a of the connection member 25 is connected to the first pipe connected to the auxiliary attachment. A second end (rear end) 25b serving as an end opposite the first end 25a is connected to the second pipe. Accordingly, a hydraulic fluid flowing through the second pipe is supplied to the auxiliary attachment through the first pipe.

The bucket cylinders 15 are disposed at the first ends 10a of the booms 10. Each bucket cylinder 15 has a first end (upper end) 15a that is pivotally supported in a rotatable manner around a lateral axis via a pivot shaft 22. The pivot shaft 22 is provided toward the rear of the first end 10a of the corresponding boom 10. A second end (lower end) 15b serving as an end opposite the first end 15a of the bucket cylinder 15 is pivotally supported in a rotatable manner around a lateral axis via a pivot shaft 23. The pivot shaft 23 is provided at an upper rear area of the working tool 11. Accordingly, the bucket cylinders 15 extend and retract to swing the working tool 11.

The left traveling device 5 (first traveling device 5L) and the right traveling device 5 (second traveling device 5R) are of a crawler type in this embodiment. The traveling devices 5 are not limited to the crawler type illustrated in FIG. 20. The traveling devices 5 may be of a semi-crawler type or a wheel type having front wheels and rear wheels.

The prime mover 6 is an internal combustion engine, such as a diesel engine or a gasoline engine, or an electric motor. In this embodiment, the prime mover 6 is a diesel engine but is not limited thereto.

As illustrated in FIG. 1, the working machine 1 includes a controller 100. The controller 100 is implemented by, for example, a program stored in an electrical-electronic circuit, a CPU, or an MPU. The controller 100 controls various devices included in the working machine 1. Furthermore, the controller 100 includes a storage unit 100a. The storage unit 100a is, for example, a nonvolatile memory and stores various control-related information of the controller 100.

A hydraulic system of the working machine 1 will be described below.

Figure 2:
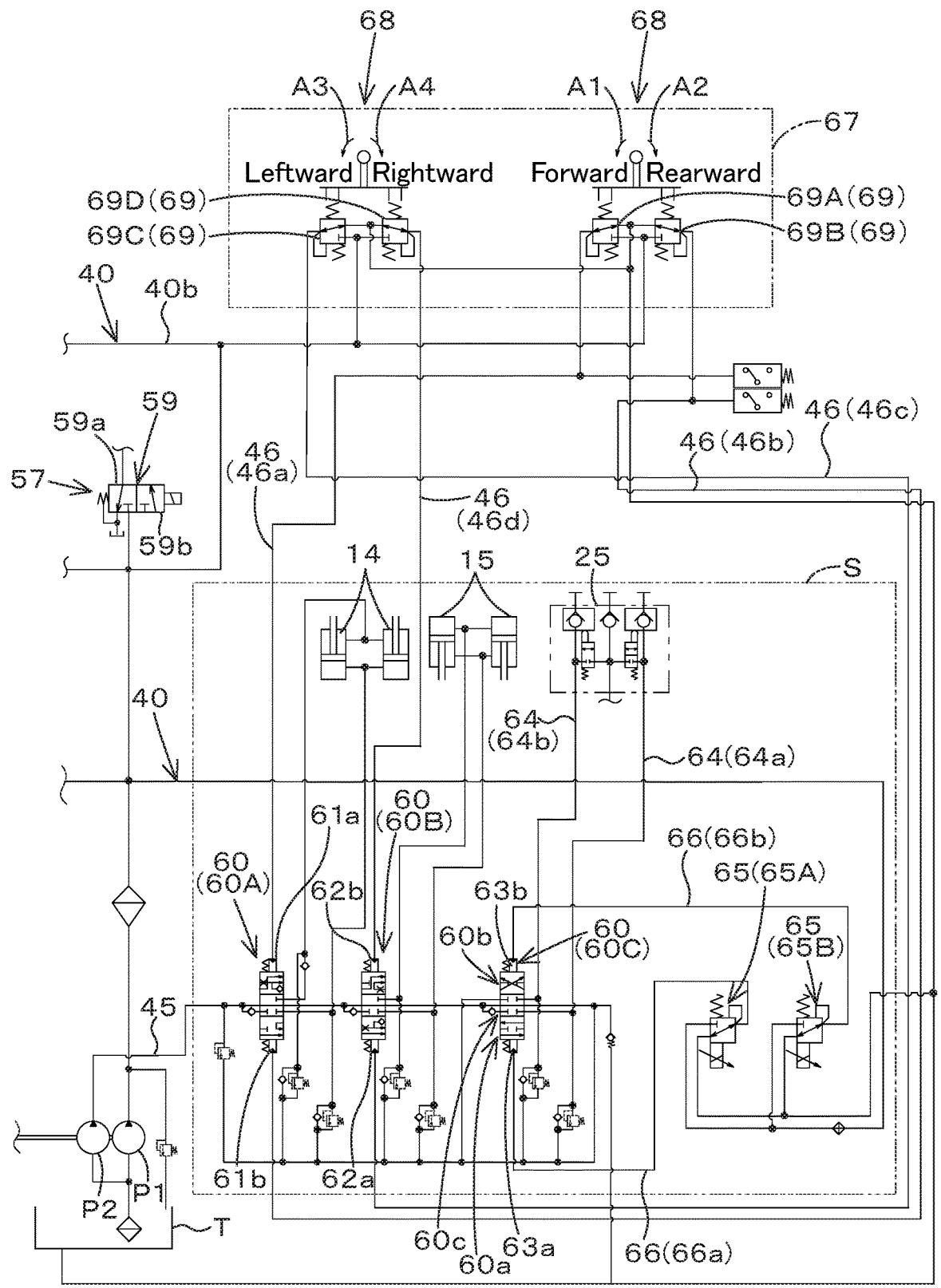
FIG. 2 illustrates a hydraulic circuit of a working system in the hydraulic system (hydraulic circuit) of the working machine according to the first embodiment.

As illustrated in FIG. 1 and FIG. 2, the working machine 1 includes a first hydraulic pump P1 and a second hydraulic pump P2. The first hydraulic pump P1 operates in accordance with the power from the prime mover 6 and delivers a hydraulic fluid. The first hydraulic pump P1 is a fixed displacement gear pump. In detail, the first hydraulic pump P1 is connected between a hydraulic fluid tank T and a delivery fluid passage 40 and is capable of delivering the hydraulic fluid stored in the hydraulic fluid tank T to the delivery fluid passage 40. In particular, the first hydraulic pump P1 mainly delivers a hydraulic fluid used for controlling the working machine 1.

In the following description, the first hydraulic pump P1 may sometimes be simply referred to as "hydraulic pump P1". Of the hydraulic fluid delivered from the first hydraulic pump P1, the hydraulic fluid used for controlling may sometimes be referred to as "pilot fluid", and the pressure of the pilot fluid may sometimes be referred to as "pilot pressure".

The second hydraulic pump P2 operates in accordance with the power from the prime mover 6 and delivers a hydraulic fluid. The second hydraulic pump P2 is a fixed displacement gear pump. The second hydraulic pump P2 is connected between the hydraulic fluid tank T and a main fluid passage 45 and is capable of delivering the hydraulic fluid stored in the hydraulic fluid tank T to the main fluid passage 45. In particular, the second hydraulic pump P2 supplies the hydraulic fluid to a hydraulic system of a working system to be described later.

A hydraulic system of a traveling system will be described below with reference to FIG. 1. The hydraulic system of the traveling system in the working machine 1 actuates the traveling devices 5. The working machine 1 includes traveling pumps 50 and traveling motors 51. The traveling pumps 50 and the traveling motors 51 operate in accordance with a hydraulic fluid.

The traveling pumps 50 operate in accordance with the power from the prime mover 6. In this embodiment, the traveling pumps 50 include a first traveling pump 50L and a second traveling pump 50R. In detail, the traveling pumps 50 are swash-plate variable displacement axial pumps that operate in accordance with the power from the prime mover 6. Each traveling pump 50 has a forward-movement pressure receiver 50a and a rearward-movement pressure receiver 50b that receive the pilot pressure. The swash-plate angle of the traveling pump 50 changes in accordance with the pilot pressure applied to the forward-movement pressure receiver 50a and the rearward-movement pressure receiver 50b. By changing the swash-plate angle of the traveling pump 50, the delivery amount (output) of the hydraulic fluid supplied from the delivery fluid passage 40 and the delivery direction of the hydraulic fluid can be changed.

The traveling motors 51 operate in accordance with the hydraulic fluid delivered from the traveling pumps 50 and transmit power to driving shafts of the traveling devices 5. In this embodiment, the traveling motors 51 include a first traveling motor 51L and a second traveling motor 51R.

The first traveling motor 51L transmits power to the driving shaft of the traveling device 5 (first traveling device 5L) provided at the left of the machine body 2. The first traveling motor 51L can be actuated in accordance with the hydraulic fluid delivered by the first traveling pump SOL. In detail, the first traveling motor 51L is connected to the first traveling pump SOL by a circulation fluid passage 53a. Therefore, the first traveling pump SOL can supply the hydraulic fluid to the first traveling motor 51L via the circulation fluid passage 53a.

The first traveling motor 51L can change its rotation speed based on the flow rate of the hydraulic fluid supplied from the first traveling pump SOL.

The first traveling motor 51L can also change its rotation speed between a first speed (predetermined low speed range) as a low speed and a second speed (predetermined high speed range) as a speed higher than the first speed. In this embodiment, the first traveling motor 51L causes a swash-plate switching cylinder 52L to extend and retract, so as to be capable of changing the rotation speed of the first traveling motor 51L. In detail, as illustrated in FIG. 1, the first traveling motor 51L is connected to the swash-plate switching cylinder 52L. When the swash-plate switching cylinder 52L is retracted, the rotation speed of the first traveling motor 51L is set to the first speed. In contrast, when the swash-plate switching cylinder 52L is extended, the rotation speed of the first traveling motor 51L is set to the second speed.

The second traveling motor 51R transmits power to the driving shaft of the traveling device 5 (second traveling device 5R) provided at the right of the machine body 2. The second traveling motor 51R can be actuated in accordance with the hydraulic fluid delivered by the second traveling pump 50R. In detail, the second traveling motor 51R is connected to the second traveling pump 50R by a circulation fluid passage 53b. Therefore, the second traveling pump 50R can supply the hydraulic fluid to the second traveling motor 51R via the circulation fluid passage 53b.

The second traveling motor 51R can change its rotation speed based on the flow rate of the hydraulic fluid supplied from the second traveling pump 50R.

The second traveling motor 51R can also change its rotation speed between a first speed (predetermined low speed range) as a low speed and a second speed (predetermined high speed range) as a speed higher than the first speed. In this embodiment, the second traveling motor 51R causes a swash-plate switching cylinder 52R to extend and retract, so as to be capable of changing the rotation speed of the second traveling motor 51R. In detail, as illustrated in FIG. 1, the second traveling motor 51R is connected to the swash-plate switching cylinder 52R. When the swash-plate switching cylinder 52R is retracted, the rotation speed of the second traveling motor 51R is set to the first speed. In contrast, when the swash-plate switching cylinder 52R is extended, the rotation speed of the second traveling motor 51R is set to the second speed.

A traveling-related operation of the working machine 1, that is, an operation (traveling operation) of the traveling devices 5, will be described in detail below. As illustrated in FIG. 1, the working machine 1 includes a traveling operation device (first operation device) 54.

The first operation device 54 operates the traveling pumps 50 (the first traveling pump 50L and the second traveling pump 50R). The first operation device 54 is capable of changing the swash-plate angle of each traveling pump 50 by changing the pilot pressure applied to the forward-movement pressure receiver 50a and the rearward-movement pressure receiver 50b. The first operation device 54 includes a first operation member (traveling lever) 55 and a plurality of first operation valves (traveling operation valves) 56.

The first operation member 55 is an operation lever that pivots in the left-right direction (machine-body width direction) or the front-rear direction. The first operation member 55 is supported by the first operation valves 56. With reference to a neutral position N, the first operation member 55 is operable forward (in the direction of an arrow A1 in FIG. 1) and rearward (in the direction of an arrow A2 in FIG. 1) from the neutral position N, and is also operable leftward (in the direction of an arrow A3 in FIG. 1) and rightward (in the direction of an arrow A4 in FIG. 1) from the neutral position N.

In other words, the first operation member 55 is pivotable in at least four directions with reference to the neutral position N. For the sake of convenience, the forward and rearward directions, that is, the front-rear direction, will be referred to as "first direction" in the following description of the first operation member 55. The leftward and rightward directions, that is, the left-right direction (machine-body width direction), may be referred to as "second direction".

The plurality of first operation valves 56 are actuated in accordance with an operation performed on the first operation member 55. In detail, the plurality of first operation valves 56 are connected to the delivery fluid passage 40 and can change the pressure (pilot pressure) of the pilot fluid serving as the hydraulic fluid supplied from the delivery fluid passage 40. The plurality of first operation valves 56 are operated by the same first operation member 55, that is, a single operation lever. The plurality of first operation valves 56 include a first pilot valve 56A, a second pilot valve 56B, a third pilot valve 56C, and a fourth pilot valve 56D.

In a case where the first operation member 55 is pivoted forward (toward one side) in the front-rear direction (first direction), that is, in a case where the first operation member 55 is operated forward, the first pilot valve 56A changes the pressure of the pilot fluid output in accordance with the amount of forward operation. In a case where the first operation member 55 is pivoted rearward (toward the other side) in the front-rear direction (first direction), that is, in a case where the first operation member 55 is operated rearward, the second pilot valve 56B changes the pressure of the pilot fluid output in accordance with the amount of rearward operation.

In a case where the first operation member 55 is pivoted leftward (toward one side) in the left-right direction (second direction), that is, in a case where the first operation member 55 is operated leftward, the third pilot valve 56C changes the pressure of the hydraulic fluid output in accordance with the amount of leftward operation. In a case where the first operation member 55 is pivoted rightward (toward the other side) in the left-right direction (second direction), that is, in a case where the first operation member 55 is operated rightward, the fourth pilot valve 56D changes the pressure of the pilot fluid output in accordance with the amount of rightward operation.

As illustrated in FIG. 1, the plurality of first operation valves 56 are connected to the traveling pumps 50 by traveling fluid passages 42. Specifically, the traveling pumps 50 are hydraulic devices that can be actuated in accordance with the pilot fluid output from the first operation valves 56 (the first pilot valve 56A, the second pilot valve 56B, the third pilot valve 56C, and the fourth pilot valve 56D).

As illustrated in FIG. 1, the traveling fluid passages 42 connect the plurality of first operation valves 56 to the traveling pumps 50. The traveling fluid passages 42 include a first traveling fluid passage 42a, a second traveling fluid passage 42b, a third traveling fluid passage 42c, a fourth traveling fluid passage 42d, and a fifth traveling fluid passage 42e.

The first traveling fluid passage 42a is connected to the forward-movement pressure receiver 50a of the first traveling pump 50L. The second traveling fluid passage 42b is connected to the rearward-movement pressure receiver 50b of the first traveling pump 50L. The third traveling fluid passage 42c is connected to the forward-movement pressure receiver 50a of the second traveling pump 50R. The fourth traveling fluid passage 42d is connected to the rearward-movement pressure receiver 50b of the second traveling pump 50R. The fifth traveling fluid passage 42e connects the first operation valves 56 to the first traveling fluid passage 42a, the second traveling fluid passage 42b, the third traveling fluid passage 42c, and the fourth traveling fluid passage 42d. Specifically, the fifth traveling fluid passage 42e includes a bridge 42e1 that is connected to the first traveling fluid passage 42a, the second traveling fluid passage 42b, the third traveling fluid passage 42c, and the fourth traveling fluid passage 42d and that has a plurality of shuttle valves 43, and also includes a coupling passage 45e2 that connects a merging point of the bridge 42e1 to the plurality of first operation valves 56.

When the first operation member 55 is pivoted forward (in the direction of the arrow A1 in FIG. 1), the first pilot valve 56A is operated, such that the first pilot valve 56A outputs a pilot fluid. The pressure (pilot pressure) of the pilot fluid output from the first pilot valve 56A is applied to the forward-movement pressure receiver 50a of the first traveling pump SOL via the fifth traveling fluid passage 42e and the first traveling fluid passage 42a. Moreover, the pressure (pilot pressure) of the pilot fluid output from the first pilot valve 56A is applied to the forward-movement pressure receiver 50a of the second traveling pump 50R via the fifth traveling fluid passage 42e and the third traveling fluid passage 42c. Accordingly, the swash-plate angles of the first traveling pump SOL and the second traveling pump 50R are changed, so that the first traveling motor 51L and the second traveling motor 51R operate in the direction of forward rotation, whereby the working machine 1 moves forward.

When the first operation member 55 is pivoted rearward (in the direction of the arrow A2 in FIG. 1), the second pilot valve 56B is operated, such that the second pilot valve 56B outputs a pilot fluid. The pressure (pilot pressure) of the pilot fluid output from the second pilot valve 56B is applied to the rearward-movement pressure receiver 50b of the first traveling pump 50L via the fifth traveling fluid passage 42e and the second traveling fluid passage 42b. Moreover, the pressure (pilot pressure) of the pilot fluid output from the second pilot valve 56B is applied to the rearward-movement pressure receiver 50b of the second traveling pump 50R via the fifth traveling fluid passage 42e and the fourth traveling fluid passage 42d. Accordingly, the swash-plate angles of the first traveling pump SOL and the second traveling pump 50R are changed, so that the first traveling motor 51L and the second traveling motor 51R operate in the direction of rearward rotation, whereby the working machine 1 moves rearward.

When the first operation member 55 is pivoted leftward (in the direction of the arrow A3 in FIG. 1), the third pilot valve 56C is operated, such that the third pilot valve 56C outputs a pilot fluid. The pressure (pilot pressure) of the pilot fluid output from the third pilot valve 56C is applied to the forward-movement pressure receiver 50a of the second traveling pump 50R via the fifth traveling fluid passage 42e and the third traveling fluid passage 42c. Moreover, the pressure (pilot pressure) of the pilot fluid output from the third pilot valve 56C is applied to the rearward-movement pressure receiver 50b of the first traveling pump SOL via the fifth traveling fluid passage 42e and the second traveling fluid passage 42b. Accordingly, the swash-plate angles of the first traveling pump SOL and the second traveling pump 50R are changed, so that the first traveling motor 51L operates in the direction of reverse rotation and the second traveling motor 51R operates in the direction of forward rotation, whereby the working machine 1 swivels leftward.

When the first operation member 55 is pivoted rightward (in the direction of the arrow A4 in FIG. 1), the fourth pilot valve 56D is operated, such that the fourth pilot valve 56D outputs a pilot fluid. The pressure (pilot pressure) of the pilot fluid output from the fourth pilot valve 56D is applied to the forward-movement pressure receiver 50a of the first traveling pump SOL via the fifth traveling fluid passage 42e and the first traveling fluid passage 42a. Moreover, the pressure (pilot pressure) of the pilot fluid output from the fourth pilot valve 56D is applied to the rearward-movement pressure receiver 50b of the second traveling pump 50R via the fifth traveling fluid passage 42e and the fourth traveling fluid passage 42d. Accordingly, the swash-plate angles of the first traveling pump 50L and the second traveling pump 50R are changed, so that the first traveling motor 51L operates in the direction of forward rotation and the second traveling motor 51R operates in the direction of reverse rotation, whereby the working machine 1 swivels rightward.

Furthermore, when the first operation member 55 is pivoted in a diagonal direction, the rotational direction and the rotation speed of the first traveling motor 51L and the second traveling motor 51R are determined in accordance with a pressure difference between pilot pressures applied to the forward-movement pressure receiver 50a and the rearward-movement pressure receiver 50b, such that the working machine 1 swivels rightward or leftward while moving forward or rearward.

Specifically, when the first operation member 55 is pivoted diagonally leftward and forward, the working machine 1 swivels leftward while moving forward at a speed corresponding to the pivot angle of the first operation member 55. When the first operation member 55 is pivoted diagonally rightward and forward, the working machine 1 swivels rightward while moving forward at a speed corresponding to the pivot angle of the first operation member 55. When the first operation member 55 is pivoted diagonally leftward and rearward, the working machine 1 swivels leftward while moving rearward at a speed corresponding to the pivot angle of the first operation member 55. When the first operation member 55 is pivoted diagonally rightward and rearward, the working machine 1 swivels rightward while moving rearward at a speed corresponding to the pivot angle of the first operation member 55.

As illustrated in FIG. 1, the working machine 1 includes traveling switching valves 57. The traveling switching valves 57 are switchable between a first mode in which the rotation speed of the traveling motors 51 is set to a first speed and a second mode in which the rotation speed of the traveling motors 51 is set to a second speed. The traveling switching valves 57 include first switching valves 58L and 58R and a second switching valve 59.

The first switching valve 58L is a two-position switching valve that switches between a first position 58L1 and a second position 58L2. The first switching valve 58L is connected to the swash-plate switching cylinder 52L via a fluid passage. When in the first position 58L1, the first switching valve 58L stops supplying the hydraulic fluid to the swash-plate switching cylinder 52L to cause the swash-plate switching cylinder 52L to retract. In contrast, when in the second position 58L2, the first switching valve 58L supplies the hydraulic fluid to the swash-plate switching cylinder 52L to cause the swash-plate switching cylinder 52L to extend.

The first switching valve 58R is a two-position switching valve that switches between a first position 58R1 and a second position 58R2. The first switching valve 58R is connected to the swash-plate switching cylinder 52R via a fluid passage. When in the first position 58R1, the first switching valve 58R stops supplying the hydraulic fluid to the swash-plate switching cylinder 52R to cause the swash-plate switching cylinder 52R to retract. In contrast, when in the second position 58R2, the first switching valve 58R supplies the hydraulic fluid to the swash-plate switching cylinder 52R to cause the swash-plate switching cylinder 52R to extend.

The second switching valve 59 is a solenoid valve that switches between a switching position of the first switching valve 58L and a switching position of the first switching valve 58R. In detail, the second switching valve 59 is a two-position switching valve switchable between a first position 59a and a second position 59b by being energized. As illustrated in FIG. 1, the second switching valve 59 is connected to the first switching valve 58L and the first switching valve 58R by a fluid passage 41. When in the first position 59a, the second switching valve 59 supplies the hydraulic fluid to a pressure receiver of the first switching valve 58L and a pressure receiver of the first switching valve 58R, so as to switch the first switching valve 58L to the first position 58L1 and to switch the first switching valve 58R to the first position 58R1. In contrast, when in the second position 59b, the second switching valve 59 stops supplying the hydraulic fluid to the pressure receiver of the first switching valve 58L and the pressure receiver of the first switching valve 58R, so as to switch the first switching valve 58L to the second position 58L2 and to switch the first switching valve 58R to the second position 58R2.

In other words, when the second switching valve 59 is in the first position 59a, the traveling switching valves 57 are set in the first mode, the swash-plate switching cylinders 52L and 52R are retracted, and the rotation speed of the traveling motors 51 (the first traveling motor 51L and the second traveling motor 51R) is switched to the first speed. In contrast, when the second switching valve 59 is in the second position 59b, the traveling switching valves 57 are set in the second mode, the swash-plate switching cylinders 52L and 52R are extended, and the rotation speed of the traveling motors 51 (the first traveling motor 51L and the second traveling motor 51R) is switched to the second speed.

Accordingly, the traveling switching valves 57 are capable of switching the traveling motors 51 (the first traveling motor 51L and the second traveling motor 51R) between the first speed and the second speed.

As illustrated in FIG. 1, the working machine 1 includes a switching tool (speed operation actuator) 101 operable by the operator. The switching tool 101 is a switch used for switching the traveling motors 51 (the first traveling motor 51L and the second traveling motor 51R) between the first speed and the second speed. The switching tool 101 is connected to the controller 100, is operated by the operator, and inputs an operation signal to the controller 100. Based on the switching operation performed on the switching tool 101, the controller 100 outputs a control signal (e.g., a voltage or a current) to the traveling switching valves 57 to switch the traveling switching valves 57 between the first mode and the second mode.

Accordingly, the switching tool (switch) 101 can be used for performing a switching operation for switching the traveling switching valves 57 from the first mode to the second mode and a switching operation for switching the traveling switching valves 57 from the second mode to the first mode. Specifically, the switching tool 101 can be operated for performing a speed-increasing operation involving switching the traveling motors 51 (the first traveling motor 51L and the second traveling motor 51R) from the first speed to the second speed and a speed-decreasing operation involving switching the traveling motors 51 (the first traveling motor 51L and the second traveling motor 51R) from the second speed (second mode) to the first speed (first mode).

The hydraulic system of the working system will now be described with reference to FIG. 2. The hydraulic system of the working system in the working machine 1 actuates the working device 4. As illustrated in FIG. 2, the working machine 1 includes a plurality of control valves 60. The plurality of control valves 60 are capable of controlling a hydraulic actuator. In detail, the plurality of control valves 60 are connected to the main fluid passage 45 and can change the delivery amount (output) of the hydraulic fluid supplied from the main fluid passage 45 and the delivery direction of the hydraulic fluid in accordance with the applied pilot pressure. Accordingly, the plurality of control valves 60 control the hydraulic actuator.

In this embodiment, the plurality of control valves 60 include a first control valve 60A, a second control valve 60B, and a third control valve 60C.

The first control valve 60A controls the hydraulic cylinders (boom cylinders) 14 that control the booms 10. The first control valve 60A is a pilot-type linear-spool three-position switching valve. The first control valve 60A has pressure receivers 61a and 61b and switches among a third position (neutral position), a first position different from the third position, and a second position different from the third position and the first position in accordance with the pilot pressure applied to the pressure receivers 61a and 61b. Accordingly, the first control valve 60A can change the delivery amount (output) of the hydraulic fluid supplied from the main fluid passage 45 and the delivery direction of the hydraulic fluid. The first control valve 60A is connected to the boom cylinders 14 by fluid passages.

The second control valve 60B controls the hydraulic cylinders (bucket cylinders) 15 that control the working tool 11. The second control valve 60B is a pilot-type linear-spool three-position switching valve. The second control valve 60B has pressure receivers 62a and 62b and switches among a third position (neutral position), a first position different from the third position, and a second position different from the third position and the first position in accordance with the pilot pressure applied to the pressure receivers 62a and 62b. Accordingly, the second control valve 60B can change the delivery amount (output) of the hydraulic fluid supplied from the main fluid passage 45 and the delivery direction of the hydraulic fluid. The second control valve 60B is connected to the bucket cylinders 15 by fluid passages.

The third control valve 60C controls the hydraulic devices of the auxiliary attachment. The third control valve 60C is a pilot-type linear-spool three-position switching valve. The third control valve 60C has pressure receivers 63a and 63b and switches among a third position (neutral position) 60c, a first position 60a different from the third position 60c, and a second position 60b different from the third position 60c and the first position 60a in accordance with the pilot pressure applied to the pressure receivers 63a and 63b. Accordingly, the third control valve 60C can change the delivery amount (output) of the hydraulic fluid supplied from the main fluid passage 45 and the delivery direction of the hydraulic fluid. The third control valve 60C is connected to the auxiliary attachment by a supply-drain fluid passage 64.

The supply-drain fluid passage 64 has a first end that is connected to a supply-drain port of the third control valve 60C and a second end that is opposite the first end and that is connected to the hydraulic devices of the auxiliary attachment. The connection member 25 is provided at an intermediate point of the supply-drain fluid passage 64. Specifically, the supply-drain fluid passage 64 includes a first supply-drain fluid passage 64a that connects a first supply-drain port of the third control valve 60C and a first port of the connection member 25 to each other. Furthermore, the supply-drain fluid passage 64 includes a second supply-drain fluid passage 64b that connects a second supply-drain port of the third control valve 60C and a second port of the connection member 25 to each other. Therefore, by switching from the third position 60c to the first position 60a, the third control valve 60C supplies the hydraulic fluid toward the first supply-drain fluid passage 64a and stops supplying the hydraulic fluid toward the second supply-drain fluid passage 64b. On the other hand, by switching from the third position 60c to the second position 60b, the third control valve 60C stops supplying the hydraulic fluid toward the first supply-drain fluid passage 64a and supplies the hydraulic fluid toward the second supply-drain fluid passage 64b.

As illustrated in FIG. 2, the working machine 1 includes a plurality of proportional valves 65. The proportional valves 65 operate the third control valve 60C. In detail, each proportional valve 65 is a solenoid valve whose opening is changeable by being energized. The proportional valves 65 are connected to the delivery fluid passage 40 and can change the pressure (pilot pressure) of the pilot fluid serving as the hydraulic fluid supplied from the delivery fluid passage 40. In this embodiment, the plurality of proportional valves 65 include a first proportional valve 65A and a second proportional valve 65B.

The proportional valves 65 are connected to the third control valve 60C by control fluid passages 66. The control fluid passages 66 allow the pilot fluid supplied from the proportional valves 65 (the first proportional valve 65A and the second proportional valve 65B) to flow to the third control valve 60C. In detail, the control fluid passages 66 include a first control fluid passage 66a that connects the first proportional valve 65A and the pressure receiver 63a of the third control valve 60C to each other, and a second control fluid passage 66b that connects the second proportional valve 65B and the pressure receiver 63b of the third control valve 60C to each other.

Therefore, when the opening of the first proportional valve 65A is greater than zero, the first proportional valve 65A allows the pilot fluid supplied from the delivery fluid passage 40 to flow through the first control fluid passage 66a. Thus, the pilot fluid flowing through the first control fluid passage 66a is applied to the pressure receiver 63a of the third control valve 60C. Specifically, the pilot pressure acting on (applied to) the pressure receiver 63a is determined in accordance with the opening of the first proportional valve 65A. When the pilot pressure acting on the pressure receiver 63a is higher than or equal to a predetermined value, the spool moves, so that the third control valve 60C switches from the third position 60c to the first position 60a.

On the other hand, when the opening of the second proportional valve 65B is greater than zero, the second proportional valve 65B allows the pilot fluid supplied from the delivery fluid passage 40 to flow through the second control fluid passage 66b. Thus, the pilot fluid flowing through the second control fluid passage 66b is applied to the pressure receiver 63b of the third control valve 60C. Specifically, the pilot pressure acting on (applied to) the pressure receiver 63b is determined in accordance with the opening of the second proportional valve 65B. When the pilot pressure acting on the pressure receiver 63b is higher than or equal to a predetermined value, the spool moves, so that the third control valve 60C switches from the third position 60c to the second position 60b.

A working-related operation of the working machine 1, that is, an operation (working operation) of the working device 4, will be described in detail below. As illustrated in FIG. 2, the working machine 1 includes a working operation device (second operation device) 67.

The working operation device 67 operates hydraulic actuators of the working system, such as the boom cylinders 14 and the bucket cylinders 15. Specifically, by changing the pilot pressure applied to the pressure receivers 61a and 61b of the first control valve 60A, the pressure receivers 62a and 62b of the second control valve 60B, and the pressure receivers 63a and 63b of the third control valve 60C, the working operation device 67 can change the delivery amount (output) of the hydraulic fluid supplied to the boom cylinders 14 and the bucket cylinders 15 and the delivery direction of the hydraulic fluid. The working operation device 67 includes a second operation member (working lever) 68 and a plurality of second operation valves (working operation valves) 69.

The second operation member 68 is an operation lever that pivots in the left-right direction (machine-body width direction) and the front-rear direction. The second operation member 68 is supported by the second operation valves 69. With reference to the neutral position N, the second operation member 68 is operable forward (in the direction of the arrow A1 in FIG. 2) and rearward (in the direction of the arrow A2 in FIG. 2) from the neutral position N, and is also operable leftward (in the direction of the arrow A3 in FIG. 2) and rightward (in the direction of the arrow A4 in FIG. 2) from the neutral position N. In other words, the second operation member 68 is pivotable in at least four directions with reference to the neutral position N. For the sake of convenience, the forward and rearward directions, that is, the front-rear direction, will be referred to as "first direction" in the following description of the second operation member 68. The leftward and rightward directions, that is, the left-right direction (machine-body width direction), may be referred to as "second direction".

The plurality of second operation valves 69 are actuated in accordance with an operation performed on the second operation member 68. In detail, the plurality of second operation valves 69 are connected to the delivery fluid passage 40 and can change the pressure (pilot pressure) of the pilot fluid serving as the hydraulic fluid supplied from the delivery fluid passage 40. The plurality of second operation valves 69 are operated by the same second operation member 68, that is, a single operation lever. The plurality of second operation valves 69 include a first pilot valve 69A, a second pilot valve 69B, a third pilot valve 69C, and a fourth pilot valve 69D.

In a case where the second operation member 68 is pivoted forward (toward one side) in the front-rear direction (first direction), that is, in a case where the second operation member 68 is operated forward, the first pilot valve (lowering pilot valve) 69A changes the pressure of the pilot fluid output in accordance with the amount of forward operation. In a case where the second operation member 68 is pivoted rearward (toward the other side) in the front-rear direction (first direction), that is, in a case where the second operation member 68 is operated rearward, the second pilot valve (raising pilot valve) 69B changes the pressure of the pilot fluid output in accordance with the amount of rearward operation.

In a case where the second operation member 68 is pivoted leftward (toward one side) in the left-right direction (second direction), that is, in a case where the second operation member 68 is operated leftward, the third pilot valve (bucket-shoveling pilot valve) 69C changes the pressure of the hydraulic fluid output in accordance with the amount of leftward operation. In a case where the second operation member 68 is pivoted rightward (toward the other side) in the left-right direction (second direction), that is, in a case where the second operation member 68 is operated rightward, the fourth pilot valve (bucket-dumping pilot valve) 69D changes the pressure of the pilot fluid output in accordance with the amount of rightward operation.

As illustrated in FIG. 2, the plurality of second operation valves 69 are connected to the plurality of control valves 60 by working fluid passages 46. Specifically, the traveling pumps 50 are hydraulic devices that can be actuated in accordance with the pilot fluid output from the second operation valves 69 (the first pilot valve 69A, the second pilot valve 69B, the third pilot valve 69C, and the fourth pilot valve 69D).

As illustrated in FIG. 2, the working fluid passages 46 connect the plurality of second operation valves 69 to the plurality of control valves 60. The working fluid passages 46 include a first working fluid passage 46a, a second working fluid passage 46b, a third working fluid passage 46c, and a fourth working fluid passage 46d.

The first working fluid passage 46a connects the first pilot valve 69A and the pressure receiver 61a of the first control valve 60A to each other. The second working fluid passage 46b connects the second pilot valve 69B and the pressure receiver 61b of the first control valve 60A to each other. The third working fluid passage 46c connects the third pilot valve 69C and the pressure receiver 62a of the second control valve 60B to each other. The fourth working fluid passage 46d connects the fourth pilot valve 69D and the pressure receiver 62b of the second control valve 60B to each other.

When the second operation member 68 is pivoted forward (in the direction of the arrow A1 in FIG. 2), the first pilot valve 69A is operated, such that the first pilot valve 69A outputs a pilot fluid. The pressure (pilot pressure) of the pilot fluid output from the first pilot valve 69A is applied to a pressure receiver 55a of the first control valve 60A via the first working fluid passage 46a. Accordingly, the first control valve 60A can change the delivery amount (output) of the hydraulic fluid delivered by the second hydraulic pump P2 and supplied from the delivery fluid passage 40 and the delivery direction of the hydraulic fluid. Thus, the boom cylinders 14 are retracted, whereby the booms 10 are lowered.

When the second operation member 68 is pivoted rearward (in the direction of the arrow A2 in FIG. 2), the second pilot valve 69B is operated, such that the second pilot valve 69B outputs a pilot fluid. The pressure (pilot pressure) of the pilot fluid output from the second pilot valve 69B is applied to a pressure receiver 55b of the first control valve 60A via the second working fluid passage 46b. Accordingly, the first control valve 60A can change the delivery amount (output) of the hydraulic fluid delivered by the second hydraulic pump P2 and supplied from the delivery fluid passage 40 and the delivery direction of the hydraulic fluid. Thus, the boom cylinders 14 are extended, whereby the booms 10 are raised.

When the second operation member 68 is pivoted leftward (in the direction of the arrow A3 in FIG. 2), the third pilot valve 69C is operated, such that the third pilot valve 69C outputs a pilot fluid. The pressure (pilot pressure) of the pilot fluid output from the third pilot valve 69C is applied to the pressure receiver 55a of the second control valve 60B via the third working fluid passage 46c. Accordingly, the second control valve 60B can change the delivery amount (output) of the hydraulic fluid delivered by the second hydraulic pump P2 and supplied from the delivery fluid passage 40 and the delivery direction of the hydraulic fluid. Thus, the bucket cylinders 15 are retracted, whereby the working tool (bucket) 11 moves in a shoveling motion.

When the second operation member 68 is pivoted rightward (in the direction of the arrow A4 in FIG. 2), the fourth pilot valve 69D is operated, such that the fourth pilot valve 69D outputs a pilot fluid. The pressure (pilot pressure) of the pilot fluid output from the fourth pilot valve 69D is applied to the pressure receiver 55b of the second control valve 60B via the fourth working fluid passage 46d. Accordingly, the second control valve 60B can change the delivery amount (output) of the hydraulic fluid delivered by the second hydraulic pump P2 and supplied from the delivery fluid passage 40 and the delivery direction of the hydraulic fluid. Thus, the bucket cylinders 15 are extended, whereby the working tool (bucket) 11 moves in a dumping motion.

As illustrated in FIG. 1, the working machine 1 includes a third operation member (auxiliary operation member) 102 operable by the operator. The third operation member 102 is a switch used for operating the auxiliary attachment. The third operation member 102 is operated by the operator and inputs an operation signal to the controller 100. Based on the switching operation performed on the third operation member 102, the controller 100 outputs a control signal (e.g., a voltage or a current) to the proportional valves 65 (the first proportional valve 65A and the second proportional valve 65B) so as to operate (open and close) the proportional valves 65. The third operation member 102 is, for example, a pivotable seesaw switch, a slidable switch, or a pushable switch. Specifically, the controller 100 inputs a signal corresponding to an amount by which the third operation member 102 is operated (slid or pivoted) as a control signal to the proportional valves 65. In this embodiment, when the third operation member 102 is operated, the controller 100 applies an electric current according to the operational amount of the third operation member 102 to a solenoid of the first proportional valve 65A or a solenoid of the second proportional valve 65B.

For example, in a case where the third operation member 102 is pivoted or slid in the first direction, the controller 100 adjusts the opening of the first proportional valve 65A based on the operation. A pilot fluid is supplied from the first proportional valve 65A to the pressure receiver 61a of the third control valve 60C. When the pilot pressure applied to the pressure receiver 63a becomes higher than or equal to a predetermined value, the spool moves so that the third control valve 60C switches from the third position 60c to the first position 60a. Accordingly, the third control valve 60C can change the delivery amount (output) of the hydraulic fluid delivered by the second hydraulic pump P2 and supplied from the delivery fluid passage 40 and the delivery direction of the hydraulic fluid. Thus, the third control valve 60C can supply the hydraulic fluid to the hydraulic devices, such as the hydraulic motor and the hydraulic cylinder, of the auxiliary attachment, and actuate the auxiliary attachment.

In a case where the third operation member 102 is pivoted or slid in the second direction opposite from the first direction, the controller 100 adjusts the opening of the second proportional valve 65B based on the operation. A pilot fluid is supplied from the second proportional valve 65B to the pressure receiver 63b of the third control valve 60C. When the pilot pressure applied to the pressure receiver 63b becomes higher than or equal to a predetermined value, the spool moves so that the third control valve 60C switches from the third position 60c to the second position 60b. Thus, the third control valve 60C can supply the hydraulic fluid to the hydraulic devices, such as the hydraulic motor and the hydraulic cylinder, of the auxiliary attachment, and actuate the auxiliary attachment.

The working machine 1 according to the present invention can suppress an engine stall by reducing the output from a hydraulic unit S included in the working machine 1 and driven by the hydraulic fluid. In detail, the working machine 1 includes an operation valve that can change the pilot pressure of the pilot fluid supplied to the hydraulic unit S in accordance with an operation of an operation member. The working machine 1 changes the pilot pressure (primary pressure) of the pilot fluid supplied to the operation valve and thus reduces the output from the hydraulic unit S, thereby suppressing an engine stall. In this embodiment, the hydraulic unit S includes the traveling pumps 50 and the traveling motors 51. The operation member is the first operation member 55, and the operation valve includes the first operation valves 56. The anti-stall control will be described in detail below.

As illustrated in FIG. 1, the working machine 1 includes a rotation-speed operation actuator (accelerator) 103 and a rotation detector 104. The rotation-speed operation actuator 103 controls a target rotation speed of the prime mover 6. The rotation-speed operation actuator 103 is connected to the controller 100 and inputs an operation signal to the controller 100. The rotation-speed operation actuator 103 is provided near the operator's seat 8. The rotation-speed operation actuator 103 is, for example, a pivotably-supported accelerator lever, a pivotably-supported accelerator pedal, a rotatably-supported accelerator volume, or a slidably-supported accelerator slider. The rotation-speed operation actuator 103 is not limited to the above examples.

The rotation detector 104 is, for example, a sensor that detects an actual rotation speed (actual prime-mover rotation speed) of the prime mover 6. The rotation detector 104 is connected to the controller 100 and inputs a detected signal (detection signal) to the controller 100.

The controller 100 performs control for suppressing a stoppage of the prime mover 6, that is, control (anti-stall control) for suppressing an engine stall, based on a difference (drop rotation speed) between the target rotation speed controlled by the rotation-speed operation actuator 103 and the actual rotation speed detected by the rotation detector 104. In this embodiment, if the drop rotation speed is higher than or equal to a set value (referred to as "first set value" hereinafter) in the anti-stall control, the controller 100 reduces the output from the traveling pumps 50 to suppress an engine stall.

As illustrated in FIG. 1, the working machine 1 includes an actuation valve 70. The actuation valve 70 is capable of changing the pilot pressure of the pilot fluid that actuates the traveling pumps 50. The actuation valve 70 is provided in the delivery fluid passage 40 and changes the pilot pressure (primary pressure) of the pilot fluid supplied from the delivery fluid passage 40 to the first operation device 54 (the plurality of first operation valves 56). In this embodiment, the delivery fluid passage 40 bifurcates at an intermediate point and connects to the plurality of first operation valves 56 and the plurality of second operation valves 69. Of the delivery fluid passage 40, the actuation valve 70 is provided in a fluid passage 40a that is connected to the plurality of first operation valves 56.

Of the delivery fluid passage 40, the fluid passage connected to the plurality of first operation valves 56 may be referred to as "first delivery fluid passage 40a" and the fluid passage connected to the plurality of second operation valves 69 may be referred to as "second delivery fluid passage 40b" in the following description.

The actuation valve 70 is actuated in accordance with a control signal (e.g., a voltage or a current) of the controller 100 and changes its opening, thereby changing the pilot pressure (primary pressure) of the pilot fluid supplied from the delivery fluid passage 40 to the first operation device 54 (the plurality of first operation valves 56). The following description relates to a case where the control signal of the controller 100 is an electric current, and a current value output as the control signal of the controller 100 will be referred to as "command current value". The opening of a solenoid valve serving as the actuation valve 70 can be increased in proportion to the magnitude of the command current value.

Specifically, the primary pressure is changed in accordance with the control signal output from the controller 100 to the actuation valve 70. In this embodiment, the controller 100 outputs the command current value to the actuation valve 70, so that the primary pressure is changed in accordance with the magnitude of the command current value output from the controller 100 to the actuation valve 70. In detail, when the command current value output from the controller 100 to the actuation valve 70 increases, the opening of the actuation valve 70 increases, so that the primary pressure increases. In contrast, when the command current value output from the controller 100 to the actuation valve 70 decreases, the opening of the actuation valve 70 decreases, so that the primary pressure decreases.

Figure 3:
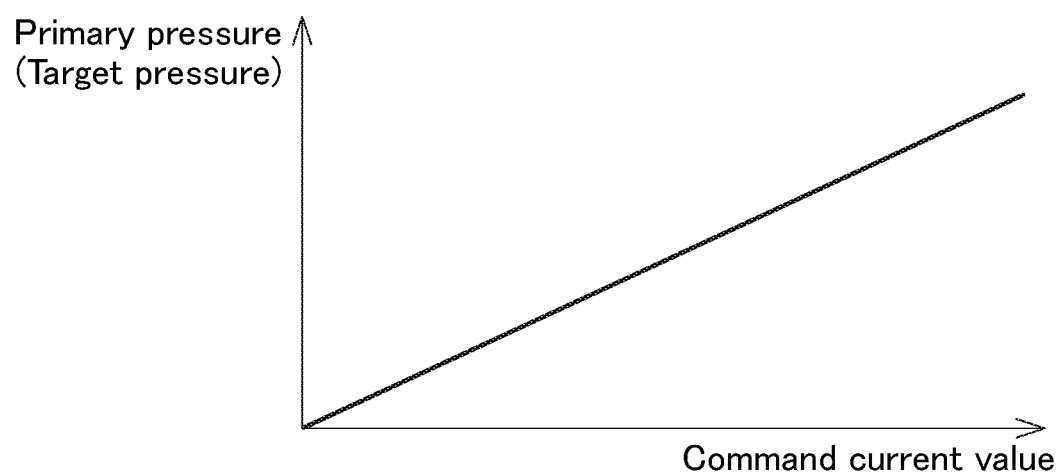
FIG. 3 illustrates an example of the relationship between a control signal (command current value) and a primary pressure.

Specifically, as illustrated in FIG. 3, there is a proportional relationship or a correspondence relationship (correlation) close to a proportional relationship between the command current value and the primary pressure. Therefore, the controller 100 changes the command current value serving as the control signal output to the actuation valve 70, so as to be capable of changing a target pressure for the pilot pressure (primary pressure) of the pilot fluid supplied to the plurality of first operation valves 56.

As illustrated in FIG. 1, the working machine 1 includes a pressure detector 75. The pressure detector 75 detects the pilot pressure (secondary pressure) of the pilot fluid supplied to the traveling pumps 50 (hydraulic unit S) from the plurality of first operation valves 56. For the sake of convenience, the pressure detector 75 will be referred to as "first pressure detector 75". The first pressure detector 75 is connected to the controller 100 and inputs a detected signal (detection signal) to the controller 100. The first pressure detector 75 is, for example, a pressure sensor that detects the secondary pressure output from the first operation valves 56, is provided in the traveling fluid passages 42, and detects the pilot pressure (secondary pressure) of the pilot fluid flowing through the traveling fluid passages 42. In detail, the first pressure detector 75 includes a first pressure detection unit 75a, a second pressure detection unit 75b, a third pressure detection unit 75c, and a fourth pressure detection unit 75d.

The first pressure detection unit 75a is provided in the first traveling fluid passage 42a and is capable of detecting the pressure (first pilot pressure) of the pilot fluid flowing through the first traveling fluid passage 42a. The second pressure detection unit 75b is provided in the second traveling fluid passage 42b and is capable of detecting the pressure (second pilot pressure) of the pilot fluid flowing through the second traveling fluid passage 42b. The third pressure detection unit 75c is provided in the third traveling fluid passage 42c and is capable of detecting the pressure (third pilot pressure) of the pilot fluid flowing through the third traveling fluid passage 42c. The fourth pressure detection unit 75d is provided in the fourth traveling fluid passage 42d and is capable of detecting the pressure (fourth pilot pressure) of the pilot fluid flowing through the fourth traveling fluid passage 42d.

Specifically, the first pressure detector 75 detects the pilot pressures (the first pilot pressure, the second pilot pressure, the third pilot pressure, and the fourth pilot pressure) in the traveling fluid passages 42 as secondary pressures. Although the first pressure detector 75 is capable of detecting four pilot pressures (the first pilot pressure, the second pilot pressure, the third pilot pressure, and the fourth pilot pressure) in this embodiment, the controller 100 uses the highest pilot pressure among the first pilot pressure, the second pilot pressure, the third pilot pressure, and the fourth pilot pressure as the secondary pressure in the anti-stall control.

Figure 4:
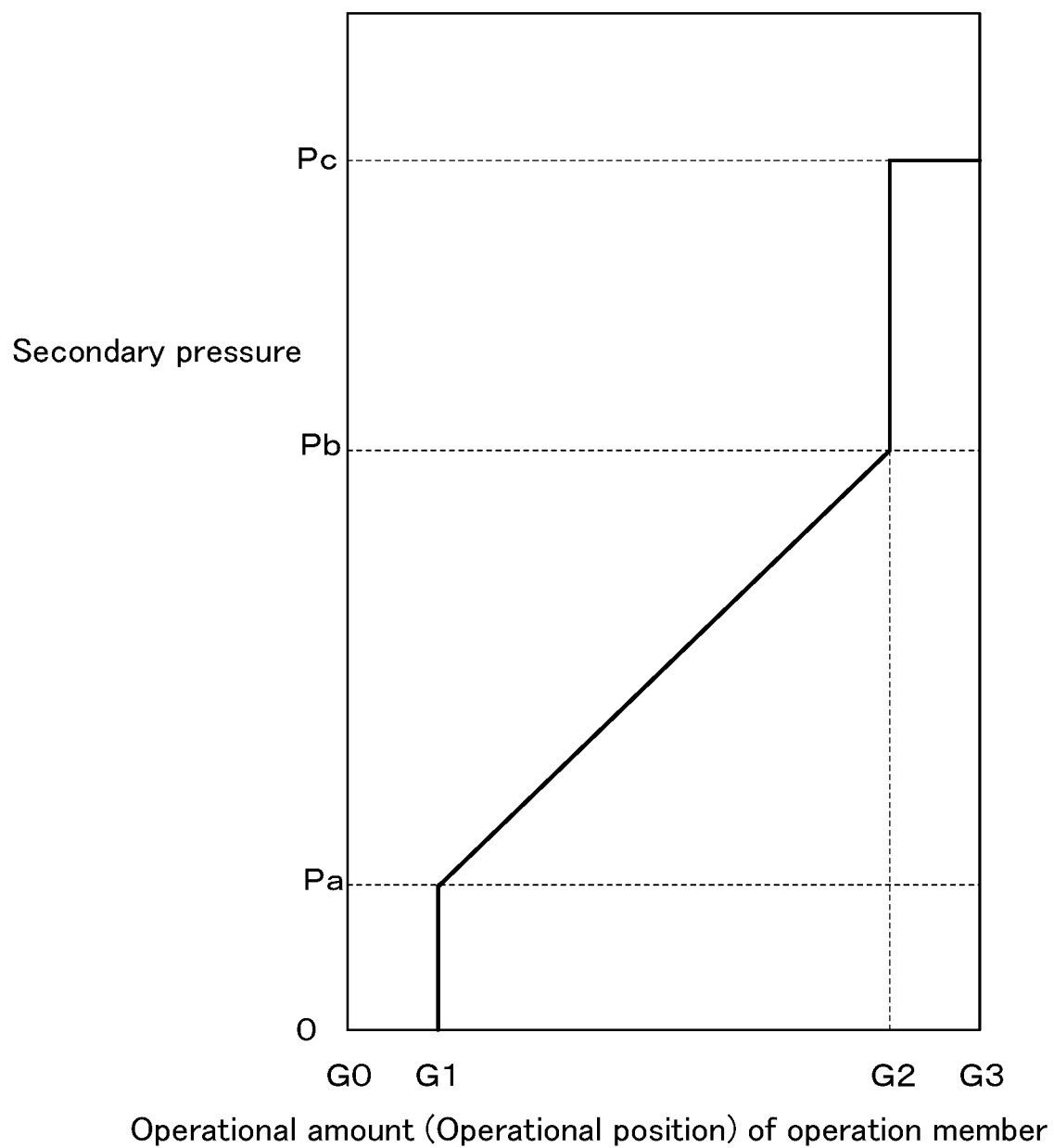
FIG. 4 illustrates an example of the relationship between an operational amount of an operation member and a secondary pressure of an operation valve.

FIG. 4 illustrates the relationship between the secondary pressure detected by the first pressure detector 75 and the operational amount of the first operation member 55. A change in the secondary pressure detected by the first pressure detector 75 when the first operation member 55 is pivoted forward from the neutral position will be described below with reference to the example in FIG. 4. When the first operation member 55 is located near the neutral position N, that is, when the operational amount is larger than or equal to an operational amount G0 at the neutral position N and smaller than a first operational amount G1, the secondary pressure output from the first operation valves 56 (first pilot valve 56A) is zero, so that the first pressure detector 75 detects that the secondary pressure output from the first operation valves 56 is zero.

When the operational amount of the first operation member 55 is larger than or equal to the first operational amount G1 and smaller than or equal to a second operational amount G2, the first pilot valve 56A changes the secondary pressure output in proportion to an operation of the first operation member 55. The first pilot valve 56A changes the secondary pressure output in proportion to an operation of the first operation member 55 within a range between a first pressure Pa and a second pressure Pb. Specifically, when the operational amount of the first operation member 55 is larger than or equal to the first operational amount G1 and smaller than or equal to the second operational amount G2, the secondary pressure detected by the first pressure detector 75 and the operational amount of the first operation member 55 have a proportional relationship or a correspondence relationship (correlation) close to a proportional relationship. The secondary pressure detected by the first pressure detector 75 when the operational amount of the first operation member 55 is the first operational amount G1 is the first pressure Pa, and the secondary pressure detected by the first pressure detector 75 when the operational amount of the first operation member 55 is the second operational amount G2 is the second pressure Pb.

If the operational amount of the first operation member 55 exceeds the second operational amount G2, the first pilot valve 56A outputs a secondary pressure equivalent to the primary pressure. Therefore, in a period between when the operational amount of the first operation member 55 exceeds the second operational amount G2 and when the operational amount of the first operation member 55 reaches a third operational amount G3 corresponding to a full stroke, the secondary pressure detected by the first pressure detector 75 becomes a third pressure Pc. Although the above example relates to a change in the secondary pressure detected by the first pressure detector 75 when the first operation member 55 is pivoted forward from the neutral position, the secondary pressure output from the first operation valves 56 when the first operation member 55 is operated rearward, leftward, or rightward and the secondary pressure output from the second operation valve 69 when the second operation member 68 is operated forward, rearward, leftward, or rightward change similarly to the example illustrated in FIG. 4.

As an alternative to the above embodiment in which the controller 100 uses the highest pilot pressure among the plurality of pilot pressures detected by the first pressure detector 75 as the secondary pressure in the anti-stall control, the controller 100 may use an average value of the detected first pilot pressure, second pilot pressure, third pilot pressure, and fourth pilot pressure as the secondary pressure, and the secondary pressure is thus not limited. For example, the controller 100 may use a pressure difference among the plurality of pilot pressures detected by the first pressure detector 75 as the secondary pressure in the anti-stall control. Specifically, the controller 100 may use a pressure difference among the plurality of pilot pressures detected by the first pressure detector 75 as the secondary pressure in the anti-stall control, may use a detected pilot pressure itself as the secondary pressure, or may use an absolute value of a difference between the detected pilot pressures as the secondary pressure.

As illustrated in FIG. 1, the controller 100 has an arithmetic unit 100b. The arithmetic unit 100b is implemented by, for example, the program stored in the electrical-electronic circuit or the CPU provided in the controller 100.

The arithmetic unit 100b calculates a drop rotation speed by subtracting the actual rotation speed detected by the rotation detector 104 from the target rotation speed controlled by the rotation-speed operation actuator 103. The arithmetic unit 100b defines the control signal (command current value) output from the actuation valve 70 based on the actual rotation speed detected by the rotation detector 104 and the calculated drop rotation speed. The arithmetic unit 100b acquires a control map preliminarily stored in the storage unit 100a and refers to setting lines L set in the control map.

Figure 5:
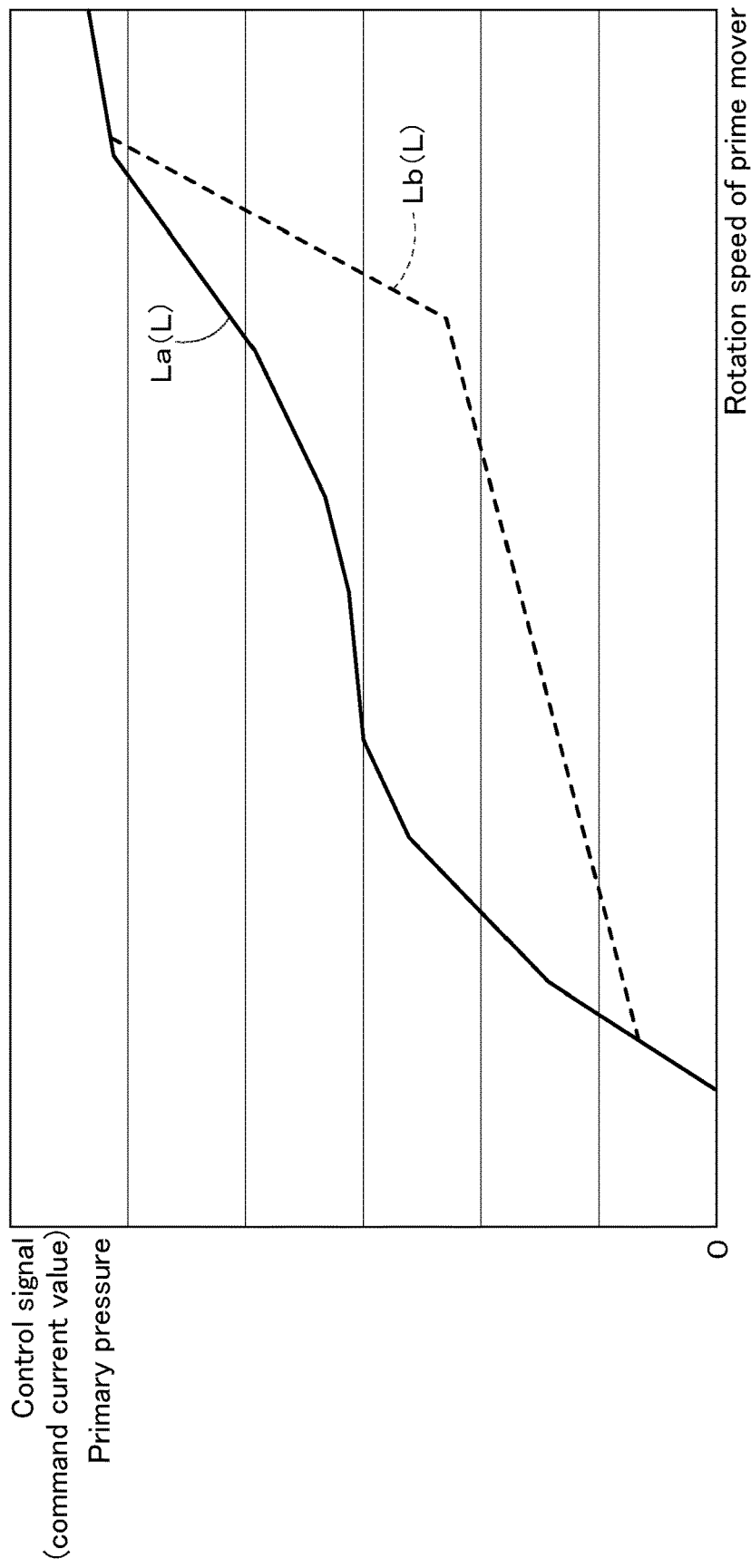
FIG. 5 illustrates an example of setting lines for setting a control signal (target primary pressure value) based on an actual rotation speed of a prime mover.

The storage unit 100a stores the control map that includes the setting lines L, as illustrated in FIG. 5. With regard to each setting line L, the arithmetic unit 100b (controller 100) defines a control signal based on the actual rotation speed of the prime mover 6 detected by the rotation detector 104. Each setting line L is defined based on the relationship between the actual rotation speed of the prime mover 6 when the first operation valves 56 are fully opened and the magnitude of the command current value. The example illustrated in FIG. 5 corresponds to a control map (anti-stall map) indicating an example of the setting lines L. The setting lines L include a first line La and a second line Lb.

As mentioned above, the magnitude of the command current value serving as the control signal output from the controller 100 to the actuation valve 70 and the target primary pressure are in a correspondence relationship (see FIG. 3), such as a proportional relationship. Specifically, the setting lines L (the first line La and the second line Lb) illustrated in FIG. 5 may be regarded as setting lines L that define the target primary pressure corresponding to the control signal (command current value) based on the actual rotation speed of the prime mover 6. Therefore, in FIG. 5, the ordinate axis may be regarded as the "control signal (command current value)" or the "primary pressure (target pressure)".

The first line La sets the control signal (command current value) corresponding to the target primary pressure based on the actual rotation speed in a case where the drop rotation speed calculated by the arithmetic unit 100b is lower than a first set value.

The second line Lb sets the control signal (command current value) corresponding to the target primary pressure based on the actual rotation speed in a case where the drop rotation speed calculated by the arithmetic unit 100b is higher than or equal to the first set value. The second line Lb sets the control signal (command current value) smaller than the first line La.

The controller 100 has modes and is switchable between the modes. In detail, the controller 100 is switchable to a mode involving correcting the control signal (command current value) calculated by the arithmetic unit 100b based on the drop rotation speed and increasing or decreasing a target primary pressure value set in accordance with the control signal. Specifically, the controller 100 is switchable between a normal mode involving outputting the control signal (command current value) calculated by the arithmetic unit 100b to the actuation valve 70 and controlling the opening of the actuation valve 70 and a correction mode, in addition to the normal mode, involving correcting the control signal (command current value) calculated by the arithmetic unit 100b based on the drop rotation speed. For the sake of convenience, the normal mode may sometimes be referred to as "fourth mode" hereinafter.

In detail, in the normal mode, if the drop rotation speed calculated by the arithmetic unit 100b is lower than the first set value, the controller 100 controls the actuation valve 70 in accordance with the control signal calculated from the first line La. If the drop rotation speed calculated by the arithmetic unit 100b is higher than or equal to the first set value, the controller 100 controls the actuation valve 70 based on the control signal calculated from the second line Lb. In other words, in the normal mode, the controller 100 controls the opening of the actuation valve 70 based on the control signal calculated by the arithmetic unit 100b without correcting the control signal based on the corresponding setting line L.

In contrast, in the correction mode, if the drop rotation speed calculated by the arithmetic unit 100b is lower than the first set value, the controller 100 controls the actuation valve 70 based on the control signal calculated from the first line La. If the drop rotation speed calculated by the arithmetic unit 100b is higher than or equal to the first set value, the controller 100 corrects the control signal calculated from the second line Lb and controls the actuation valve 70 based on the corrected control signal. In other words, in the correction mode, the controller 100 corrects the control signal calculated by the arithmetic unit 100b when performing the anti-stall control, and controls the actuation valve 70 based on the corrected control signal.

As illustrated in FIG. 1, the controller 100 includes a correction unit 100c. The correction unit 100c is implemented by, for example, the program stored in the electrical-electronic circuit or the CPU provided in the controller 100. When the controller 100 is in the correction mode, if the drop rotation speed calculated by the arithmetic unit 100b is higher than or equal to the first set value, the correction unit 100c corrects the control signal (command current value) calculated from the second line Lb. The correction unit 100c acquires a map of a correction coefficient (gain value) defined for each correction mode and corrects the command current value in accordance with the acquired gain value.

The correction unit 100c multiples the correction coefficient acquired from the map by the command current value indicated on the second line Lb, and corrects the control signal (command current value) output from the controller 100 to the actuation valve 70.

If the gain value acquired by the correction unit 100c is smaller than 1 (100%), when the correction unit 100c multiples the command current value by the gain value, the command current value after the correction becomes smaller than the command current value prior to the correction. Therefore, if the gain value acquired by the correction unit 100c is smaller than 1, the actuation valve 70 to which the corrected command current value is output is corrected such that the output primary pressure decreases, as compared with that prior to the correction.

If the gain value acquired by the correction unit 100c exceeds 1 (100%), when the correction unit 100c multiples the command current value by the gain value, the command current value after the correction becomes larger than the command current value prior to the correction. Therefore, if the gain value acquired by the correction unit 100c exceeds 1, the actuation valve 70 to which the corrected command current value is output is corrected such that the output primary pressure increases, as compared with that prior to the correction.

In this embodiment, the correction unit 100c performs any of a first correction, a second correction, a third correction, and a fourth correction in the correction mode.

In detail, the correction unit 100c performs the first correction involving correcting the control signal such that the target primary pressure is changed in accordance with the secondary pressure detected by the first pressure detector 75. In this embodiment, the first correction performed by the correction unit 100c involves correcting the control signal such that the target primary pressure is changed in accordance with the maximum secondary pressure of the secondary pressures detected by the first pressure detector 75.

Specifically, the first correction performed by the correction unit 100c involves correcting the control signal such that the target primary pressure value is reduced relative to the target primary pressure value corresponding to the control signal prior to the correction and is proportional to the secondary pressure detected by the first pressure detector 75. In other words, when the correction unit 100c performs the first correction, the gain value is at least smaller than 1 and is proportional to the secondary pressure, as indicated in a second segment m2 of a first correction function M1 or a fifth segment m5 of a second correction function M2 illustrated in a map in FIG. 6A. Thus, in the first correction, the gain value increases substantially linearly as the secondary pressure increases, and decreases substantially linearly as the secondary pressure decreases. For example, in the first correction, the gain value is defined as a value ranging between 0.6 (60%) and 0.9 (90%).

In other words, when the correction unit 100c (controller 100) performs the first correction, the target primary pressure value output from the actuation valve 70, that is, the pressure (pilot pressure) and the flow rate of the pilot fluid supplied to the first operation valves 56, can be reduced as compared with at least the target primary pressure value prior to the correction, and the first operation valves 56 can finely adjust the output secondary pressure. Furthermore, with the primary pressure output from the actuation valve 70 being changed in accordance with the secondary pressure output from the first operation valves 56, if the secondary pressure is relatively low, that is, if the operational amount of the first operation member 55 is small and the opening of the first operation valves 56 is small, the secondary pressure can be further reduced. In contrast, if the secondary pressure is relatively high, that is, if the operational amount of the first operation member 55 is large and the opening of the first operation valves 56 is large, the secondary pressure can be increased. Thus, the controller 100 can change the primary pressure output from the actuation valve 70 in accordance with the state of the first operation valves 56, thereby further enhancing the operability.

Furthermore, the first correction performed by the correction unit 100c involves gradually changing the gain value to gradually correct the command current value output to the actuation valve 70. In detail, the correction unit 100c adjusts an amount of change in the gain value per predetermined time period so as to gradually change the gain value. The amount of change in the gain value per predetermined time period to be adjusted by the correction unit 100c may vary between the modes.

In other words, the controller 100 moderately corrects the control signal (command current value) and does not rapidly change the opening of the actuation valve 70 in the first correction. Therefore, when the controller 100 is performing the first correction, the responsiveness of the opening of the first operation valves 56 becomes moderate relative to an operation of the first operation member 55, so that the operator can finely adjust the opening of the first operation valves 56 slowly toward the target secondary pressure, whereby a highly-accurate operation can be performed.

The correction unit 100c may be capable of gradually changing the gain value in the first correction and may vary the amount of change in the gain value per predetermined time period in accordance with whether the secondary pressure is increasing or decreasing. For example, in the first correction, the correction unit 100c determines whether the secondary pressure is increasing or decreasing based on a change in the secondary pressure detected by the first pressure detector 75 per predetermined time period. If the secondary pressure is increasing, the correction unit 100c reduces the amount of change in the gain value per predetermined time period, as compared with a case where the secondary pressure is decreasing. If the secondary pressure is decreasing, the amount of change in the gain value per predetermined time period is increased, as compared with a case where the secondary pressure is increasing. Accordingly, when the first operation member 55 is operated such that the operational amount thereof increases, a situation where the hydraulic unit S operates suddenly can be suppressed while a more precise operation can be performed. When the first operation member 55 is operated such that the operational amount thereof decreases, the operability can be maintained while the operation of the hydraulic unit S can be made moderate quickly.

If the operational amount of the operation member (first operation member 55) is greater than or equal to a predetermined amount and the secondary pressure detected by the first pressure detector 75 is higher than or equal to a first threshold value, the correction unit 100c performs the second correction involving correcting the control signal to a value equal to the target primary pressure value corresponding to the control signal prior to the correction or to increase the target primary pressure value. In this embodiment, the second correction performed by the correction unit 100c involves correcting the control signal to a value equal to the primary pressure corresponding to the control signal prior to the correction or to increase the target primary pressure if the maximum secondary pressure of the secondary pressures detected by the first pressure detector 75 is higher than or equal to the first threshold value.

Figure 6A:
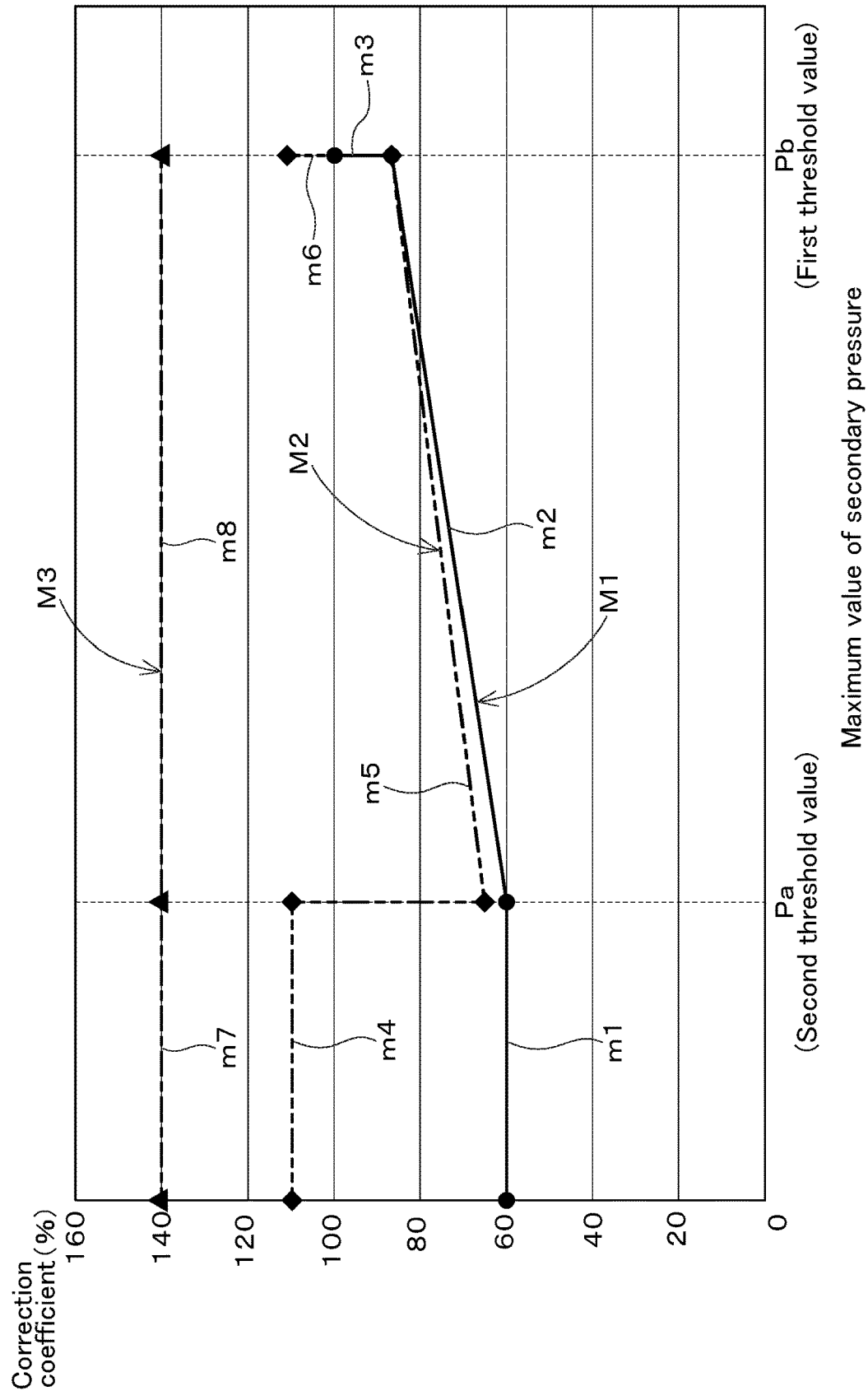
FIG. 6A illustrates an example of correction functions that define the relationship between the secondary pressure and a correction coefficient in the first embodiment.

Specifically, when the correction unit 100c performs the second correction, the gain value is at least 1 or larger, as indicated in a third segment m3 of the first correction function M1 or a sixth segment m6 of the second correction function M2 illustrated in the map in FIG. 6A. Thus, the correction unit 100c performs the second correction such that the target primary pressure value after the correction becomes higher than or equal to the primary pressure prior to the correction. For example, in the second correction, the gain value is defined as a value ranging between 1 (100%) and 1.1 (110%).

The first threshold value is defined in accordance with the operation valves (first operation valves 56). In this embodiment, the first threshold value is defined as a value equal to a maximum value in a range in which the secondary pressure output from the first operation valves 56 is adjustable proportionally to an operation of the first operation member 55 when the operational amount of the first operation member 55 in FIG. 4 is the second operational amount G2 and the output secondary pressure is the second pressure Pb.

In the second correction, the gain value is fixed and is not proportional to the secondary pressure, unlike the first correction.

In other words, when the operational amount of the first operation member 55 is greater than or equal to a predetermined amount, the primary pressure serving as the pilot pressure of the pilot fluid supplied to the first operation valves 56 is increased, so that the first operation valves 56 can enhance the responsiveness to an operation performed on the first operation member 55. Therefore, the responsiveness of the first operation valves 56 can be changed in accordance with the operational amount of the first operation member 55.

If the secondary pressure detected by the first pressure detector 75 is lower than a second threshold value serving as the lowest pilot pressure outputtable from the first operation valves 56, the correction unit 100c performs the third correction involving correcting the control signal such that the target primary pressure is increased relative to the primary pressure corresponding to the control signal prior to the correction. In this embodiment, the third correction performed by the correction unit 100c involves correcting the control signal such that the target primary pressure is increased relative to the primary pressure corresponding to the control signal prior to the correction if the maximum secondary pressure of the secondary pressures detected by the first pressure detector 75 is lower than the second threshold value.

Specifically, when the correction unit 100c performs the third correction, the gain value is at least defined as a value larger than 1, as indicated in a fourth segment m4 of the second correction function M2 illustrated in the map in FIG. 6A. Thus, the correction unit 100c performs the third correction such that the target primary pressure value after the correction becomes greater than the primary pressure prior to the correction. For example, in the third correction, the gain value is defined as a value of 1.1 (110%).

The second threshold value is defined in accordance with the operation valves (first operation valves 56). In this embodiment, the second threshold value is defined as a value equal to a minimum value in a range in which the output secondary pressure is adjustable by changing the opening of the first operation valves 56 when the operational amount of the first operation member 55 in FIG. 4 is the first operational amount G1 and the output secondary pressure is the first pressure Pa.

In the third correction, the gain value is fixed and is not proportional to the secondary pressure, unlike the first correction.

In other words, when the operational amount of the first operation member 55 is greater than or equal to a predetermined amount, the primary pressure serving as the pilot pressure of the pilot fluid supplied to the first operation valves 56 is increased, so that the first operation valves 56 can enhance the responsiveness to an operation performed on the first operation member 55. Therefore, the responsiveness of the first operation valves 56 can be changed in accordance with the operational amount of the first operation member 55.

The correction unit 100c performs the fourth correction involving correcting the control signal such that the target primary pressure is increased relative to the target primary pressure value corresponding to the control signal (command current value) prior to the correction. Specifically, when the correction unit 100c performs the fourth correction, the gain value is at least defined as a value larger than 1, as indicated in a seventh segment m7 and an eighth segment m8 of a third correction function M3 illustrated in the map in FIG. 6A. Thus, the correction unit 100c performs the fourth correction such that the target primary pressure value after the correction becomes greater than the primary pressure prior to the correction. For example, in the fourth correction, the gain value is defined as a value of 1.4 (140%). As illustrated in FIG. 6A, in the fourth correction, the gain value is fixed and is not proportional to the secondary pressure, unlike the first correction.

In other words, with the fixed gain value, the primary pressure serving as the pilot pressure of the pilot fluid supplied to the first operation valves 56 is increased, so that the first operation valves 56 can enhance the responsiveness to an operation performed on the first operation member 55.

Figure 6B:
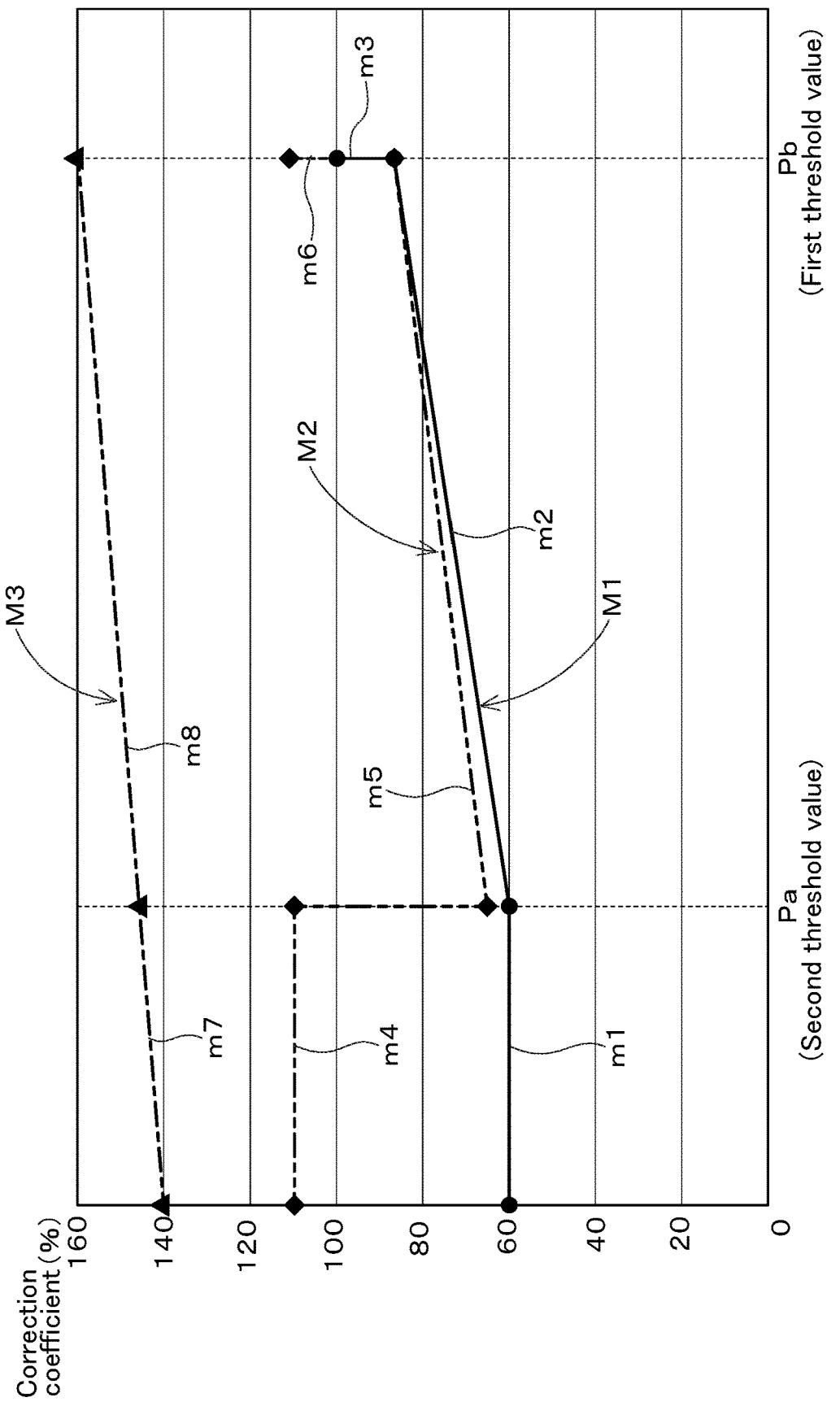
FIG. 6B illustrates an example of correction functions that define the relationship between the secondary pressure and the correction coefficient in a modification of the first embodiment.

As an alternative to this embodiment in which the gain value in the fourth correction is fixed and is not proportional to the secondary pressure, unlike the first correction, the gain value may be proportional to the secondary pressure, similar to the first correction, as illustrated in FIG. 6B. In detail, in the fourth correction, the correction unit 100c corrects the control signal such that the target primary pressure value is changed in accordance with the maximum secondary pressure of the secondary pressures detected by the first pressure detector 75. The controller 100 corrects the control signal such that the target primary pressure value is increased relative to the target primary pressure value corresponding to the control signal prior to the correction and is proportional to the secondary pressure detected by the first pressure detector 75.

Specifically, the fourth correction performed by the correction unit 100c involves correcting the control signal such that the target primary pressure is increased relative to the target primary pressure value corresponding to the control signal prior to the correction and is proportional to the secondary pressure detected by the first pressure detector 75. In other words, when the correction unit 100c performs the fourth correction, the gain value is at least larger than 1 and is proportional to the secondary pressure, as indicated in the third correction function M3 indicated in the map in FIG. 6B. Thus, in the fourth correction according to a modification, the gain value increases substantially linearly as the secondary pressure increases, and decreases substantially linearly as the secondary pressure decreases. For example, in the fourth correction according to the modification, the gain value is defined as a value ranging between 1.4 (140%) and 1.6 (160%).

Although an example of the magnitude of the gain value is described in each of the first correction, the second correction, the third correction, and the fourth correction, the value is merely an example and may be changed, where appropriate, by operating an operation switch, a terminal, and so on connected to the controller 100.

The correction mode includes a plurality of modes each involving performing at least one of the first correction, the second correction, the third correction, and the fourth correction. Specifically, of the plurality of correction modes, one correction mode and another correction mode have different combinations of the corrections (the first correction, the second correction, the third correction, and the fourth correction) performed by the correction unit 100c and/or different correction coefficients (gain values) used for correcting the command current value.

As indicated in the first correction function M1 in FIG. 6A, the first mode involves the correction unit 100c performing the first correction if the secondary pressure detected by the first pressure detector 75 is lower than the first threshold value and the correction unit 100c performing the second correction if the secondary pressure detected by the first pressure detector 75 is higher than or equal to the first threshold value. In this embodiment, the first mode involves the correction unit 100c performing the first correction if the maximum secondary pressure of the secondary pressures detected by the first pressure detector 75 is lower than the first threshold value and the correction unit 100c performing the second correction if the maximum secondary pressure is higher than or equal to the first threshold value.

Specifically, in the first mode, if the secondary pressure detected by the first pressure detector 75 is lower than the second threshold value (first segment m1), the gain value is fixed at 0.6 (60%) and is not proportional to the secondary pressure, unlike the first correction. In other words, in the first mode, if the secondary pressure detected by the first pressure detector 75 is lower than the second threshold value (first segment m1), the correction unit 100c corrects the control signal such that the target primary pressure value is reduced relative to the target primary pressure value corresponding to the control signal prior to the correction.

In the first mode, if the secondary pressure detected by the first pressure detector 75 is higher than or equal to the second threshold value and is lower than the first threshold value (second segment m2), the gain value changes substantially linearly in accordance with the secondary pressure within a range between 0.6 (60%) and 0.9 (90%). In other words, in the first mode, if the secondary pressure detected by the first pressure detector 75 is higher than or equal to the second threshold value and is lower than the first threshold value (second segment m2), the correction unit 100c performs the first correction involving gradually correcting the command current value such that the target primary pressure value is reduced relative to the target primary pressure value corresponding to the control signal prior to the correction and is proportional to the secondary pressure detected by the first pressure detector 75.

In the first mode, if the secondary pressure detected by the first pressure detector 75 is higher than or equal to the first threshold value (third segment m3), the gain value becomes 1 (100%). In other words, in the first mode, if the secondary pressure detected by the first pressure detector 75 is higher than or equal to the first threshold value, the second correction involving correcting the control signal to a value equal to the target primary pressure value corresponding to the control signal prior to the correction is performed. When transitioning from the first correction to the second correction, the correction unit 100c gradually corrects the command current value.

Accordingly, when the operational amount of the first operation member 55 is smaller than the predetermined amount, the operator can operate the first operation member 55 to finely adjust the secondary pressure output from the operation valves. In contrast, when the operational amount of the first operation member 55 is greater than or equal to the predetermined amount, a highly-responsive feedback can be generated. Therefore, the working machine 1 can control the actuation valve 70 based on an engine drop while prioritizing fine operability or responsiveness in accordance with an operation of the first operation valves 56.

As indicated by the second correction function M2 in FIG. 6A, the second mode involves the correction unit 100c performing the third correction if the secondary pressure detected by the first pressure detector 75 is lower than the second threshold value, the correction unit 100c performing the first correction if the secondary pressure detected by the first pressure detector 75 is higher than or equal to the second threshold value and is lower than the first threshold value, and the correction unit 100c performing the second correction if the secondary pressure detected by the first pressure detector 75 is higher than or equal to the first threshold value. In this embodiment, the second mode involves the correction unit 100c performing the third correction if the maximum secondary pressure of the secondary pressures detected by the first pressure detector 75 is lower than the second threshold value, the correction unit 100c performing the first correction if the maximum secondary pressure is higher than or equal to the second threshold value and is lower than the first threshold value, and the correction unit 100c performing the second correction if the maximum secondary pressure is higher than or equal to the first threshold value.

Specifically, in the second mode, if the secondary pressure detected by the first pressure detector 75 is lower than the second threshold value (fourth segment m4), the third correction involving correcting the control signal such that the target primary pressure value is increased relative to the primary pressure corresponding to the control signal prior to the correction is performed. In the third correction, the gain value is fixed at 1.1 (110%) and is not proportional to the secondary pressure, unlike the first correction.

In the second mode, if the secondary pressure detected by the first pressure detector 75 is higher than or equal to the second threshold value and is lower than the first threshold value (fifth segment m5), the gain value changes substantially linearly in accordance with the secondary pressure within a range between 0.65 (65%) and 0.9 (90%). In other words, in the second mode, if the secondary pressure detected by the first pressure detector 75 is higher than or equal to the second threshold value and is lower than the first threshold value (fifth segment m5), the correction unit 100c performs the first correction involving gradually correcting the command current value such that the target primary pressure value is reduced relative to the target primary pressure value corresponding to the control signal prior to the correction and is proportional to the secondary pressure detected by the first pressure detector 75. In the second mode, the amount of change in the gain value per predetermined time period to be adjusted by the correction unit 100c is set to be larger than that in the first mode.

In the second mode, if the secondary pressure detected by the first pressure detector 75 is higher than or equal to the first threshold value (sixth segment m6), the gain value becomes 1.1 (110%). In other words, in the second mode, if the secondary pressure detected by the first pressure detector 75 is higher than or equal to the first threshold value, the second correction involving correcting the control signal to a value equal to the target primary pressure value corresponding to the control signal prior to the correction or to increase the target primary pressure value is performed.

Therefore, in the second mode, if the operational amount of the first operation valves 56 is an operational amount at which a pilot fluid is not to be delivered, the responsiveness to an operation performed on the first operation member 55 can be enhanced without applying an excessive load on the prime mover 6. If the operational amount of the first operation member 55 is smaller than the predetermined amount, the operator can operate the first operation member 55 to finely adjust the secondary pressure output from the first operation valves 56. If the operational amount of the first operation member 55 is greater than or equal to the predetermined amount, a highly-responsive feedback can be generated. Therefore, the working machine 1 can control the actuation valve 70 based on an engine drop while prioritizing fine operability or responsiveness in accordance with an operation of the first operation valves 56.

The third mode includes performing the fourth correction involving correcting the control signal in accordance with a fixed gain value without changing the gain value in accordance with the secondary pressure detected by the first pressure detector 75. In other words, the gain value is 1.4 (140%) in either of the seventh segment m7 and the eighth segment m8, and the correction unit 100c performs the fourth correction involving correcting the control signal such that the target primary pressure value is increased relative to the target primary pressure value corresponding to the control signal prior to the correction.

Therefore, in the third mode, the primary pressure serving as the pilot pressure of the pilot fluid supplied to the first operation valves 56 is increased in accordance with the fixed gain value, so that the first operation valves 56 can enhance the responsiveness to an operation performed on the first operation member 55.

As illustrated in FIG. 1, the working machine 1 includes a switching member (operation actuator) 105. The switching member 105 is operable by the operator and is a switch used for switching modes of the controller 100. The switching member 105 is connected to the controller 100, is operated by the operator, and inputs an operation signal to the controller 100. In this embodiment, the switching member 105 is a display image displayed on a display 110. The display 110 is connected to the controller 100 in a communicable manner, displays various information related to the working machine 1, and assists the working machine 1 with traveling and working processes. For example, the display 110 is a traveling assistance device provided near the operator's seat 8. Furthermore, the display 110 is connected to equipment included in the working machine 1 in a wired or wirelessly communicable manner and can exchange information therewith.

Figure 7:
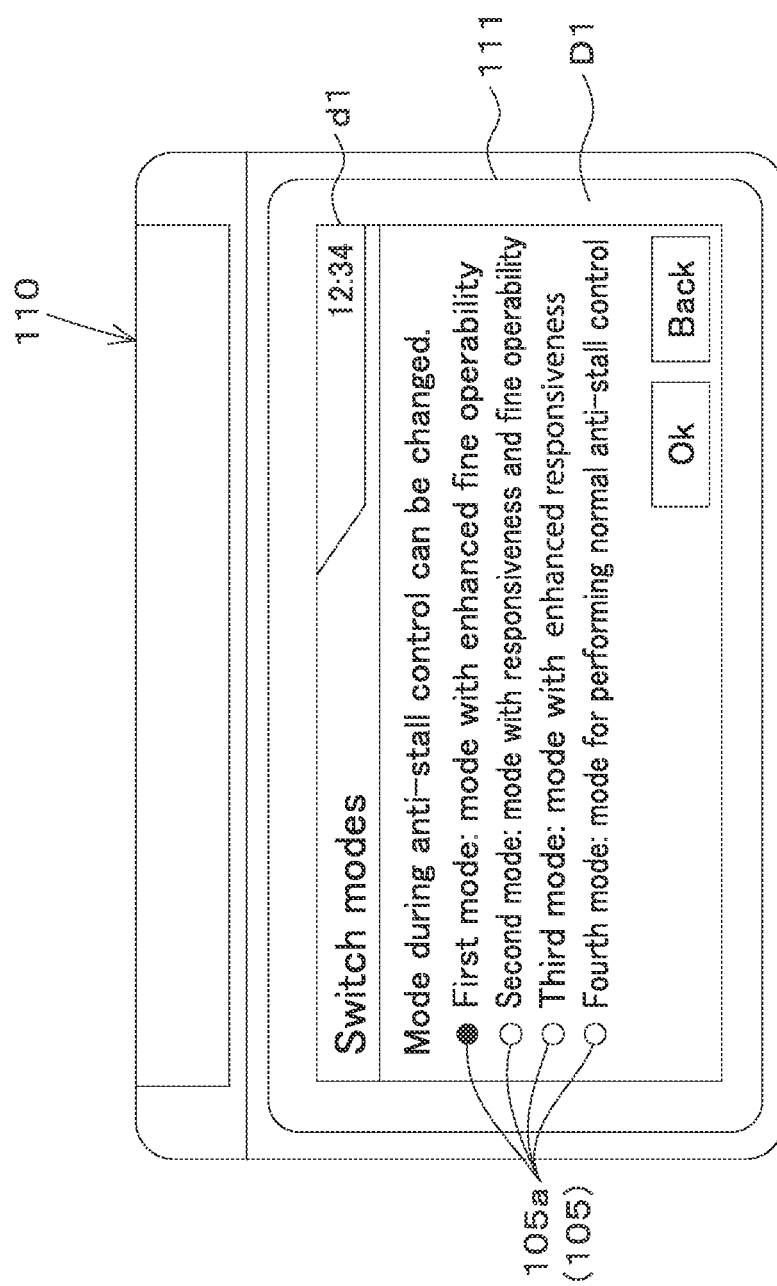
FIG. 7 illustrates an example of a switch screen displayed on a display.

As illustrated in FIG. 7, the display 110 has a display section 111. The display section 111 is any one of a liquid crystal panel, a touchscreen, or another type of panel, and can display various information used for assisting the working machine 1 with traveling and working processes.

As illustrated in FIG. 7, when the operator performs a predetermined operation, the display section 111 displays a switch screen D1. The switch screen D1 displays the switching member 105. The switching member 105 includes a plurality of selection buttons 105a and receives the operation performed by the operator. In this embodiment, the operator touches and selects one selection button 105a from the plurality of selection buttons 105a displayed on the switch screen D1. When the one selection button 105a is selected by the operator, the display 110 outputs the operational information to the controller 100. As an alternative to this embodiment in which the switching member 105 includes the plurality of selection buttons 105a displayed on the display section 111, the switching member 105 may be, for example, a dial or a plurality of buttons connected to the controller 100 and having a plurality of switching positions so long as the switching member 105 is connected to the controller 100 and is capable of receiving a mode switching operation.

Figure 8:
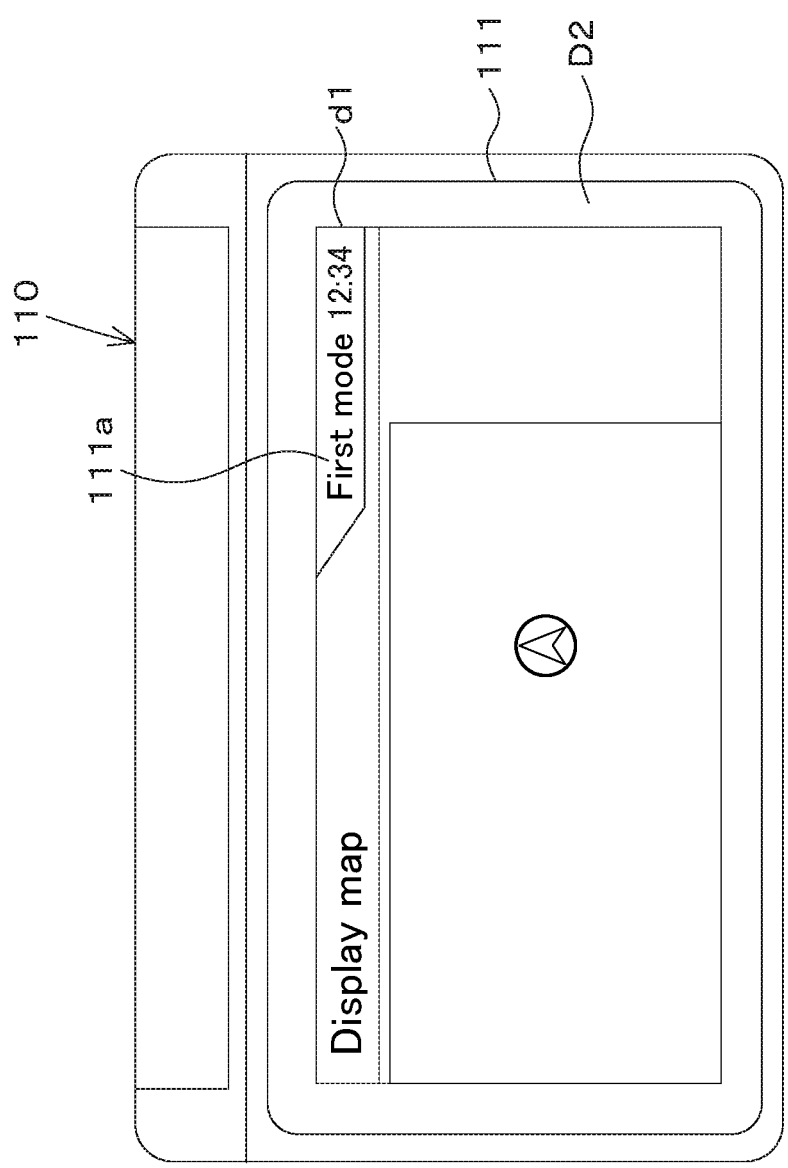
FIG. 8 illustrates a mode display section displayed on the display.

Furthermore, the display section 111 is capable of displaying which of the modes the controller 100 is in. For example, as illustrated in FIG. 8, a screen D2 displayed on the display section 111 has an upper region dl that displays a mode display section 111a. The mode display section 111a displays the current mode of the controller 100 by using a text string. Although the current mode of the controller 100 is displayed using a text string in the example in FIG. 8, the display mode is not limited to a text string. The display section 111 may display the current mode of the controller 100 by using any graphic symbol, such as an icon.

Furthermore, in this embodiment, the controller 100 can switch modes regardless of an operation of the switching member 105. In detail, the controller 100 may switch modes based on the target rotation speed and the actual rotation speed or may switch modes based on the temperature of the pilot fluid.

First, if the difference (drop rotation speed) between the target rotation speed and the actual rotation speed is higher than or equal to a second set value (third threshold value), the controller 100 switches to the fourth mode (normal mode). The third threshold value is larger than the first set value. In other words, if the drop rotation speed increases as a result of the correction unit 100c performing the second correction, the third correction, and the fourth correction, the controller 100 switches to the fourth mode (normal mode), so that the correction unit 100c does not correct the command current value, whereby the control based on the engine drop can be prioritized.

Subsequently, if the temperature of the pilot fluid detected by a temperature detector 106 is lower than a fourth threshold value, the controller 100 switches to the fourth mode. As illustrated in FIG. 1, the working machine 1 includes the temperature detector 106 that detects the temperature of the pilot fluid. The temperature detector 106 is a temperature sensor that detects the temperature of the hydraulic fluid and is provided in, for example, the delivery fluid passage 40. Therefore, the temperature detector 106 can detect the temperature of the pilot fluid delivered from the first hydraulic pump P1, and outputs the obtained detection signal to the controller 100.

The temperature detector 106 may be provided in another fluid passage through which the pilot fluid flows, such as the first traveling fluid passage 42a or the fifth traveling fluid passage 42e, or in the hydraulic fluid tank T instead of being provided in the delivery fluid passage 40 so long as the temperature detector 106 is capable of detecting the temperature of the pilot fluid.

The fourth threshold value is, for example, 0° C. If the temperature of the pilot fluid is relatively low and the viscosity thereof is high, the controller 100 switches to the fourth mode to suppress a situation where the correction unit 100c corrects the primary pressure to a low value, thereby avoiding a decrease in the responsiveness of the hydraulic unit S.

Although the above-described example relates to a case where the controller 100 switches to the fourth mode when the temperature of the pilot fluid detected by the temperature detector 106 is lower than the fourth threshold value, at least the gain value may be 1 (100%) or greater. If the temperature of the pilot fluid detected by the temperature detector 106 is lower than the fourth threshold value or if the temperature of the pilot fluid is lower than a fifth threshold value that is smaller than the fourth threshold value, the controller 100 may be configured to switch to the third mode.

Figure 9A:
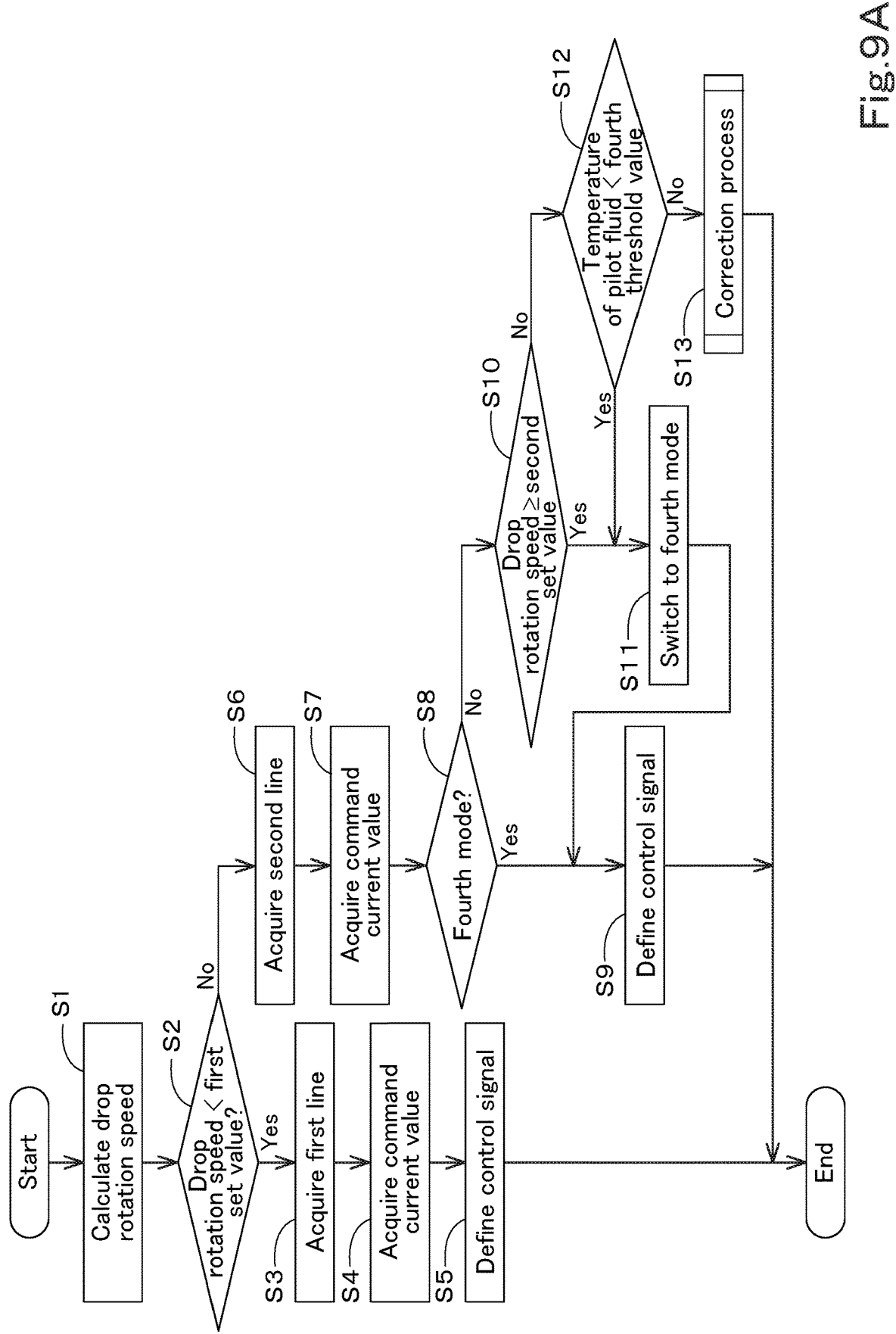
FIG. 9A illustrates the flow of operation performed by a controller for correcting the control signal.

The flow of a process performed by the controller 100 for correcting the control signal (command current value) will be described below with reference to FIG. 9A and FIG. 9B.

First, in step S1, the arithmetic unit 100b calculates a drop rotation speed based on a target rotation speed controlled by the rotation-speed operation actuator 103 and an actual rotation speed detected by the rotation detector 104. In detail, the arithmetic unit 100b acquires the target rotation speed controlled by the rotation-speed operation actuator 103 and the actual rotation speed detected by the rotation detector 104, and calculates the drop rotation speed by subtracting the acquired actual rotation speed from the acquired target rotation speed.

After calculating the drop rotation speed in step S1, the arithmetic unit 100b confirms in step S2 whether or not the drop rotation speed is lower than the first set value. When the arithmetic unit 100b confirms that the drop rotation speed is lower than the first set value (Yes in step S2), the arithmetic unit 100b acquires the first line La from the storage unit 100a in step S3. After acquiring the first line La from the storage unit 100a in step S3, the arithmetic unit 100b acquires a command current value corresponding to the actual rotation speed detected by the rotation detector 104 based on the acquired first line La in step S4.

After acquiring the command current value corresponding to the actual rotation speed in step S4, the arithmetic unit 100b defines the command current value as a control signal output from the controller 100 to the actuation valve 70 in step S5.

In contrast, if the arithmetic unit 100b confirms that the drop rotation speed is not lower than the first set value (No in step S2), the arithmetic unit 100b acquires the second line Lb from the storage unit 100a in step S6. After acquiring the second line Lb from the storage unit 100a in step S6, the arithmetic unit 100b acquires a command current value corresponding to the actual rotation speed detected by the rotation detector 104 based on the acquired second line Lb in step S7.

After acquiring the command current value corresponding to the actual rotation speed in step S7, the arithmetic unit 100b confirms in step S8 whether or not the controller 100 is in the normal mode (fourth mode), that is, in a mode other than the correction mode. If the arithmetic unit 100b determines that the controller 100 is in the normal mode (Yes in step S8), the arithmetic unit 100b defines the command current value acquired in step S7 as a control signal output from the controller 100 to the actuation valve 70 in step S9.

If the arithmetic unit 100b determines that the controller 100 is not in the normal mode, that is, in the correction mode (No in step S8), the arithmetic unit 100b confirms in step S10 whether or not the drop rotation speed is higher than or equal to the second set value (third threshold value). If the arithmetic unit 100b confirms that the drop rotation speed is higher than or equal to the second set value (third threshold value) (Yes in step S10), the arithmetic unit 100b switches the controller 100 to the fourth mode (normal mode) in step S11 and proceeds to step S9.

If the arithmetic unit 100b confirms that the drop rotation speed is lower than the second set value (third threshold value) (No in step S10), the arithmetic unit 100b confirms in step S12 whether or not the temperature of the pilot fluid detected by the temperature detector 106 is lower than the fourth threshold value. If the arithmetic unit 100b confirms that the temperature of the pilot fluid is lower than the fourth threshold value (Yes in step S12), the arithmetic unit 100b switches the controller 100 to the fourth mode (normal mode) in step S11 and proceeds to step S9.

In contrast, if the arithmetic unit 100b confirms that the temperature of the pilot fluid is higher than or equal to the fourth threshold value (No in step S12), the arithmetic unit 100b proceeds to a correction process in step S13.

After proceeding to the correction process in step S13, the arithmetic unit 100b confirms in step S14 whether or not the controller 100 is in the first mode. If the arithmetic unit 100b confirms that the controller 100 is in the first mode (Yes in step S14), the correction unit 100c acquires the first correction function M1 from the storage unit 100a in step S15.

After acquiring the first correction function M1 from the storage unit 100a in step S15, the correction unit 100c acquires a secondary pressure detected by the first pressure detector 75 in step S16. After acquiring the secondary pressure detected by the first pressure detector 75 in step S16, the correction unit 100c confirms in step S17 whether or not the secondary pressure is lower than the second threshold value.

If the correction unit 100c confirms that the secondary pressure is lower than the second threshold value (Yes in step S17), the correction unit 100c corrects the control signal in step S18 such that a target primary pressure value is reduced relative to a target primary pressure value corresponding to the control signal prior to the correction. In this embodiment, the correction unit 100c corrects the control signal based on the first segment m1 of the first correction function M1. Specifically, the correction unit 100c corrects the control signal by multiplying a gain value of 0.6 (60%) by the command current value.

If the correction unit 100c confirms that the secondary pressure is not lower than the second threshold value (No in step S17), the correction unit 100c confirms in step S19 whether or not the secondary pressure is lower than the first threshold value, that is, higher than or equal to the second threshold value and lower than the first threshold value. If the correction unit 100c confirms that the secondary pressure is lower than the first threshold value (Yes in step S19), the correction unit 100c performs the first correction in step S20 involving gradually correcting the command current value such that the target primary pressure value is reduced relative to the target primary pressure value corresponding to the control signal prior to the correction and is proportional to the secondary pressure detected by the first pressure detector 75. In this embodiment, the correction unit 100c corrects the control signal based on the second segment m2 of the first correction function M1.

If the secondary pressure is not lower than the first threshold value, that is, if the secondary pressure is higher than or equal to the first threshold value (No in step S19), the correction unit 100c performs the second correction in step S21 involving correcting the control signal to a value equal to the target primary pressure value corresponding to the control signal prior to the correction. In this embodiment, the correction unit 100c corrects the control signal based on the third segment m3 of the first correction function M1. When transitioning from the first correction to the second correction, the correction unit 100c gradually corrects the command current value.

If the arithmetic unit 100b confirms that the controller 100 is not in the first mode (No in step S14), the arithmetic unit 100b confirms in step S22 whether or not the controller 100 is in the second mode. If the arithmetic unit 100b confirms that the controller 100 is in the second mode (Yes in step S22), the correction unit 100c acquires the second correction function M2 from the storage unit 100a in step S23.

After acquiring the second correction function M2 from the storage unit 100a in step S23, the correction unit 100c acquires the secondary pressure detected by the first pressure detector 75 in step S24. After acquiring the secondary pressure detected by the first pressure detector 75 in step S24, the correction unit 100c confirms in step S25 whether or not the secondary pressure is lower than the second threshold value.

If the correction unit 100c confirms that the secondary pressure is lower than the second threshold value (Yes in step S25), the correction unit 100c performs the third correction in step S26 involving correcting the control signal such that the target primary pressure value is increased relative to the primary pressure corresponding to the control signal prior to the correction. In this embodiment, the correction unit 100c corrects the control signal based on the fourth segment m4 of the second correction function M2. Specifically, the correction unit 100c corrects the control signal by multiplying a gain value of 1.1 (110%) by the command current value.

If the correction unit 100c confirms that the secondary pressure is not lower than the second threshold value (No in step S25), the correction unit 100c confirms in step S27 whether or not the secondary pressure is lower than the first threshold value, that is, higher than or equal to the second threshold value and lower than the first threshold value. If the correction unit 100c confirms that the secondary pressure is lower than the first threshold value (Yes in step S27), the correction unit 100c performs the first correction in step S28 involving gradually correcting the command current value such that the target primary pressure value is reduced relative to the target primary pressure value corresponding to the control signal prior to the correction and is proportional to the secondary pressure detected by the first pressure detector 75. In this embodiment, the correction unit 100c corrects the control signal based on the fifth segment m5 of the second correction function M2.

If the secondary pressure is not lower than the first threshold value, that is, if the secondary pressure is higher than or equal to the first threshold value (No in step S27), the correction unit 100c performs the second correction in step S29 involving correcting the control signal to a value larger than or equal to the target primary pressure value corresponding to the control signal prior to the correction. In this embodiment, the correction unit 100c corrects the control signal based on the sixth segment m6 of the second correction function M2. When transitioning from the first correction to the second correction, the correction unit 100c gradually corrects the command current value.

If the arithmetic unit 100b confirms that the controller 100 is not in the second mode (No in step S22), that is, if the correction unit 100c confirms that the controller 100 is in the third mode, the correction unit 100c performs the fourth correction in step S30 involving correcting the control signal such that the target primary pressure value is increased relative to the target primary pressure value corresponding to the control signal prior to the correction. Specifically, the correction unit 100c corrects the control signal by multiplying a gain value of 1.4 (140%) by the command current value.

After the correction unit 100c corrects the command current value in each of steps S18, S20, S21, S26, S28, S29, and S30, the arithmetic unit 100b defines the command current value after the correction as a control signal output from the controller 100 to the actuation valve 70.

As an alternative to the above embodiment in which the actuation valve 70 is provided upstream (in the delivery fluid passage 40) of the first operation valves 56, for example, the actuation valve 70 may be provided at an intermediate point of the fifth traveling fluid passage 42e.

Figure 10:
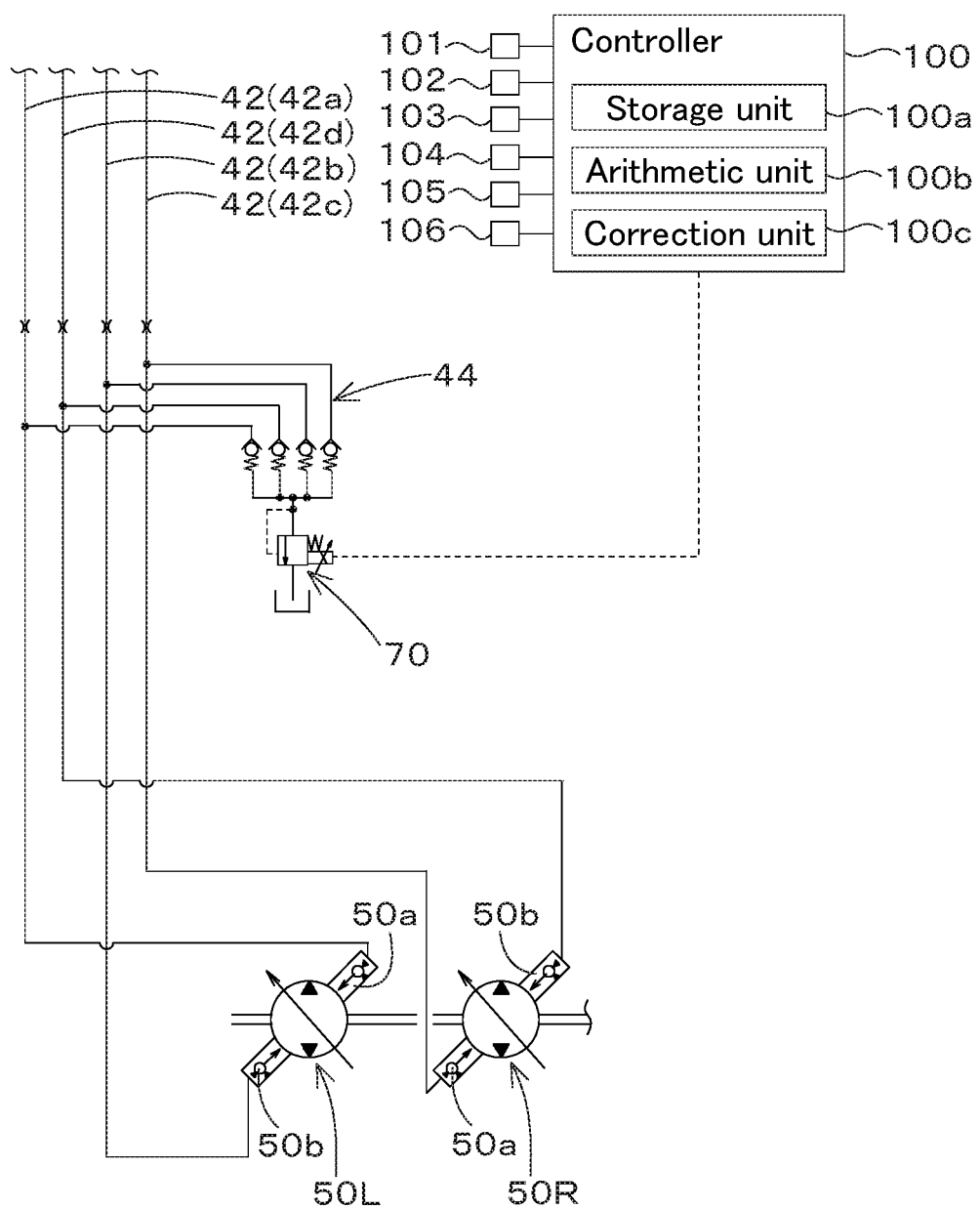
FIG. 10 illustrates an example where an actuation valve is provided at a secondary port of the operation valve.

As another alternative, as illustrated in FIG. 10, the actuation valve 70 may be provided in the traveling fluid passages 42 connected to the traveling pumps 50 (the first traveling pump SOL and the second traveling pump 50R). In detail, fluid passages 44 may branch off from the first traveling fluid passage 42a, the second traveling fluid passage 42b, the third traveling fluid passage 42c, and the fourth traveling fluid passage 42d. The actuation valve 70, such as a variable relief valve or a solenoid valve, may be provided in the fluid passages 44, and the opening of the actuation valve 70 may be controlled in accordance with a first control signal and a second control signal.

Figure 11:
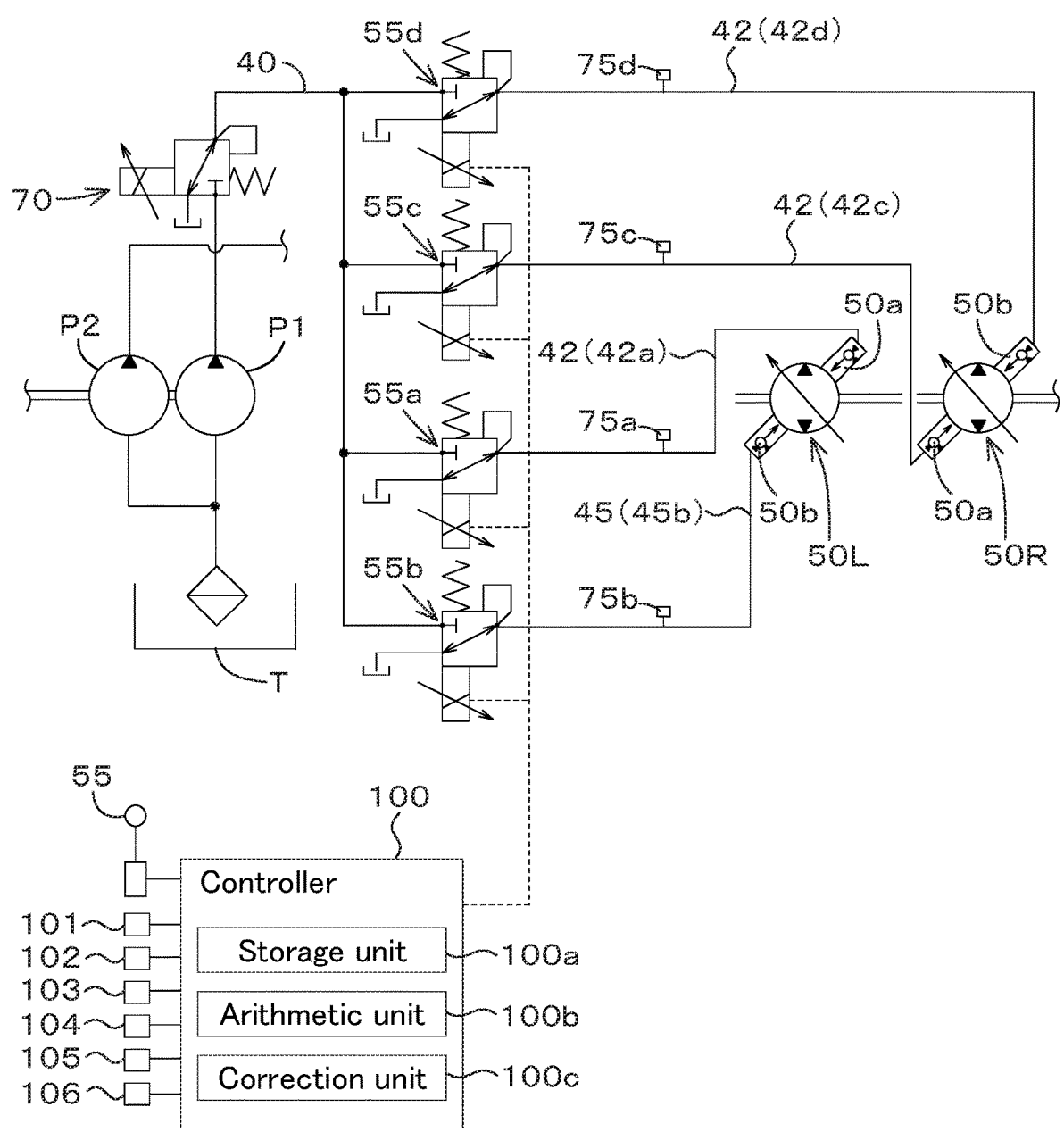
FIG. 11 illustrates a modification in which an operation device is changed to an electrically-driven operation device, such as a joystick.

As an alternative to the above embodiment in which the first operation device 54 is of a hydraulic type that changes the pilot pressure applied to the traveling pumps 50 (the first traveling pump 50L and the second traveling pump 50R) by the first operation valves 56, the first operation device 54 may be an electrically-driven device, as illustrated in FIG. 11.

As illustrated in FIG. 11, the first operation device 54 includes the first operation member 55 that pivots in the left-right direction (machine-body width direction) or the front-rear direction, and the first operation valves 56 (a first pilot valve 56a, a second pilot valve 56b, a third pilot valve 56c, and a fourth pilot valve 56d) formed of solenoid valves. The controller 100 is connected to an operation detector that detects the operational amount and the operational direction of the first operation member 55. Based on the operational amount and the operational direction detected by the operation detector, the controller 100 controls the first operation valves 56 (the first pilot valve 56a, the second pilot valve 56b, the third pilot valve 56c, and the fourth pilot valve 56d).

When the first operation member 55 is operated forward (in the direction of the arrow A1 in FIG. 1), the controller 100 outputs a control signal to the first pilot valve 56a and the third pilot valve 56c to cause the swash plates of the first traveling pump SOL and the second traveling pump 50R to pivot in the direction of forward rotation.

When the first operation member 55 is operated rearward (in the direction of the arrow A2 in FIG. 1), the controller 100 outputs a control signal to the second pilot valve 56b and the fourth pilot valve 56d to cause the swash plates of the first traveling pump SOL and the second traveling pump 50R to pivot in the direction of rearward rotation.

When the first operation member 55 is operated leftward (in the direction of the arrow A3 in FIG. 1), the controller 100 outputs a control signal to the second pilot valve 56b and the third pilot valve 56c to cause the swash plate of the first traveling pump SOL to pivot in the direction of reverse rotation and the swash plate of the second traveling pump 50R to pivot in the direction of forward rotation.

When the first operation member 55 is operated rightward (in the direction of the arrow A4 in FIG. 1), the controller 100 outputs a control signal to the first pilot valve 56a and the fourth pilot valve 56d to cause the swash plate of the first traveling pump 50L to pivot in the direction of forward rotation and the swash plate of the second traveling pump 50R to pivot in the direction of reverse rotation.

Figure 12:
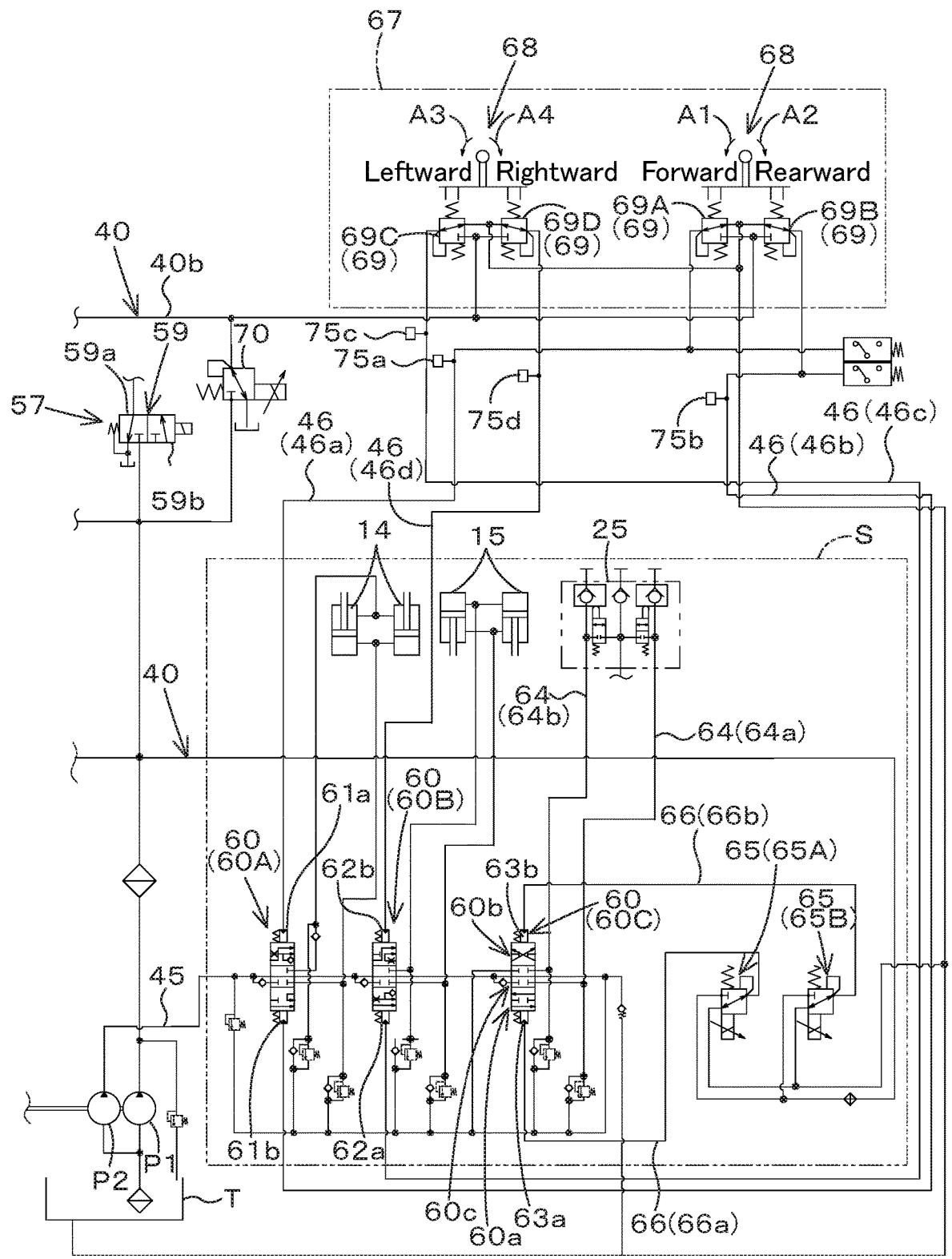
FIG. 12 illustrates a modification applied to the hydraulic circuit of the working system according to the first embodiment.

The above embodiment relates to an example where the actuation valve 70 is provided in the first delivery fluid passage 40a, the controller 100 performs the anti-stall control in the hydraulic system of the traveling system, the hydraulic unit S includes the traveling pumps 50 and the traveling motors 51, the operation member is the first operation member 55, and the operation valves are the first operation valves 56. Alternatively, as illustrated in FIG. 12, the present invention is applicable to a case where the actuation valve 70 is provided in the second delivery fluid passage 40b, the controller 100 performs the anti-stall control in the hydraulic system of the working system, the hydraulic unit S includes the hydraulic actuators and the control valves 60, the operation member is the second operation member 68, and the operation valves are the second operation valves 69. In such a case, the first pressure detector 75 is different in being provided in each of the first working fluid passage 46a, the second working fluid passage 46b, the third working fluid passage 46c, and the fourth working fluid passage 46d. In detail, the first pressure detection unit 75a is provided in the first working fluid passage 46a, and the second pressure detection unit 75b is provided in the second working fluid passage 46b. The third pressure detection unit 75c is provided in the third working fluid passage 46c, and the fourth pressure detection unit 75d is provided in the fourth working fluid passage 46d. In a case where the present invention is applied to the hydraulic system of the working system, the control is performed similarly to the case where the present invention is applied to the hydraulic system of the traveling system. Therefore, a detailed description will be omitted.

The working machine 1 described above includes the prime mover 6, the rotation-speed operation actuator 103 that controls the target rotation speed of the prime mover 6, the rotation detector 104 that detects the actual rotation speed of the prime mover 6, the hydraulic pump P1 that operates in accordance with the power from the prime mover 6 and that delivers a hydraulic fluid, the hydraulic unit S driven by the hydraulic fluid, the operation valves 56 and 69 that are capable of changing the pilot pressure of the pilot fluid supplied from the hydraulic pump P1 to the hydraulic unit S in accordance with operations of the operation members 55 and 68, the actuation valve 70 that is actuated in accordance with a control signal and that is capable of changing the primary pressure serving as the pilot pressure of the pilot fluid supplied to the operation valves 56 and 69 from the hydraulic pump P1, and the controller 100 that outputs a control signal based on a difference between the target rotation speed and the actual rotation speed to the actuation valve 70 to control the opening of the actuation valve 70. The controller 100 has a mode involving calculating the control signal based on the difference between the target rotation speed and the actual rotation speed, correcting the calculated control signal, and increasing or decreasing a target primary pressure value determined in accordance with the control signal. According to the above configuration, even in a case where the opening of the actuation valve 70 is changed in accordance with the difference between the target rotation speed and the actual rotation speed, that is, the magnitude of an engine drop, the controller 100 can still flexibly change the opening of the actuation valve 70 by performing the correction. Therefore, even when the controller 100 is performing control involving controlling the actuation valve 70 based on the difference between the target rotation speed and the actual rotation speed and suppressing an engine stall of, for example, the prime mover 6, the opening of the actuation valve 70 is changed by correcting the control signal regardless of the control signal prior to the correction, thereby achieving enhanced operability of the operation valves 56 and 69. Consequently, the working machine 1 can both suppress an engine stall and ensure the operability of the hydraulic unit S.

Furthermore, the controller 100 is switchable between a plurality of modes. According to the above configuration, even in a case where the opening of the actuation valve 70 is changed in accordance with the difference between the target rotation speed and the actual rotation speed, that is, the magnitude of an engine drop, the controller 100 can still flexibly change the opening of the actuation valve 70 by switching modes. Therefore, even when the controller 100 is performing control involving controlling the actuation valve 70 based on the difference between the target rotation speed and the actual rotation speed and suppressing an engine stall of, for example, the prime mover 6, the opening of the actuation valve 70 is changed by correcting the control signal regardless of the control signal prior to the correction, thereby achieving enhanced operability of the operation valves 56 and 69.

Furthermore, the working machine 1 includes the pressure detector 75 that detects the secondary pressure serving as the pilot pressure output from the operation valves 56 and 69 to the hydraulic unit S. The controller 100 is switchable to a mode for performing the first correction involving correcting the control signal such that the target primary pressure value is changed in accordance with the secondary pressure detected by the pressure detector 75. According to the above configuration, the controller 100 can switch modes to change the output (primary pressure) of the actuation valve 70 in accordance with the secondary pressure serving as the pilot pressure output from the operation valves 56 and 69. In other words, the target primary pressure value output from the actuation valve 70, where appropriate, can be changed in accordance with the operational state of each of the operation valves 56 and 69, so that the working machine 1 can achieve enhanced operability of the operation valves 56 and 69.

The controller 100 performs the first correction involving correcting the control signal such that the target primary pressure value is reduced relative to the target primary pressure value corresponding to the control signal prior to the correction and is proportional to the secondary pressure detected by the pressure detector 75. According to the above configuration, the operation valves 56 and 69 each reduce the primary pressure and output the secondary pressure, so that with the controller 100 performing the first correction, the target primary pressure value output from the actuation valve 70, that is, the pressure (pilot pressure) and the flow rate of the pilot fluid supplied to the operation valves 56 and 69 can be reduced, whereby the operation valves 56 and 69 can finely adjust the output secondary pressure. Furthermore, with the primary pressure output from the actuation valve 70 being changed in accordance with the secondary pressure output from the operation valves 56 and 69, the controller 100 can change the primary pressure output from the actuation valve 70 in accordance with the state of each of the operation valves 56 and 69, thereby further enhancing the operability.

The control signal is a current value output to the actuation valve 70, and the controller 100 corrects the current value prior to the correction in accordance with a gain value and performs the first correction involving gradually correcting the current value output to the actuation valve 70 by gradually changing the gain value. According to the above configuration, the controller 100 moderately corrects the control signal and does not rapidly change the opening of the actuation valve 70 in the first correction. Therefore, when the controller 100 is performing the first correction, the responsiveness of the opening of the operation valves 56 and 69 becomes moderate relative to operations performed on the operation members 55 and 68, so that the operator can finely adjust the opening of the operation valves 56 and 69 slowly toward the target secondary pressure, whereby a highly-accurate operation can be performed.

If the operational amount of the operation members 55 and 68 is greater than or equal to a predetermined amount and the secondary pressure detected by the pressure detector 75 is higher than or equal to the first threshold value, the controller 100 is switchable to a mode including performing the second correction involving correcting the control signal such that the target primary pressure value becomes higher than or equal to the primary pressure corresponding to the control signal prior to the correction. According to the above configuration, when the operational amount of the operation members 55 and 68 is greater than or equal to the predetermined amount, the primary pressure serving as the pilot pressure of the pilot fluid supplied to the operation valves 56 and 69 is increased, so that the responsiveness to operations performed on the operation members 55 and 68 can be enhanced. Thus, the responsiveness of the operation valves 56 and 69 can be changed in accordance with the operational amount of the operation members 55 and 68.

The controller 100 is switchable to the first mode including performing the first correction if the secondary pressure detected by the pressure detector 75 is lower than the first threshold value and performing the second correction if the secondary pressure detected by the pressure detector 75 is higher than or equal to the first threshold value. According to the above configuration, if the operational amount of the operation members 55 and 68 is smaller than the predetermined amount, the operator can operate the operation members 55 and 68 to finely adjust the secondary pressure output from the operation valves 56 and 69. In contrast, if the operational amount of the operation members 55 and 68 is greater than or equal to the predetermined amount, a highly-responsive feedback can be generated. Therefore, the working machine 1 can control the actuation valve 70 based on an engine drop while prioritizing fine operability or responsiveness in accordance with an operation of each of the operation valves 56 and 69.

The pressure detector 75 that detects the secondary pressure serving as the pilot pressure output from the operation valves 56 and 69 to the hydraulic unit S is provided, and if the secondary pressure detected by the pressure detector 75 is lower than the second threshold value serving as the lowest pilot pressure outputtable from the operation valves 56 and 69, the controller 100 is switchable to a mode including performing the third correction involving correcting the control signal such that the target primary pressure value is increased relative to the primary pressure corresponding to the control signal prior to the correction. According to the above configuration, when the operational amount of the operation valves 56 and 69 is an operational amount at which a pilot fluid is not to be delivered, that is, an operational amount corresponding to a dead band of each of the operation valves 56 and 69, the primary pressure serving as the pilot pressure of the pilot fluid supplied to the operation valves 56 and 69 is increased in advance, so that the responsiveness to operations performed on the operation members 55 and 68 can be enhanced without applying an excessive load on the prime mover 6.

If the secondary pressure detected by the pressure detector 75 is lower than the second threshold value that is the minimum pilot pressure outputtable from the operation valves 56 and 69 and that is smaller than the first threshold value, the controller 100 is switchable to a mode including performing the third correction involving correcting the control signal such that the target primary pressure value is increased relative to the primary pressure corresponding to the control signal prior to the correction, and is switchable to the second mode involving performing the third correction if the secondary pressure detected by the pressure detector 75 is lower than the second threshold value, performing the first correction if the secondary pressure detected by the pressure detector 75 is higher than the second threshold value and lower than the first threshold value, and performing the second correction if the secondary pressure detected by the pressure detector 75 is higher than or equal to the first threshold value. According to the above configuration, if the operational amount of the operation valves 56 and 69 is an operational amount at which a pilot fluid is not to be delivered, the responsiveness to operations performed on the operation members 55 and 68 can be enhanced without applying an excessive load on the prime mover 6. Furthermore, if the operational amount of the operation members 55 and 68 is smaller than the predetermined amount, the operator can operate each of the operation members 55 and 68 to finely adjust the secondary pressure output from each of the operation valves 56 and 69. If the operational amount of the operation members 55 and 68 is greater than or equal to the predetermined amount, a highly-responsive feedback can be generated. Therefore, the working machine 1 can control the actuation valve 70 based on an engine drop while prioritizing fine operability or responsiveness in accordance with an operation of each of the operation valves 56 and 69.

The controller 100 is switchable to the third mode including performing the fourth correction involving correcting the control signal such that the target primary pressure value is increased relative to the target primary pressure value corresponding to the control signal prior to the correction. According to the above configuration, the primary pressure serving as the pilot pressure of the pilot fluid supplied to the operation valves 56 and 69 is increased regardless of the secondary pressure output from the operation valves 56 and 69, so that the responsiveness of the operation valves 56 and 69 to operations performed on the operation members 55 and 68 can be enhanced.

The working machine 1 includes the pressure detector 75 that detects the secondary pressure serving as the pilot pressure output from the operation valves 56 and 69 to the hydraulic unit S. The controller 100 performs the fourth correction involving correcting the control signal such that the target primary pressure value is increased in accordance with the secondary pressure detected by the pressure detector 75. According to the above configuration, in the fourth correction, the controller 100 can change the output (primary pressure) of the actuation valve 70 in accordance with the secondary pressure serving as the pilot pressure output from the operation valves 56 and 69. In other words, the target primary pressure value output from the actuation valve 70, where appropriate, can be changed in accordance with the operational state of each of the operation valves 56 and 69, so that the working machine 1 can achieve enhanced operability of the operation valves 56 and 69.

Furthermore, the controller 100 performs the fourth correction involving correcting the control signal such that the target primary pressure value is increased relative to the target primary pressure value corresponding to the control signal prior to the correction and is proportional to the secondary pressure detected by the pressure detector 75. According to the above configuration, the operation valves 56 and 69 reduce the primary pressure and output the secondary pressure, so that with the controller 100 performing the fourth correction, the target primary pressure value output from the actuation valve 70, that is, the pressure (pilot pressure) and the flow rate of the pilot fluid supplied to the operation valves 56 and 69 can be increased, whereby the primary pressure output from the actuation valve 70 is changed in accordance with the secondary pressure output from the operation valves 56 and 69. Consequently, the controller 100 can change the primary pressure output from the actuation valve 70 in accordance with the state of each of the operation valves 56 and 69, thereby further enhancing the operability.

The controller 100 switches to the fourth mode if the difference between the target rotation speed and the actual rotation speed is greater than or equal to the third threshold value. In the fourth mode, the controller 100 controls the opening of the actuation valve 70 based on the calculated control signal without correcting the control signal. According to the above configuration, if an engine drop is greater than or equal to a predetermined amount, the control signal is not corrected, so that the control based on the engine drop can be prioritized.

The working machine 1 includes the temperature detector 106 that detects the temperature of the pilot fluid. If the temperature of the pilot fluid detected by the temperature detector 106 is lower than the fourth threshold value, the controller 100 switches to the fourth mode. In the fourth mode, the controller 100 controls the opening of the actuation valve 70 based on the calculated control signal without correcting the control signal. According to the above configuration, if the temperature of the pilot fluid is low and has high viscosity, the control signal is not corrected. In other words, the target primary pressure value is not reduced, at least compared to the control prior to the correction, so that a situation where the primary pressure is reduced more than necessary can be suppressed. Accordingly, with the controller 100 switching modes, an occurrence of a low-responsive feedback can be suppressed.

The working machine 1 includes the switching member (operation actuator) 105 that is operable. The controller 100 is capable of switching modes in accordance with an operation of the switching member (operation actuator) 105. According to the above configuration, the operator can freely switch modes of the controller 100, so that the mode can be flexibly changed in accordance with, for example, the working state of the working machine 1, thereby readily achieving the operability desired by the operator.

The hydraulic unit S includes the traveling pumps 50 that operate in accordance with the power from the prime mover 6 and the traveling motors 51 that are rotatable in accordance with the hydraulic fluid delivered by the traveling pumps 50. The operation valves (first operation valves) 56 change the secondary pressure serving as the pilot pressure output to the traveling pumps 50 in accordance with an operation of the operation member 55. The traveling pumps 50 are capable of changing the flow rate of the hydraulic fluid output in accordance with the secondary pressure changed by the operation valves 56. The traveling motors 51 operate in accordance with the flow rate of the hydraulic fluid output from the traveling pumps 50. According to the above configuration, when the working machine 1 is traveling, the controller 100 controls the actuation valve 70 based on an engine drop, so that a decrease in the operability of the first operation valves 56 can be suppressed. Therefore, the operator can receive a highly-operable feedback, while control that suppresses an engine stall can be performed.

The hydraulic unit S includes the hydraulic actuators that drive the working device 4 and the control valves 60 that control the hydraulic fluid supplied to the hydraulic actuators. The operation valves (second operation valves) 69 change the secondary pressure serving as the pilot pressure output to the control valves 60 in accordance with an operation of the second operation member 68, the control valves 60 are capable of changing the flow rate of the hydraulic fluid output in accordance with the secondary pressure changed by the operation valves 69, and the hydraulic actuators operate in accordance with the flow rate of the hydraulic fluid output from the control valves 60. According to the above configuration, when the working machine 1 is performing a working process, the controller 100 controls the actuation valve 70 based on an engine drop, so that a decrease in the operability of the operation valves 69 can be suppressed. Therefore, the operator can receive a highly-operable feedback, while control that suppresses an engine stall can be performed.

Second Embodiment

FIG. 13 to FIG. 16 illustrate another embodiment (second embodiment) of the working machine 1.

The following description mainly focuses on how the working machine 1 according to the second embodiment is different from that in the above embodiment (first embodiment). Components identical to those in the first embodiment will be given the same reference signs, and detailed descriptions thereof will be omitted. In detail, the controller 100 in the working machine 1 according to the first embodiment corrects the control signal calculated from the second line Lb in accordance with the secondary pressure detected by the first pressure detector 75 when the drop rotation speed calculated by the arithmetic unit 100b in the correction mode is higher than or equal to the first set value. In contrast, the controller 100 in the working machine 1 according to the second embodiment corrects the control signal calculated from the second line Lb in accordance with a pressure (traveling pressure) different from the secondary pressure.

Figure 13:
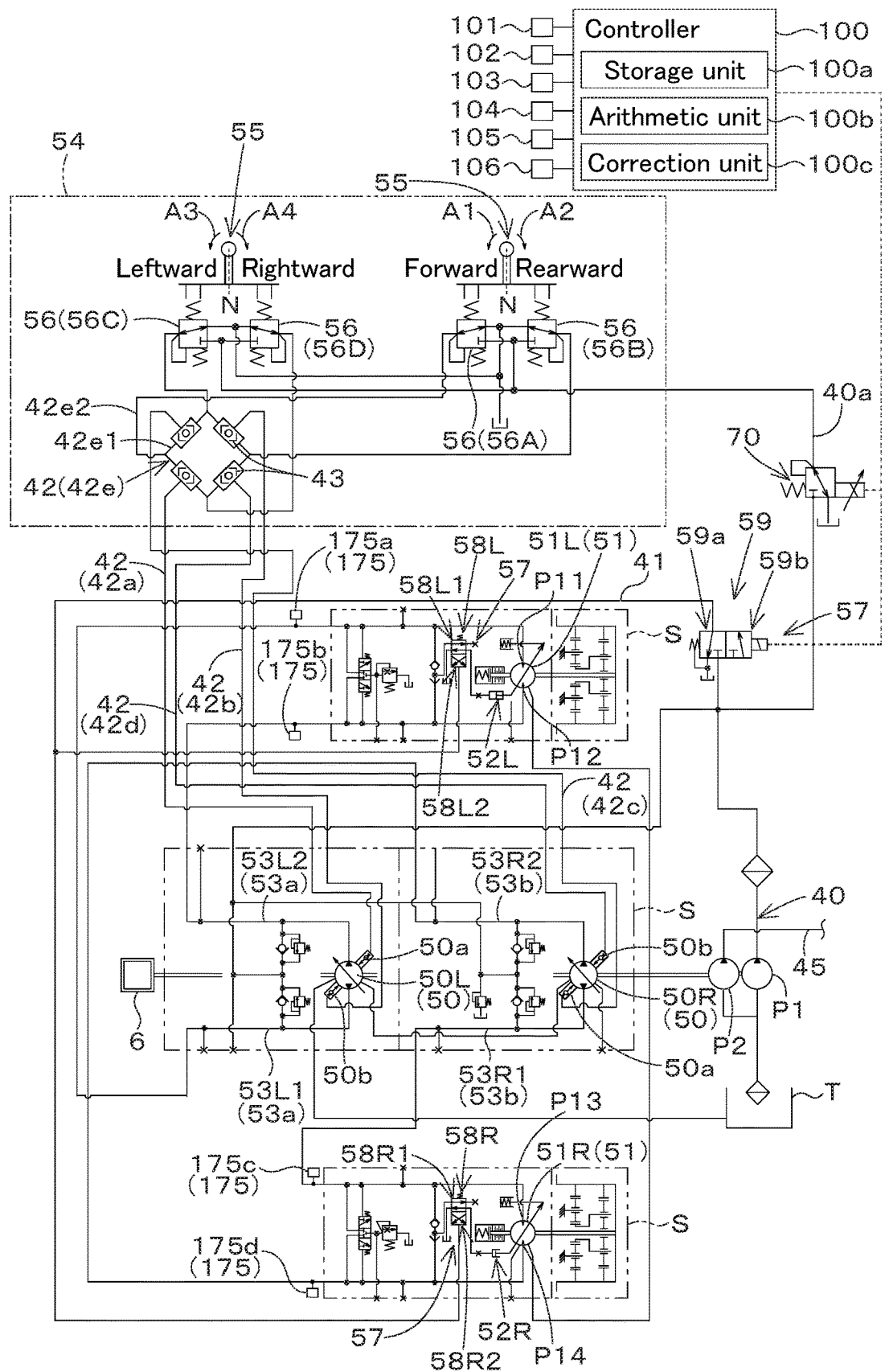
FIG. 13 illustrates a hydraulic circuit of a traveling system in a hydraulic system (hydraulic circuit) of a working machine according to a second embodiment.

Specifically, as illustrated in FIG. 13, the working machine 1 according to the second embodiment includes a pressure detector 175 in place of the first pressure detector 75. The pressure detector 175 detects the pressure of the hydraulic fluid flowing through the circulation fluid passages 53a and 53b, that is, the pressure (traveling pressure) of the hydraulic fluid supplied from the traveling pumps 50 to the traveling motors 51. For the sake of convenience, the pressure detector 175 will be referred to as "second pressure detector 175" hereinafter. The second pressure detector 175 is connected to the controller 100 and inputs a detected signal (detection signal) to the controller 100. The second pressure detector 175 is a pressure sensor and is provided in the circulation fluid passages 53a and 53b that connect the traveling pumps 50 (the first traveling pump 50L and the second traveling pump 50R) to the traveling motors 51 (the first traveling motor 51L and the second traveling motor 51R). In detail, the second pressure detector 175 includes a first pressure detection unit 175a, a second pressure detection unit 175b, a third pressure detection unit 175c, and a fourth pressure detection unit 175d.

The first pressure detection unit 175a is provided in the circulation fluid passage 53a (first circulation fluid passage 53L1) that connects the first traveling pump 50L and the first traveling motor 51L to each other and is disposed toward a first port P11 of the first traveling motor 51L relative to the first traveling pump 50L. Accordingly, the first pressure detection unit 175a detects a traveling pump pressure at the first port P11 as a first traveling pressure V1.

The second pressure detection unit 175b is provided in the circulation fluid passage 53a (second circulation fluid passage 53L2) that connects the first traveling pump 50L and the first traveling motor 51L to each other and is disposed toward a second port P12 of the first traveling motor 51L relative to the first traveling pump 50L. Accordingly, the second pressure detection unit 175b detects a traveling pump pressure at the second port P12 as a second traveling pressure V2.

The third pressure detection unit 175c is provided in the circulation fluid passage 53b (third circulation fluid passage 53R1) that connects the second traveling pump 50R and the second traveling motor 51R to each other and is disposed toward a third port P13 of the second traveling motor 51R relative to the second traveling pump 50R. Accordingly, the third pressure detection unit 175c detects a traveling pump pressure at the third port P13 as a third traveling pressure V3.

The fourth pressure detection unit 175d is provided in the circulation fluid passage 53b (fourth circulation fluid passage 53R2) that connects the second traveling pump 50R and the second traveling motor 51R to each other and is disposed toward a fourth port P14 of the second traveling motor 51R relative to the second traveling pump 50R. Accordingly, the fourth pressure detection unit 175d detects a traveling pump pressure at the fourth port P14 as a fourth traveling pressure V4.

Although the second pressure detector 175 is capable of detecting the four traveling pump pressures (the first traveling pressure V1, the second traveling pressure V2, the third traveling pressure V3, and the fourth traveling pressure V4) in the circulation fluid passages 53a and 53b, the controller 100 according to this embodiment uses an average value of the first traveling pressure V1 to the fourth traveling pressure V4 as the traveling pressure in the anti-stall control.

The first traveling pressure V1 to the fourth traveling pressure V4 detected by the second pressure detector 175 change in accordance with the operational amount of the first operation member 55 as illustrated in FIG. 4, that is, the secondary pressure output from the first operation valves 56. In other words, when the first operation member 55 is located near the neutral position N, that is, when the operational amount is larger than or equal to the operational amount G0 at the neutral position N and smaller than the first operational amount G1, the secondary pressure output from the first operation valves 56 is zero, so that the second pressure detector 175 detects that the traveling pressure is zero.

As described in the first embodiment, when the operational amount of the first operation member 55 is larger than or equal to the first operational amount G1 and smaller than or equal to the second operational amount G2, the first operation valves 56 change the secondary pressure output in proportion to an operation of the first operation member 55. Therefore, the traveling pumps 50 output the hydraulic fluid to the traveling motors 51 in accordance with the secondary pressure with the magnitude that is proportional to the operational amount of the first operation member 55 output from the first operation valves 56. For the sake of convenience, when the operational amount of the first operation member 55 is the first operational amount G1 and the secondary pressure output from the first operation valves 56 is the first pressure Pa, the pressure of the hydraulic fluid output from the traveling pumps 50 to the traveling motors 51, that is, the traveling pressure detected by the second pressure detector 175, will be referred to as "traveling pressure Pa'". When the operational amount of the first operation member 55 is the second operational amount G2 and the secondary pressure output from the first operation valves 56 is the second pressure Pb, the pressure of the hydraulic fluid output from the traveling pumps 50 to the traveling motors 51, that is, the traveling pressure detected by the second pressure detector 175, will be referred to as "traveling pressure Pb'".

As described in the first embodiment, in the period between when the operational amount of the first operation member 55 exceeds the second operational amount G2 and when the operational amount of the first operation member 55 reaches the third operational amount G3 corresponding to a full stroke, the secondary pressure output from the first operation valves 56, that is, the secondary pressure detected by the first pressure detector 75, becomes the third pressure Pc that is equal to the primary pressure. Therefore, the traveling pumps 50 output the hydraulic fluid to the traveling motors 51 in accordance with the secondary pressure (third pressure Pc) output from the first operation valves 56. For the sake of convenience, the pressure of the hydraulic fluid output from the traveling pumps 50 to the traveling motors 51, that is, the traveling pressure detected by the second pressure detector 175, in the period between when the operational amount of the first operation member 55 exceeds the second operational amount G2 and when the operational amount of the first operation member 55 reaches the third operational amount G3 will be referred to as "traveling pressure Pc".

In the anti-stall control according to the above embodiment, the controller 100 uses the average value of the first traveling pressure V1 to the fourth traveling pressure V4 as the traveling pressure. Alternatively, for example, the controller 100 may use, as the "traveling pressure", the highest differential pressure among a first differential pressure obtained by subtracting the second traveling pressure V2 from the first traveling pressure V1, a second differential pressure obtained by subtracting the first traveling pressure V1 from the second traveling pressure V2, a third differential pressure obtained by subtracting the fourth traveling pressure V4 from the third traveling pressure V3, and a fourth differential pressure obtained by subtracting the third traveling pressure V3 from the fourth traveling pressure V4. Moreover, the controller 100 may use an average of two traveling pump pressures among the plurality of traveling pump pressures (the first traveling pressure V1, the second traveling pressure V2, the third traveling pressure V3, and the fourth traveling pressure V4) as the traveling pressure in the anti-stall control, or may use an average of three traveling pump pressures as the traveling pressure in the anti-stall control. In other words, the traveling pressure used in the anti-stall control by the controller 100 is not limited to the traveling pressure mentioned above. Furthermore, in the anti-stall control, the controller 100 may use a difference between at least two traveling pressures among the plurality of traveling pressures (the first traveling pressure V1, the second traveling pressure V2, the third traveling pressure V3, and the fourth traveling pressure V4) as the traveling pressure in the anti-stall control. Specifically, in the anti-stall control, the controller 100 may use a differential pressure between traveling pump pressures as the traveling pressure, may use a traveling pump pressure itself as the traveling pressure, or may use an absolute value of a differential pressure between traveling pump pressures.

The correction unit 100c in the second embodiment will be described in detail below. The correction unit 100c according to the second embodiment is similar to the correction unit 100c according to the first embodiment in that the correction unit 100c performs any of the first correction, the second correction, the third correction, and the fourth correction in the correction mode.

In detail, the correction unit 100c performs the first correction involving correcting the control signal such that the target primary pressure value is changed in accordance with the traveling pressure detected by the second pressure detector 175 in place of the secondary pressure detected by the first pressure detector 75. Specifically, the correction unit 100c performs the first correction involving correcting the control signal such that the target primary pressure value is reduced relative to the target primary pressure value corresponding to the control signal prior to the correction and is proportional to the traveling pressure detected by the second pressure detector 175. In other words, when the correction unit 100c performs the first correction, the gain value is at least smaller than 1 and is proportional to the secondary pressure, as indicated in the second segment m2 of the first correction function M1 and the fifth segment m5 of the second correction function M2 illustrated in a map in FIG. 14A.

If the operational amount of the operation member (first operation member 55) is greater than or equal to the predetermined amount and the traveling pressure detected by the second pressure detector 175 is larger than the first threshold value, the correction unit 100c performs the second correction involving correcting the control signal to a value equal to the target primary pressure value corresponding to the control signal prior to the correction or to increase the target primary pressure value. Specifically, when the correction unit 100c performs the second correction, the gain value is at least larger than 1, as indicated in the third segment m3 of the first correction function M1 and the sixth segment m6 of the second correction function M2 illustrated in the map in FIG. 14A.

The first threshold value is defined in accordance with the pressure of the hydraulic fluid supplied from the traveling pumps 50 to the traveling motors 51. In this embodiment, the first threshold value is defined as a value equal to a maximum value in a range in which the secondary pressure output from the first operation valves 56 is adjustable proportionally to an operation of the first operation member 55 when the operational amount of the first operation member 55 in FIG. 4 is the second operational amount G2 and the pressure (traveling pressure) of the hydraulic fluid supplied from the traveling pumps 50 to the traveling motors 51 is the traveling pressure Pb'.

Furthermore, if the traveling pressure detected by the second pressure detector 175 is lower than the second threshold value, the correction unit 100c performs the third correction involving correcting the control signal such that the target primary pressure value is increased relative to the primary pressure corresponding to the control signal prior to the correction. Specifically, when the correction unit 100c performs the third correction, the gain value is at least defined as a value larger than 1, as indicated in the fourth segment m4 of the second correction function M2 illustrated in the map in FIG. 14A.

The second threshold value is defined in accordance with the pressure of the hydraulic fluid supplied from the traveling pumps 50 to the traveling motors 51. In this embodiment, the second threshold value is defined as a value equal to a minimum value in the range in which the secondary pressure output from the first operation valves 56 is adjustable proportionally to an operation of the first operation member 55 when the operational amount of the first operation member 55 in FIG. 4 is the first operational amount G1 and the pressure (traveling pressure) of the hydraulic fluid supplied from the traveling pumps 50 to the traveling motors 51 is the traveling pressure Pa'.

Figure 14B:
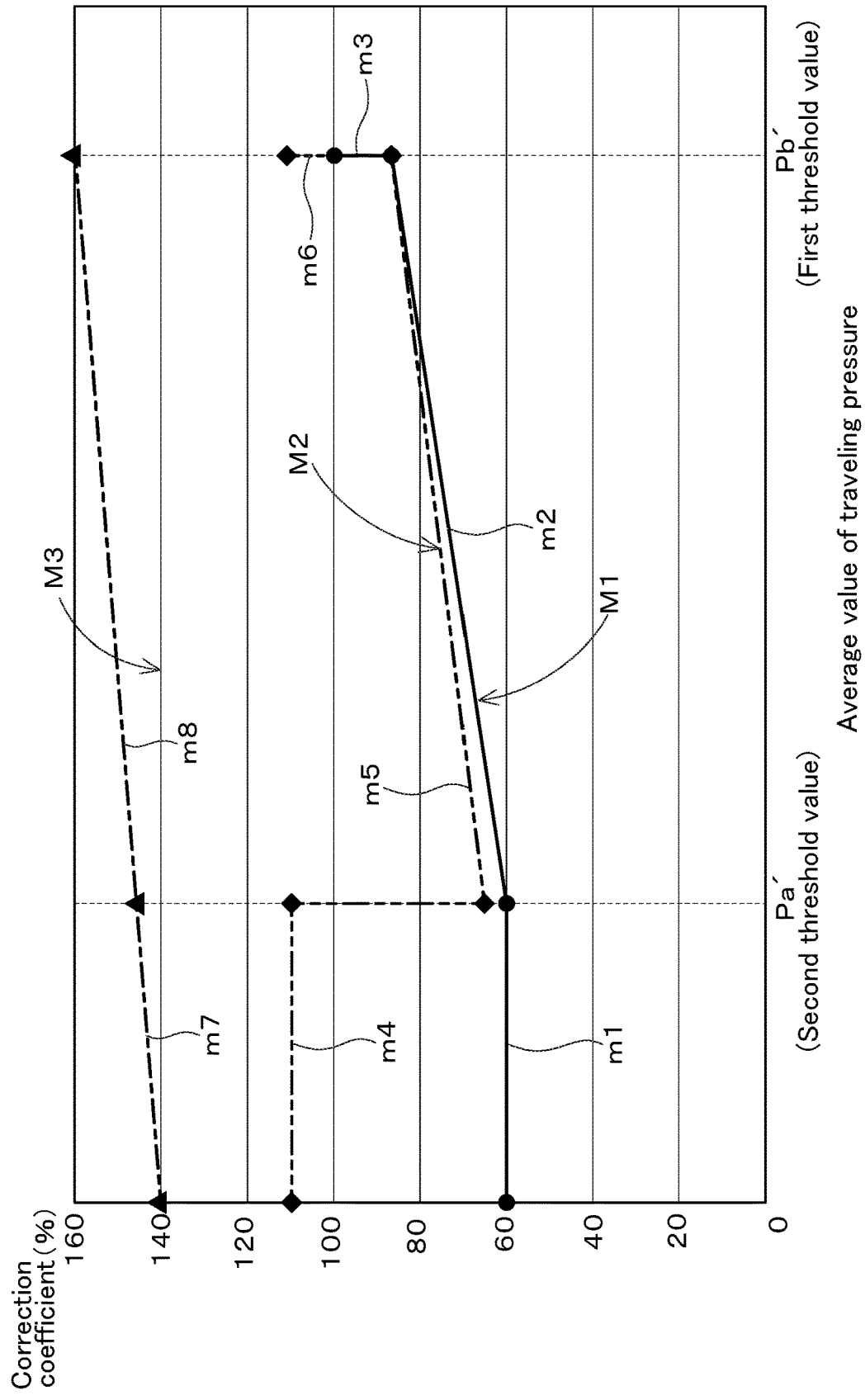
FIG. 14B illustrates an example of correction functions that define the relationship between the traveling pressure and the correction coefficient in a modification of the second embodiment.

Furthermore, the correction unit 100c performs the fourth correction involving correcting the control signal such that the target primary pressure value is increased relative to the target primary pressure value corresponding to the control signal (command current value) prior to the correction. Specifically, when the correction unit 100c performs the fourth correction, the gain value is at least defined as a value larger than 1, as indicated in the seventh segment m7 and the eighth segment m8 of the third correction function M3 illustrated in the map in FIG. 14A. As illustrated in FIG. 14A, in the fourth correction, the gain value is fixed and is not proportional to the secondary pressure, unlike the first correction. Alternatively, the gain value may be proportional to the traveling pressure, similar to the first correction, as illustrated in FIG. 14B. In detail, the correction unit 100c performs the fourth correction involving correcting the control signal such that the target primary pressure value is changed in accordance with the traveling pressure detected by the second pressure detector 175.

The correction mode includes a plurality of modes each involving performing at least one of the first correction, the second correction, the third correction, and the fourth correction. The plurality of modes include a first mode to a third mode. Since the combinations of the modes and the first to fourth corrections are identical to those in the first embodiment, a detailed description thereof will be omitted.

As indicated in the first correction function M1 in FIG. 14A, the first mode involves the correction unit 100c performing a correction to decrease the primary pressure (while the gain value is fixed) if the traveling pressure detected by the second pressure detector 175 is lower than the second threshold value, the correction unit 100c performing the first correction if the traveling pressure detected by the second pressure detector 175 is higher than or equal to the second threshold value and lower than the first threshold value, and the correction unit 100c performing the second correction if the traveling pressure detected by the second pressure detector 175 is higher than or equal to the first threshold value.

As indicated in the second correction function M2 in FIG. 14A, the second mode involves the correction unit 100c performing the third correction if the traveling pressure detected by the second pressure detector 175 is lower than the second threshold value, the correction unit 100c performing the first correction if the traveling pressure detected by the second pressure detector 175 is higher than or equal to the second threshold value and lower than the first threshold value, and the correction unit 100c performing the second correction if the traveling pressure detected by the second pressure detector 175 is higher than or equal to the first threshold value.

The third mode includes performing the fourth correction involving correcting the control signal with a fixed gain value without changing the gain value in accordance with the traveling pressure detected by the second pressure detector 175.

Figure 15:
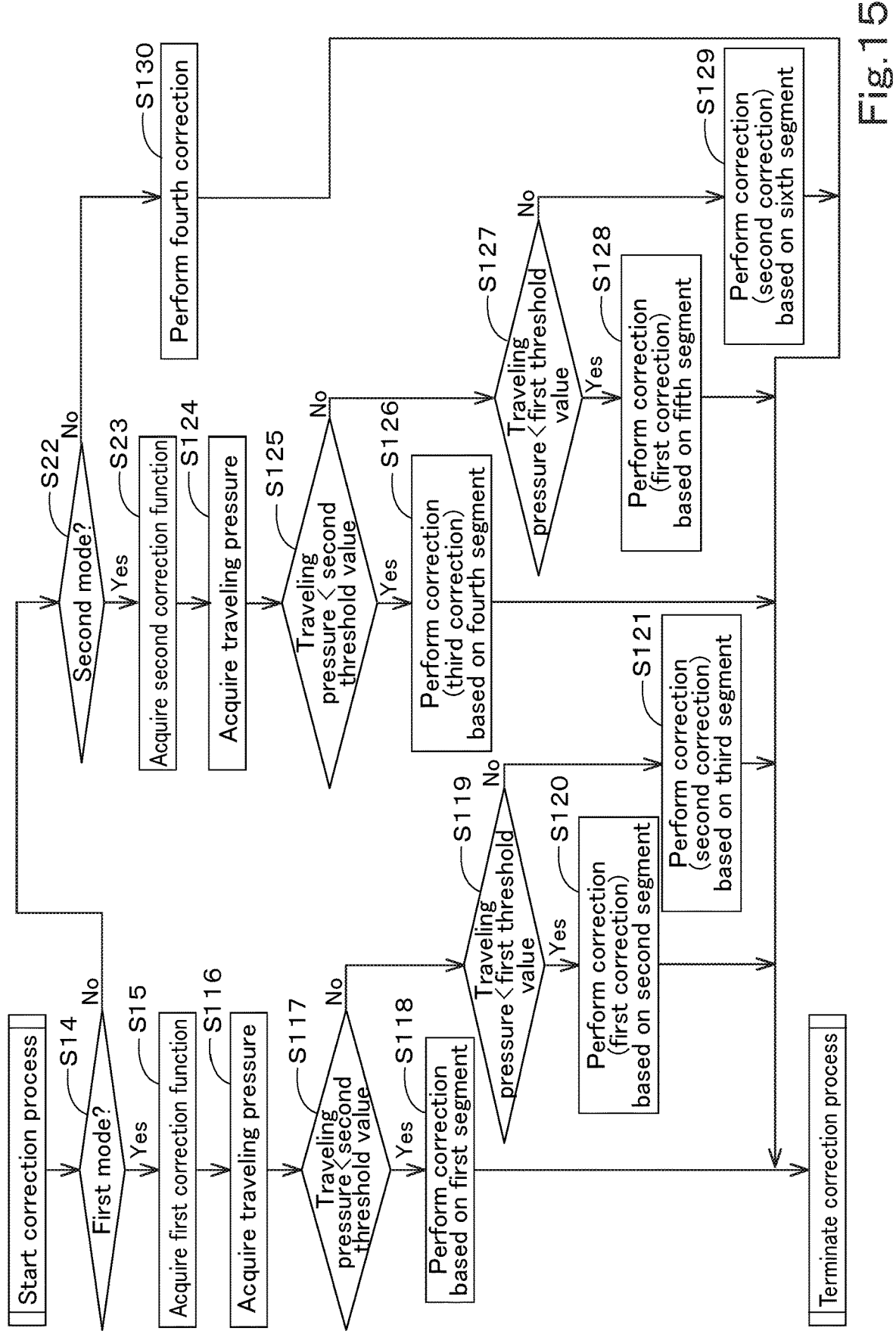
FIG. 15 illustrates the flow of a correction process in the second embodiment.

The flow of a process performed by the controller 100 for correcting the control signal (command current value) will be described below with reference to FIG. 15. Because the flow of the process performed by the controller 100 according to the second embodiment for correcting the control signal is mostly identical to that in the first embodiment, the following description will mainly focus on the differences from the first embodiment.

In detail, after transitioning to the correction process in step S13, the arithmetic unit 100b confirms in step S14 whether or not the controller 100 is in the first mode. If the arithmetic unit 100b confirms that the controller 100 is in the first mode (Yes in step S14), the correction unit 100c acquires the first correction function M1 from the storage unit 100a in step S15.

After acquiring the first correction function M1 from the storage unit 100a in step S15, the correction unit 100c acquires a traveling pressure detected by the second pressure detector 175 in step S116. After acquiring the traveling pressure detected by the second pressure detector 175 in step S116, the correction unit 100c confirms in step S117 whether or not the traveling pressure is lower than the second threshold value.

If the correction unit 100c confirms that the traveling pressure is lower than the second threshold value (Yes in step S117), the correction unit 100c corrects the control signal in step S118 such that the target primary pressure value is reduced relative to the target primary pressure value corresponding to the control signal prior to the correction.

If the correction unit 100c confirms that the traveling pressure is not lower than the second threshold value (No in step S117), the correction unit 100c confirms in step S119 whether or not the traveling pressure is lower than the first threshold value, that is, higher than or equal to the second threshold value and lower than the first threshold value. If the correction unit 100c confirms that the traveling pressure is lower than the first threshold value (Yes in step S119), the correction unit 100c performs the first correction in step S120 involving gradually correcting the command current value such that the target primary pressure value is reduced relative to the target primary pressure value corresponding to the control signal prior to the correction and is proportional to the traveling pressure detected by the second pressure detector 175.

If the traveling pressure is not lower than the first threshold value, that is, if the traveling pressure is higher than or equal to the first threshold value (No in step S119), the correction unit 100c performs the second correction in step S121 involving correcting the control signal to a value equal to the target primary pressure value corresponding to the control signal prior to the correction.

If the arithmetic unit 100b confirms that the controller 100 is not in the first mode (No in step S14), the arithmetic unit 100b confirms in step S22 whether or not the controller 100 is in the second mode. If the arithmetic unit 100b confirms that the controller 100 is in the second mode (Yes in step S22), the correction unit 100c acquires the second correction function M2 from the storage unit 100a in step S23.

After acquiring the second correction function M2 from the storage unit 100a, the correction unit 100c acquires the traveling pressure detected by the second pressure detector 175 in step S124. After acquiring the traveling pressure detected by the second pressure detector 175 in step S124, the correction unit 100c confirms in step S125 whether or not the traveling pressure is lower than the second threshold value.

If the correction unit 100c confirms that the traveling pressure is lower than the second threshold value (Yes in step S125), the correction unit 100c performs the third correction in step S126 involving correcting the control signal such that the target primary pressure value is increased relative to the primary pressure corresponding to the control signal prior to the correction.

If the correction unit 100c confirms that the traveling pressure is not lower than the second threshold value (No in step S125), the correction unit 100c confirms in step S127 whether or not the traveling pressure is lower than the first threshold value, that is, higher than or equal to the second threshold value and lower than the first threshold value. If the correction unit 100c confirms that the traveling pressure is lower than the first threshold value (Yes in step S127), the correction unit 100c performs the first correction in step S128 involving gradually correcting the command current value such that the target primary pressure value is reduced relative to the target primary pressure value corresponding to the control signal prior to the correction and is proportional to the traveling pressure detected by the second pressure detector 175.

If the traveling pressure is not lower than the first threshold value, that is, if the traveling pressure is higher than or equal to the first threshold value (No in step S127), the correction unit 100c performs the second correction in step S129 involving correcting the control signal to a value larger than or equal to the target primary pressure value corresponding to the control signal prior to the correction.

If the arithmetic unit 100b confirms that the controller 100 is not in the second mode (No in step S22), that is, if the correction unit 100c confirms that the controller 100 is in the third mode, the correction unit 100c performs the fourth correction in step S130 involving correcting the control signal such that the target primary pressure value is increased relative to the target primary pressure value corresponding to the control signal prior to the correction.

After the correction unit 100c corrects the command current value in each of steps S118, S120, S121, S126, S128, S129, and S130, the arithmetic unit 100b defines the command current value after the correction as a control signal output from the controller 100 to the actuation valve 70.

Figure 16:
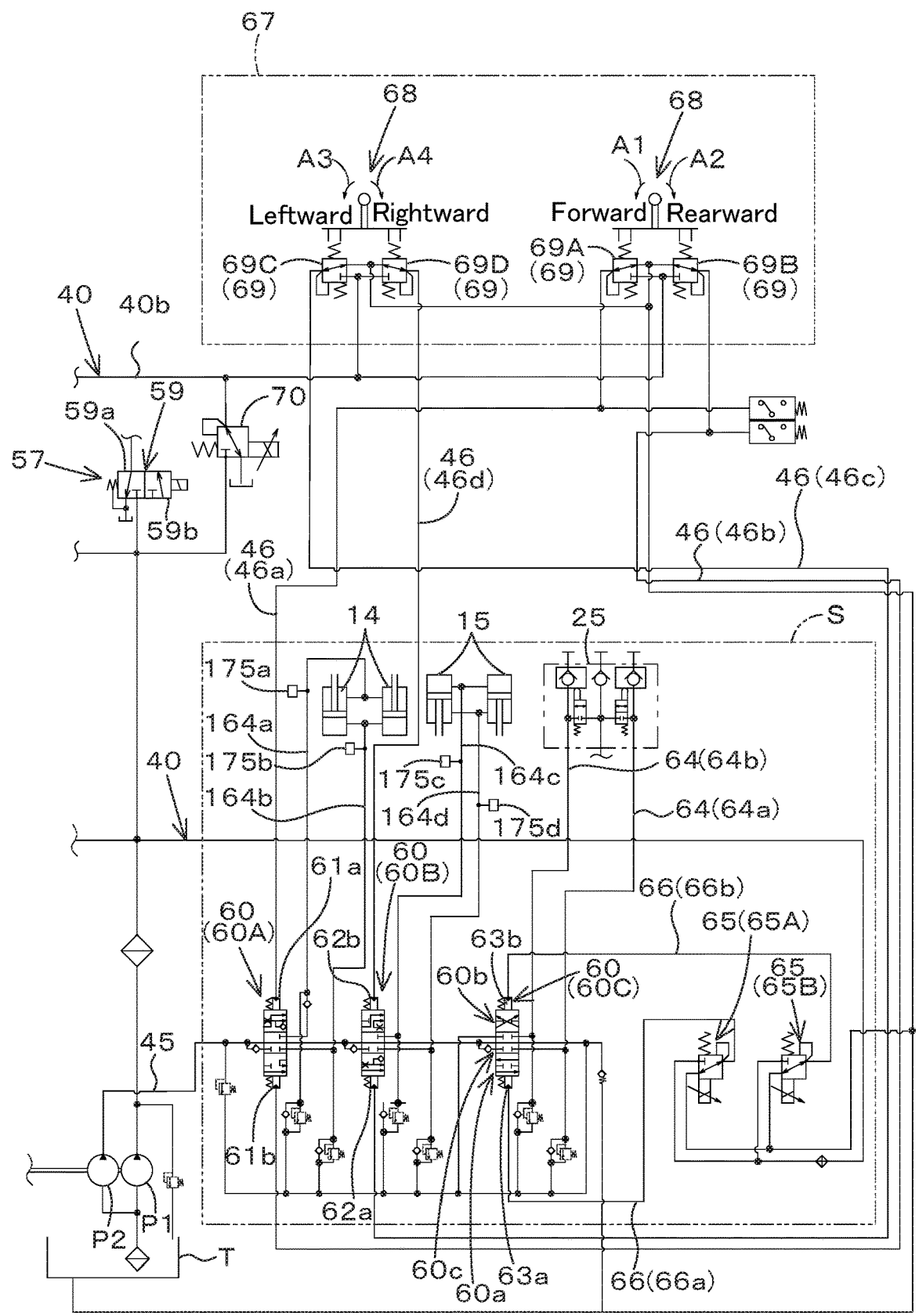
FIG. 16 illustrates a modification applied to a hydraulic circuit of a working system according to the second embodiment.

The above embodiment relates to an example where the actuation valve 70 is provided in the first delivery fluid passage 40a, the controller 100 performs the anti-stall control in the hydraulic system of the traveling system, the hydraulic unit S includes the traveling pumps 50 and the traveling motors 51, the operation member is the first operation member 55, and the operation valves are the first operation valves 56. Alternatively, as illustrated in FIG. 16, the present invention is applicable to a case where the actuation valve 70 is provided in the second delivery fluid passage 40b, the controller 100 performs the anti-stall control in the hydraulic system of the working system, the hydraulic unit S includes the hydraulic actuators and the control valves 60, the operation member is the second operation member 68, and the operation valves are the second operation valves 69. In such a case, the second pressure detector 175 is different in being provided in each of fluid passages (a first fluid passage 164a and a second fluid passage 164b) that connect the first control valve 60A to the hydraulic cylinders (boom cylinders) 14 and fluid passages (a third fluid passage 164c and a fourth fluid passage 164d) that connect the second control valve 60B to the hydraulic cylinders (bucket cylinders) 15. In detail, the first pressure detection unit 175a is provided in the first fluid passage 164a, and the second pressure detection unit 175b is provided in the second fluid passage 164b. The third pressure detection unit 175c is provided in the third fluid passage 164c, and the fourth pressure detection unit 175d is provided in the fourth fluid passage 164d. In a case where the present invention is applied to the hydraulic system of the working system, the control is performed similarly to the case where the present invention is applied to the hydraulic system of the traveling system.

Therefore, a detailed description will be omitted.

Third Embodiment

Figure 17:
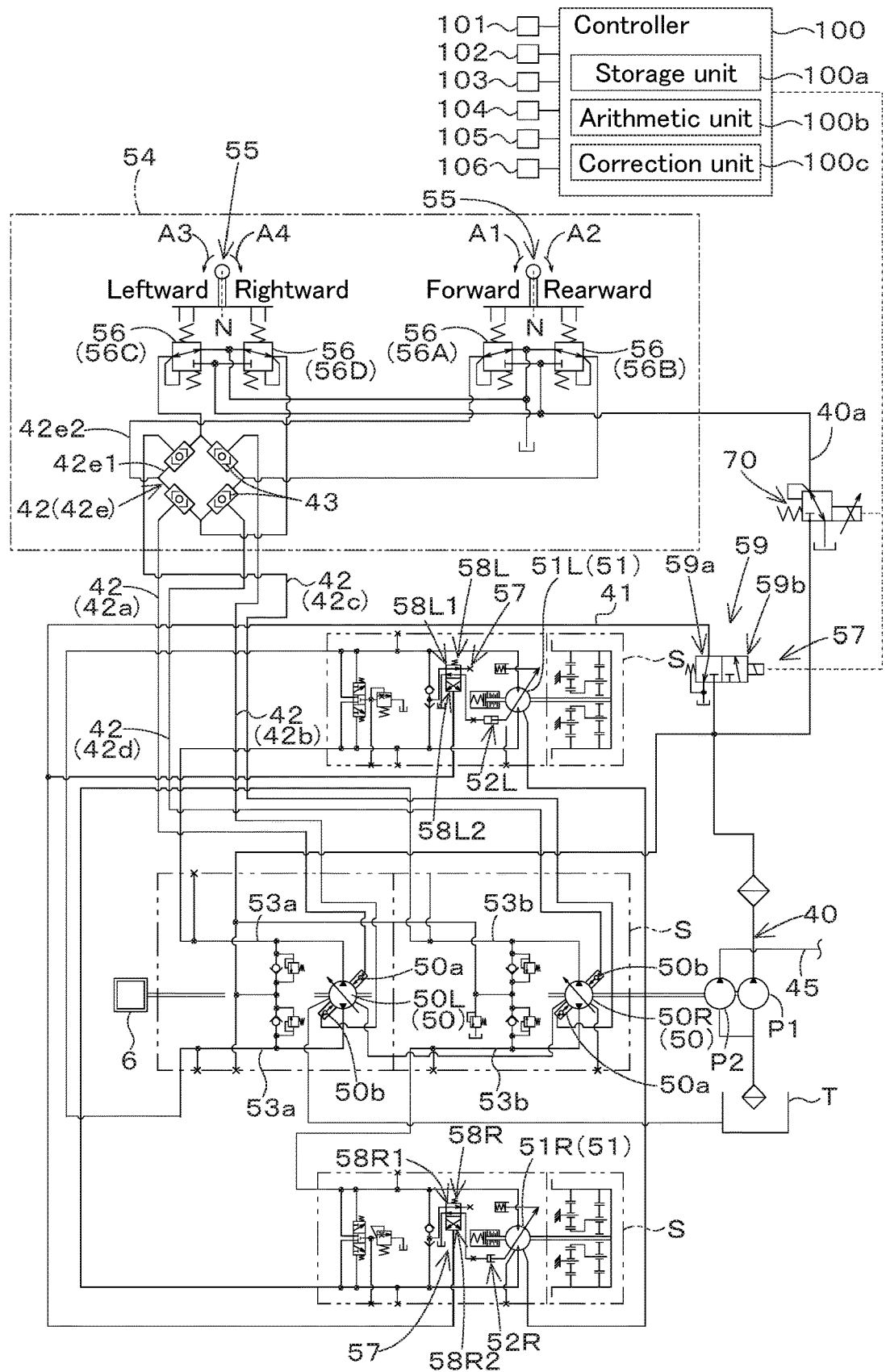
FIG. 17 illustrates a hydraulic circuit of a traveling system in a hydraulic system (hydraulic circuit) of a working machine according to a third embodiment.
Figure 18:
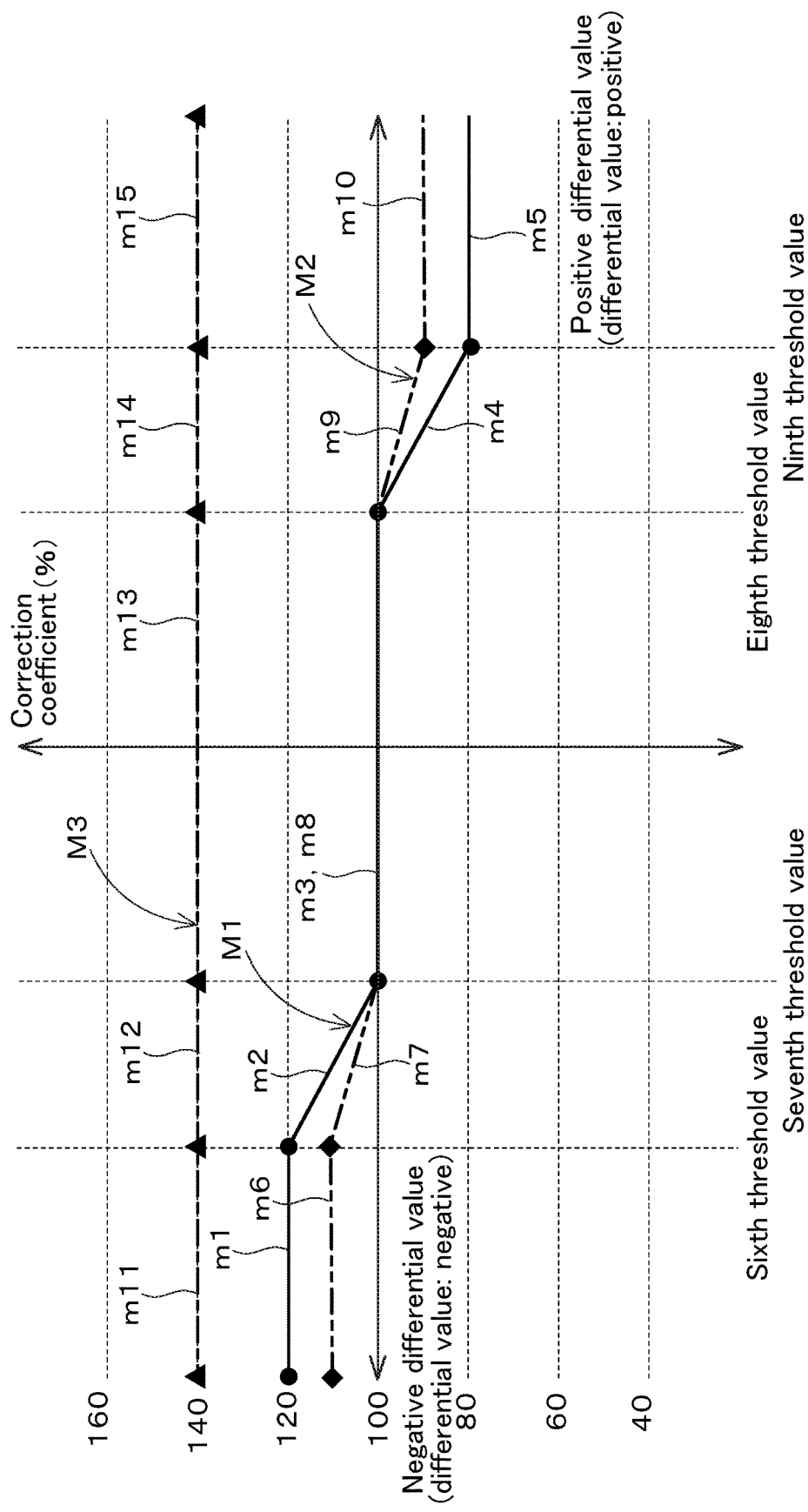
FIG. 18 illustrates an example of correction functions that define the relationship between a differential value and a correction coefficient in the third embodiment.
Figure 19:
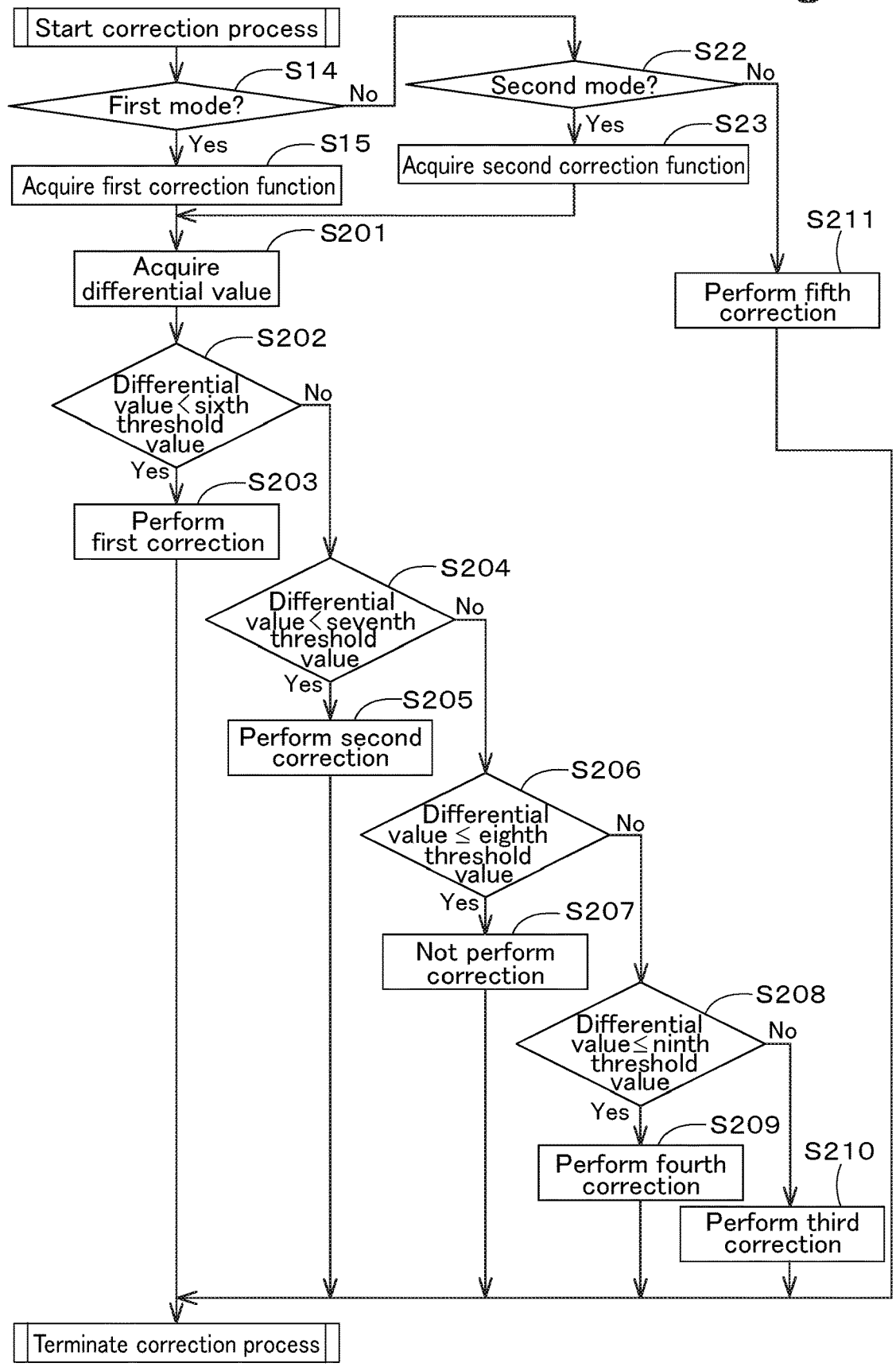
FIG. 19 illustrates the flow of a correction process in the third embodiment.

FIG. 17 to FIG. 19 illustrate another embodiment (third embodiment) of the working machine 1.

The working machine 1 according to the third embodiment will be described below while focusing on the differences from the above embodiments (the first embodiment and the second embodiment). Components identical to those in the first embodiment and the second embodiment will be given the same reference signs, and detailed descriptions thereof will be omitted. In detail, in contrast to the controller 100 according to the first embodiment that corrects the control signal in accordance with the secondary pressure and the controller 100 according to the second embodiment that corrects the control signal in accordance with the traveling pressure, the controller 100 of the working machine 1 according to the third embodiment corrects the control signal calculated from the second line Lb in accordance with a differential value indicating a rate of change (rate of change relative to time) in the actual rotation speed of the prime mover 6. As illustrated in FIG. 17, the hydraulic system of the working machine 1 according to the third embodiment is different from the systems according to the first embodiment and the second embodiment in that the hydraulic system does not include the first pressure detector 75 and the second pressure detector 175.

In the third embodiment, the arithmetic unit 100b calculates the differential value based on the rate of change relative to time in the actual rotation speed detected by the rotation detector 104.

The correction unit 100c according to the third embodiment will be described in detail below. The correction unit 100c according to the third embodiment is similar to the correction unit 100c according to the first embodiment and the correction unit 100c according to the second embodiment in that the correction unit 100c according to the third embodiment performs any of a plurality of corrections in the correction mode. In detail, the correction unit 100c according to the third embodiment performs any of a first correction, a second correction, a third correction, a fourth correction, and a fifth correction.

If the differential value calculated by the arithmetic unit 100b is smaller than a predetermined sixth threshold value, the correction unit 100c performs the first correction involving correcting the control signal such that the target primary pressure value is changed. The sixth threshold value is a preset negative value smaller than zero. If the differential value is smaller than the sixth threshold value, the correction unit 100c performs the first correction involving correcting the control signal such that the target primary pressure value is increased relative to the target primary pressure value corresponding to the control signal prior to the correction. Specifically, when the correction unit 100c performs the first correction, the gain value is at least larger than 1, as indicated in the first segment m1 of the first correction function M1 or the sixth segment m6 of the second correction function M2 illustrated in a map in FIG. 18. For example, in the first correction, the gain value is defined as a value ranging between 1.1 (110%) and 1.4 (140%). In the first correction function M1 illustrated in FIG. 18, the gain value of the first correction is 1.2 (120%). In the second correction function M2, the gain value of the first correction is 1.1 (110%). In the first correction, the gain value is fixed and is not proportional to the differential value.

If the differential value calculated by the arithmetic unit 100b is larger than or equal to the sixth threshold value and smaller than a seventh threshold value, the correction unit 100c performs the second correction involving correcting the control signal such that the target primary pressure value is changed. The seventh threshold value is larger than the sixth threshold value and is a preset negative value. Specifically, the correction unit 100c performs the second correction involving correcting the control signal such that the target primary pressure value is increased relative to the target primary pressure value corresponding to the control signal prior to the correction and is proportional to an absolute value of the differential value. In other words, when the correction unit 100c performs the second correction, the gain value is at least larger than 1 and is proportional to the absolute value of the differential value, as indicated in the second segment m2 of the first correction function M1 and the seventh segment m7 of the second correction function M2 illustrated in the map in FIG. 18. Therefore, in the second correction, the gain value increases substantially linearly as the differential value decreases, and decreases substantially linearly as the differential value increases. For example, in the second correction, the gain value is defined as a value ranging between 1.0 (100%) and 1.4 (140%), and the maximum value of the gain value matches the gain value of the first correction in the same mode. In the first correction function M1 illustrated in FIG. 18, the gain value of the second correction is defined as a value ranging between 1.0 (100%) and 1.2 (120%). In the second correction function M2, the gain value of the second correction is defined as a value ranging between 1.0 (100%) and 1.1 (110%).

If the differential value calculated by the arithmetic unit 100b exceeds a predetermined ninth threshold value, the correction unit 100c performs the third correction involving correcting the control signal such that the target primary pressure value is changed. The ninth threshold value is a preset positive value larger than zero. If the differential value exceeds the ninth threshold value, the correction unit 100c performs the third correction involving correcting the control signal such that the target primary pressure value is reduced relative to the target primary pressure value corresponding to the control signal prior to the correction. Specifically, when the correction unit 100c performs the third correction, the gain value is at least smaller than 1, as indicated in the fifth segment m5 of the first correction function M1 and a tenth segment m10 of the second correction function M2 illustrated in the map in FIG. 18. For example, in the third correction, the gain value is defined as a value ranging between 0.6 (60%) and 0.9 (90%). In the first correction function M1 illustrated in FIG. 18, the gain value of the third correction is 0.8 (80%). In the second correction function M2, the gain value of the third correction is 0.9 (90%). In the third correction, the gain value is fixed and is not proportional to the differential value.

If the differential value calculated by the arithmetic unit 100b exceeds an eighth threshold value and is smaller than or equal to the ninth threshold value, the correction unit 100c performs the fourth correction involving correcting the control signal such that the target primary pressure value is changed. The eighth threshold value is a positive value smaller than the ninth threshold value and is a preset value. Specifically, the correction unit 100c performs the fourth correction involving correcting the control signal such that the target primary pressure value is reduced relative to the target primary pressure value corresponding to the control signal prior to the correction and is proportional to the absolute value of the differential value. In other words, when the correction unit 100c performs the fourth correction, the gain value is at least smaller than 1 and is proportional to the absolute value of the differential value, as indicated in the fourth segment m4 of the first correction function M1 and a ninth segment m9 of the second correction function M2 illustrated in the map in FIG. 18. Therefore, in the fourth correction, the gain value decreases substantially linearly as the differential value increases, and increases substantially linearly as the differential value decreases. For example, in the fourth correction, the gain value is defined as a value ranging between 0.6 (60%) and 1.0 (100%), and the minimum value of the gain value matches the gain value of the third correction in the same mode. In the first correction function M1 illustrated in FIG. 18, the gain value of the fourth correction is defined as a value ranging between 0.8 (80%) and 1.0 (100%). In the second correction function M2, the gain value of the fourth correction is defined as a value ranging between 0.9 (90%) and 1.0 (100%).

The correction unit 100c performs the fifth correction involving correcting the control signal such that the target primary pressure value is changed regardless of the differential value calculated by the arithmetic unit 100b. The correction unit 100c performs the fifth correction involving correcting the control signal such that the target primary pressure value is increased relative to the target primary pressure value corresponding to the control signal prior to the correction. Specifically, when the correction unit 100c performs the fifth correction, the gain value is at least larger than 1, as indicated in an eleventh segment m11 to a fifteenth segment m15 of the third correction function M3 illustrated in the map in FIG. 18. For example, in the fifth correction, the gain value is defined as a value ranging between 1.2 (120%) and 1.4 (140%). In the third correction function M3 illustrated in FIG. 18, the gain value of the fifth correction is defined as 1.4 (140%). In the fifth correction, the gain value is fixed and is not proportional to the differential value.

Although an example of the magnitude of the gain value is described in each of the first correction, the second correction, the third correction, the fourth correction, and the fifth correction, the value is merely an example and may be changed, where appropriate, by operating an operation switch, a terminal, and so on connected to the controller 100.

The correction mode includes a plurality of modes each involving performing at least one of the first correction, the second correction, the third correction, the fourth correction, and the fifth correction. Specifically, of the plurality of correction modes, one correction mode and another correction mode have different combinations of the corrections (the first correction, the second correction, the third correction, the fourth correction, and the fifth correction) performed by the correction unit 100c and/or different correction coefficients (gain values) used for correcting the command current value.

As indicated in the first correction function M1 in FIG. 18, the first mode involves the correction unit 100c performing the first correction if the differential value calculated by the arithmetic unit 100b is smaller than the sixth threshold value and the correction unit 100c performing the second correction if the differential value calculated by the arithmetic unit 100b is larger than or equal to the sixth threshold value and smaller than the seventh threshold value. Furthermore, the first mode involves the correction unit 100c not performing a correction if the differential value calculated by the arithmetic unit 100b is larger than or equal to the seventh threshold value and smaller than or equal to the eighth threshold value, the correction unit 100c performing the fourth correction if the differential value calculated by the arithmetic unit 100b exceeds the eighth threshold value and is smaller than or equal to the ninth threshold value, and the correction unit 100c performing the third correction if the differential value calculated by the arithmetic unit 100b exceeds the ninth threshold value.

As indicated in the second correction function M2 in FIG. 18, the second mode involves the correction unit 100c performing the first correction if the differential value calculated by the arithmetic unit 100b is smaller than the sixth threshold value and the correction unit 100c performing the second correction if the differential value calculated by the arithmetic unit 100b is larger than or equal to the sixth threshold value and smaller than the seventh threshold value. Furthermore, the second mode involves the correction unit 100c not performing a correction if the differential value calculated by the arithmetic unit 100b is larger than or equal to the seventh threshold value and smaller than or equal to the eighth threshold value, the correction unit 100c performing the fourth correction if the differential value calculated by the arithmetic unit 100b exceeds the eighth threshold value and is smaller than or equal to the ninth threshold value, and the correction unit 100c performing the third correction if the differential value calculated by the arithmetic unit 100b exceeds the ninth threshold value. As illustrated in FIG. 18, in the first mode and the second mode, the gain value in each correction is different. In the second mode, the gain value with respect to the same differential value is set to be smaller than that in the first mode.

Therefore, in the first mode and the second mode, if the differential value is smaller than the seventh threshold value, that is, larger than the seventh threshold value in the negative direction (i.e., when the working machine 1 recovers from an engine drop), the correction unit 100c corrects the control signal (command current value) such that the primary pressure is increased relative to that prior to the correction, so that an occurrence of a feedback of a decreasing traveling force when the working machine 1 recovers from an engine drop (i.e., a feedback occurring due to a decrease in the pressure (traveling pressure) of the hydraulic fluid flowing through the circulation fluid passages 53a and 53b as the flow rate of the hydraulic fluid output from the traveling pumps 50 decreases) can be suppressed in accordance with the correction.

In the first mode and the second mode, if the differential value exceeds the eighth threshold value, that is, if the differential value is larger than the eighth threshold value in the positive direction (i.e., when the working machine 1 recovers from an engine drop), the correction unit 100c corrects the control signal (command current value) such that the primary pressure is reduced relative to that prior to the correction, so that an excessive engine drop can be suppressed in accordance with the correction.

In other words, by switching between the first mode and the second mode in accordance with the condition of the working machine 1 or by the operator, a feedback of a decreasing traveling force can be suppressed, an excessive decrease in the engine drop can be suppressed, and the operability can be ensured.

The third mode includes performing the fifth correction involving correcting the control signal with a fixed gain value without changing the gain value in accordance with the differential value calculated by the arithmetic unit 100b. Specifically, in any of the eleventh segment m11 to the fifteenth segment m15, the gain value is 1.4 (140%), and the correction unit 100c performs the fifth correction involving correcting the control signal such that the target primary pressure value is increased relative to the target primary pressure value corresponding to the control signal prior to the correction.

Therefore, by changing to the third mode, the primary pressure serving as the pilot pressure of the pilot fluid supplied to the operation valves 56 and 69 is increased, so that the operation valves 56 and 69 can enhance the responsiveness to operations performed on the operation members 55 and 68.

The flow of a process performed by the controller 100 for correcting the control signal (command current value) will be described below with reference to FIG. 19. Because the flow of the process performed by the controller 100 according to the third embodiment for correcting the control signal is mostly identical to that in the first embodiment, the following description will mainly focus on the differences from the first embodiment.

In detail, after transitioning to the correction process in step S13, the arithmetic unit 100b confirms in step S14 whether or not the controller 100 is in the first mode. If the arithmetic unit 100b confirms that the controller 100 is in the first mode (Yes in step S14), the correction unit 100c acquires the first correction function M1 from the storage unit 100a in step S15.

If the arithmetic unit 100b confirms that the controller 100 is not in the first mode (No in step S14), the arithmetic unit 100b confirms in step S22 whether or not the controller 100 is in the second mode. If the arithmetic unit 100b confirms that the controller 100 is in the second mode (Yes in step S22), the correction unit 100c acquires the second correction function M2 from the storage unit 100a in step S23.

After acquiring the first correction function M1 or the second correction function M2 from the storage unit 100a (step S15 or step S23), the correction unit 100c acquires a differential value calculated by the arithmetic unit 100b in step S201. After acquiring the differential value calculated by the arithmetic unit 100b in step S201, the correction unit 100c confirms in step S202 whether or not the differential value is smaller than the sixth threshold value. If the correction unit 100c confirms that the differential value is smaller than the sixth threshold value (Yes in step S202), the correction unit 100c performs the first correction in step S203 involving correcting the control signal based on the acquired correction function such that the target primary pressure value is increased relative to the target primary pressure value corresponding to the control signal prior to the correction.

If the correction unit 100c confirms that the differential value is not smaller than the sixth threshold value (No in step S202), the correction unit 100c confirms in step S204 whether or not the differential value is smaller than the seventh threshold value, that is, whether or not the differential value is larger than or equal to the sixth threshold value and smaller than the seventh threshold value. If the correction unit 100c confirms that the differential value is larger than or equal to the sixth threshold value and smaller than the seventh threshold value (Yes in step S204), the correction unit 100c performs the second correction in step S205 involving correcting the control signal based on the acquired correction function such that the target primary pressure value is increased relative to the target primary pressure value corresponding to the control signal prior to the correction in proportion to an absolute value of the differential value.

If the correction unit 100c confirms that the differential value is not larger than or equal to the sixth threshold value and not smaller than the seventh threshold value (No in step S204), the correction unit 100c confirms in step S206 whether or not the differential value is smaller than the eighth threshold value, that is, whether or not the differential value is larger than or equal to the seventh threshold value and smaller than or equal to the eighth threshold value. If the correction unit 100c confirms that the differential value is larger than or equal to the seventh threshold value and smaller than or equal to the eighth threshold value (Yes in step S206), the correction unit 100c does not perform a correction in step S207.

If the correction unit 100c confirms that the differential value is not larger than or equal to the seventh threshold value and not smaller than or equal to the eighth threshold value (No in step S206), the correction unit 100c confirms in step S208 whether or not the differential value is smaller than or equal to the ninth threshold value, that is, whether or not the differential value exceeds the eighth threshold value and is smaller than or equal to the ninth threshold value. If the correction unit 100c confirms that the differential value exceeds the eighth threshold value and is smaller than or equal to the ninth threshold value (Yes in step S208), the correction unit 100c performs the fourth correction in step S209 involving correcting the control signal based on the acquired correction function such that the target primary pressure value is reduced relative to the target primary pressure value corresponding to the control signal prior to the correction in proportion to the absolute value of the differential value.

If the correction unit 100c confirms that the differential value exceeds the eighth threshold value and is not smaller than or equal to the ninth threshold value (No in step S208), that is, if the differential value exceeds the ninth threshold value, the correction unit 100c performs the third correction in step S210 involving correcting the control signal based on the acquired correction function such that the target primary pressure value is reduced relative to the target primary pressure value corresponding to the control signal prior to the correction.

If the arithmetic unit 100b confirms that the controller 100 is not in the second mode (No in step S22), that is, if the correction unit 100c confirms that the controller 100 is in the third mode, the correction unit 100c performs the fifth correction in step S211 involving correcting the control signal such that the target primary pressure value is increased relative to the target primary pressure value corresponding to the control signal prior to the correction.

After the correction unit 100c corrects the command current value in each of steps S203, S205, S209, S210, and S211, the arithmetic unit 100b defines the command current value after the correction as a control signal output from the controller 100 to the actuation valve 70.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine, comprising:
   a prime mover;
   a rotation-speed operation actuator operable to determine a target rotation speed of the prime mover;
   a rotation detector to detect an actual rotation speed of the prime mover;
   a hydraulic pump driven by power from the prime mover to deliver a hydraulic fluid;
   a hydraulic unit to actuate in accordance with a hydraulic fluid;
   an operation valve operable to change a pilot pressure of a pilot fluid defining the hydraulic fluid supplied from the hydraulic pump to the hydraulic unit in accordance with an operation of an operation member;
   an actuation valve operable in accordance with a control signal to change a primary pressure defining the pilot pressure of the pilot fluid supplied from the hydraulic pump to the operation valve; and
   a controller configured or programmed to output the control signal based on a difference between the target rotation speed and the actual rotation speed to the actuation valve to control an opening of the actuation valve, wherein
   the controller is configured or programmed to calculate the control signal based on the difference between the target rotation speed and the actual rotation speed, and if the difference between the target rotation speed and the actual rotation speed is larger than or equal to a first set value, decrease a target value for the primary pressure as compared to a case where the difference between the target rotation speed and the actual rotation speed is lower than the first set value,
   the controller is configured or programmed to switch between a plurality of correction modes each including, if the difference between the target rotation speed and the actual rotation speed is larger than or equal to the first set value, performing a correction of the calculated control signal to increase or decrease the target value for the primary pressure set in accordance with the control signal, and
   the controller is configured or programmed to perform the correction of the calculated control signal based on a corresponding one of correction functions defined for the respective plurality of correction modes.

2. The working machine according to claim 1, wherein the controller is configured or programmed to switch to a third mode which is one of the plurality of correction modes, the third mode including performing a fourth correction involving correcting the control signal such that the target value for the primary pressure is increased relative to the target value for the primary pressure corresponding to the control signal prior to the correction, the fourth correction being the correction performed in the third mode.

3. The working machine according to claim 1, wherein the controller is configured or programmed to switch to a normal mode in a case where the difference between the target rotation speed and the actual rotation speed is larger than or equal to a second set value larger than the first set value, the normal mode differing from the plurality of correction modes, the normal mode involving controlling the opening of the actuation valve based on the calculated control signal without correcting the control signal.

4. The working machine according to claim 1, further comprising:

an operable switching member, wherein
the controller is configured or programmed to switch between the plurality of correction modes in accordance with an operation of the switching member.

5. A working machine, comprising:
a prime mover;
a rotation-speed operation actuator operable to determine a target rotation speed of the prime mover;
a rotation detector to detect an actual rotation speed of the prime mover;
a hydraulic pump driven by power from the prime mover to deliver a hydraulic fluid;
a hydraulic unit to actuate in accordance with a hydraulic fluid;
an operation valve operable to change a pilot pressure of a pilot fluid defining the hydraulic fluid supplied from the hydraulic pump to the hydraulic unit in accordance with an operation of an operation member;
an actuation valve operable in accordance with a control signal to change a primary pressure defining the pilot pressure of the pilot fluid supplied from the hydraulic pump to the operation valve;
a controller configured or programmed to output the control signal based on a difference between the target rotation speed and the actual rotation speed to the actuation valve to control an opening of the actuation valve; and
a pressure detector to detect a secondary pressure defining the pilot pressure output from the operation valve to the hydraulic unit, wherein
the controller is configured or programmed to switch between a plurality of modes each including calculating the control signal based on the difference between the target rotation speed and the actual rotation speed, performing a correction of the calculated control signal, and increasing or decreasing a target value for the primary pressure set in accordance with the control signal, and
the controller is configured or programmed to perform a first correction involving correcting the control signal such that the target value for the primary pressure is changed in accordance with the secondary pressure detected by the pressure detector, the first correction being the correction performed in at least one of the plurality of modes.

6. The working machine according to claim 5, wherein the first correction performed by the controller involves correcting the control signal such that the target value for the primary pressure is reduced relative to the target value for the primary pressure corresponding to the control signal prior to the correction and is proportional to the secondary pressure detected by the pressure detector.

7. The working machine according to claim 5, wherein the control signal is a current value output to the actuation valve, and
the controller is configured or programmed to correct the current value prior to the correction in accordance with a gain value and gradually change the gain value in the first correction to gradually correct the current value output to the actuation valve.

8. The working machine according to claim 5, wherein the controller is configured or programmed to perform a second correction involving correcting the control signal such that the target value for the primary pressure is higher than or equal to a primary pressure corresponding to the control signal prior to the correction in a case where an operational amount of the operation member is greater than or equal to a predetermined amount and the secondary pressure detected by the pressure detector is higher than or equal to a first threshold value, the second correction being the correction performed in at least one of the plurality of modes.

9. The working machine according to claim 8, wherein the controller is configured or programmed to switch to a first mode including performing the first correction in a case where the secondary pressure detected by the pressure detector is lower than the first threshold value and performing the second correction in a case where the secondary pressure detected by the pressure detector is higher than or equal to the first threshold value, the first mode being one of the plurality of modes.

10. The working machine according to claim 8, wherein the controller is configured or programmed to perform a third correction involving correcting the control signal such that the target value for the primary pressure is increased relative to the primary pressure corresponding to the control signal prior to the correction in a case where the secondary pressure detected by the pressure detector is lower than a second threshold value that serves as a minimum pilot pressure outputtable from the operation valve and that is smaller than the first threshold value, the third correction being the correction performed in at least one of the plurality of modes, and
the controller is configured or programmed to switch to a second mode including performing the third correction in a case where the secondary pressure detected by the pressure detector is lower than the second threshold value, performing the first correction in a case where the secondary pressure detected by the pressure detector is higher than or equal to the second threshold value and lower than the first threshold value, and performing the second correction in a case where the secondary pressure detected by the pressure detector is higher than or equal to the first threshold value, the second mode being one of the plurality of modes.

11. A working machine, comprising:
a prime mover;
a rotation-speed operation actuator operable to determine a target rotation speed of the prime mover;
a rotation detector to detect an actual rotation speed of the prime mover;
a hydraulic pump driven by power from the prime mover to deliver a hydraulic fluid;
a hydraulic unit to actuate in accordance with a hydraulic fluid;
an operation valve operable to change a pilot pressure of a pilot fluid defining the hydraulic fluid supplied from the hydraulic pump to the hydraulic unit in accordance with an operation of an operation member;
an actuation valve operable in accordance with a control signal to change a primary pressure defining the pilot pressure of the pilot fluid supplied from the hydraulic pump to the operation valve;
a controller configured or programmed to output the control signal based on a difference between the target rotation speed and the actual rotation speed to the actuation valve to control an opening of the actuation valve; and
a pressure detector to detect a secondary pressure defining the pilot pressure output from the operation valve to the hydraulic unit, wherein
the controller is configured or programmed to switch between a plurality of modes each including calculating the control signal based on the difference between the target rotation speed and the actual rotation speed, performing a correction of the calculated control signal, and increasing or decreasing a target value for the primary pressure set in accordance with the control signal, and the controller is configured or programmed to perform a third correction involving correcting the control signal such that the target value for the primary pressure is increased relative to the primary pressure corresponding to the control signal prior to the correction in a case where the secondary pressure detected by the pressure detector is lower than a second threshold value serving as a minimum pilot pressure outputtable from the operation valve, the third correction being the correction performed in at least one of the plurality of modes.

12. A working machine, comprising:

a prime mover;

a rotation-speed operation actuator operable to determine a target rotation speed of the prime mover;

a rotation detector to detect an actual rotation speed of the prime mover;

a hydraulic pump driven by power from the prime mover to deliver a hydraulic fluid;

a hydraulic unit to actuate in accordance with a hydraulic fluid;

an operation valve operable to change a pilot pressure of a pilot fluid defining the hydraulic fluid supplied from the hydraulic pump to the hydraulic unit in accordance with an operation of an operation member;

an actuation valve operable in accordance with a control signal to change a primary pressure defining the pilot pressure of the pilot fluid supplied from the hydraulic pump to the operation valve;

a controller configured or programmed to output the control signal based on a difference between the target rotation speed and the actual rotation speed to the actuation valve to control an opening of the actuation valve; and a pressure detector to detect a secondary pressure defining the pilot pressure output from the operation valve to the hydraulic unit, wherein the controller is configured or programmed to switch between a plurality of modes each including calculating the control signal based on the difference between the target rotation speed and the actual rotation speed, performing a correction of the calculated control signal, and increasing or decreasing a target value for the primary pressure set in accordance with the control signal, and the controller is configured or programmed to perform a fourth correction involving correcting the control signal such that the target value for the primary pressure is increased relative to the target value for the primary pressure corresponding to the control signal prior to the correction, in accordance with the secondary pressure detected by the pressure detector, the fourth correction being the correction performed in at least one of the plurality of modes.

13. The working machine according to claim 12, wherein the fourth correction performed by the controller involves correcting the control signal such that the target value for the primary pressure is increased relative to the target value for the primary pressure corresponding to the control signal prior to the correction and is proportional to the secondary pressure detected by the pressure detector.

14. A working machine, comprising:

a prime mover;

a rotation-speed operation actuator operable to determine a target rotation speed of the prime mover;

a rotation detector to detect an actual rotation speed of the prime mover;

a hydraulic pump driven by power from the prime mover to deliver a hydraulic fluid;

a hydraulic unit to actuate in accordance with a hydraulic fluid;

an operation valve operable to change a pilot pressure of a pilot fluid defining the hydraulic fluid supplied from the hydraulic pump to the hydraulic unit in accordance with an operation of an operation member;

an actuation valve operable in accordance with a control signal to change a primary pressure defining the pilot pressure of the pilot fluid supplied from the hydraulic pump to the operation valve;

a controller configured or programmed to output the control signal based on a difference between the target rotation speed and the actual rotation speed to the actuation valve to control an opening of the actuation valve; and a temperature detector to detect a temperature of the pilot fluid, wherein the controller is configured or programmed to switch between a plurality of correction modes each including calculating the control signal based on the difference between the target rotation speed and the actual rotation speed, performing a correction of the calculated control signal, and increasing or decreasing a target value for the primary pressure set in accordance with the control signal, and the controller is configured or programmed to switch to a normal mode in a case where the temperature of the pilot fluid detected by the temperature detector is lower than a fourth threshold value, the normal mode differing from the plurality of correction modes, the normal mode involving controlling the opening of the actuation valve based on the calculated control signal without correcting the control signal.

* * * * *